(12) United States Patent
Tachi

(10) Patent No.: US 8,314,863 B2
(45) Date of Patent: Nov. 20, 2012

(54) IMAGE PROCESSING DEVICE, IMAGE PROCESSING METHOD, AND PROGRAM PERTAINING TO IMAGE CORRECTION

(75) Inventor: Masayuki Tachi, Tokyo (JP)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 12/861,735

(22) Filed: Aug. 23, 2010

(65) Prior Publication Data

US 2011/0050918 A1  Mar. 3, 2011

(30) Foreign Application Priority Data

Aug. 31, 2009 (JP) ................ P2009-199339

(51) Int. Cl.
*H04N 5/217* (2006.01)
*H04N 9/68* (2006.01)

(52) U.S. Cl. ........ 348/241; 348/234; 348/235; 348/236; 348/237

(58) Field of Classification Search .................. None
See application file for complete search history.

(56) References Cited

U.S. PATENT DOCUMENTS

| | | | |
|---|---|---|---|
| 7,893,974 B2* | 2/2011 | Chiba | 348/252 |
| 2004/0201724 A1* | 10/2004 | Kharitoneko et al. | 348/223.1 |
| 2006/0098253 A1* | 5/2006 | Masuno et al. | 358/518 |
| 2007/0024879 A1 | 2/2007 | Hamilton, Jr. et al. | |
| 2007/0024934 A1 | 2/2007 | Andams, Jr. et al. | |
| 2007/0153106 A1* | 7/2007 | Subbotin | 348/272 |
| 2008/0180557 A1* | 7/2008 | Egawa et al. | 348/294 |
| 2008/0291312 A1* | 11/2008 | Egawa | 348/308 |
| 2008/0303919 A1* | 12/2008 | Egawa | 348/223.1 |
| 2009/0128703 A1* | 5/2009 | Uchiyama et al. | 348/630 |
| 2009/0153696 A1* | 6/2009 | Suwabe et al. | 348/223.1 |
| 2010/0053346 A1* | 3/2010 | Mitsunaga | 348/208.6 |
| 2010/0271498 A1* | 10/2010 | Hwang et al. | 348/222.1 |
| 2011/0280479 A1* | 11/2011 | Yamada et al. | 382/167 |

FOREIGN PATENT DOCUMENTS

JP    2009-17544    1/2009

* cited by examiner

*Primary Examiner* — Lin Ye
*Assistant Examiner* — John H Morehead, III
(74) *Attorney, Agent, or Firm* — Finnegan, Henderson, Farabow, Garrett & Dunner, L.L.P.

(57) ABSTRACT

An image processing device includes: a blurring correction processing unit configured to perform blurring correction processing on output signals of an imaging device having an RGBW array which includes RGB pixels and white (W) pixels, and generate blurring-corrected signals corresponding to each pixels; and a data conversion unit configured to convert the RGBW array into an RGB array; wherein the data conversion unit executes processing of generating blurring-corrected RGB signals (Rd, Gd, Bd) which are blurring-corrected signals corresponding to RGB that have been estimated from blurring-corrected signals generated by the blurring correction processing unit, and applying the blurring-corrected RGB signals (Rd, Gd, Bd) to determine RGB signals values configuring an RGB array.

13 Claims, 27 Drawing Sheets

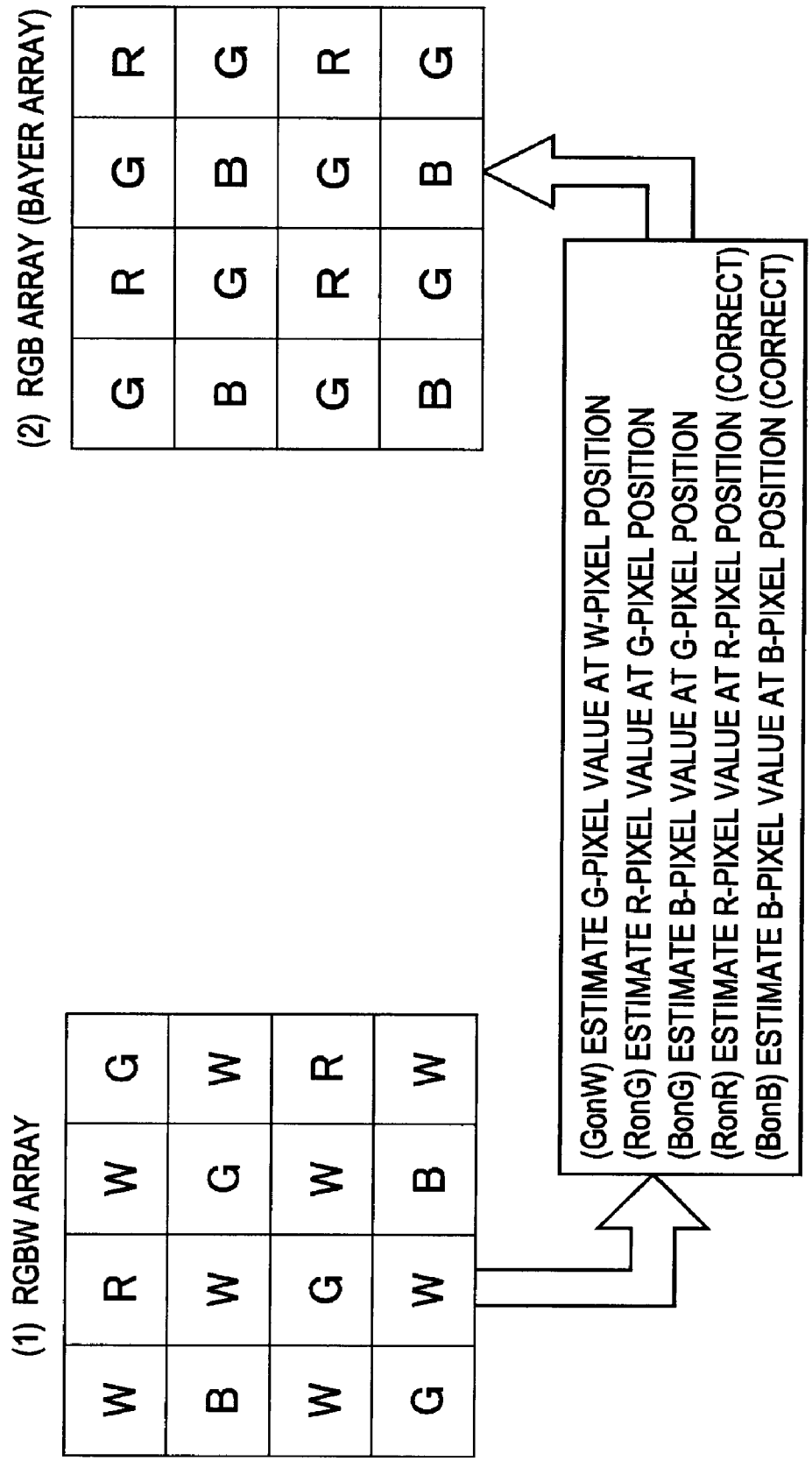

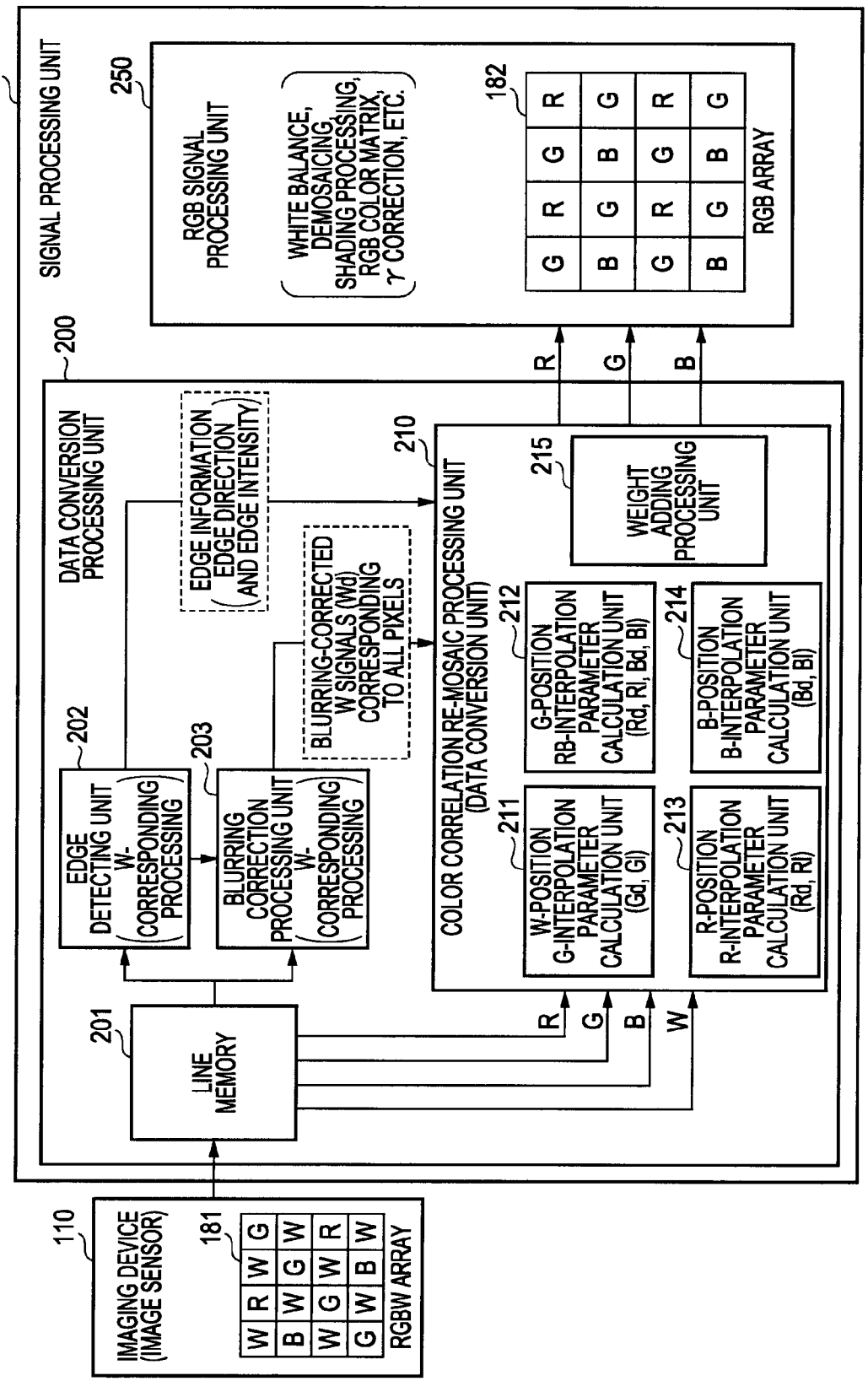

FIG. 14
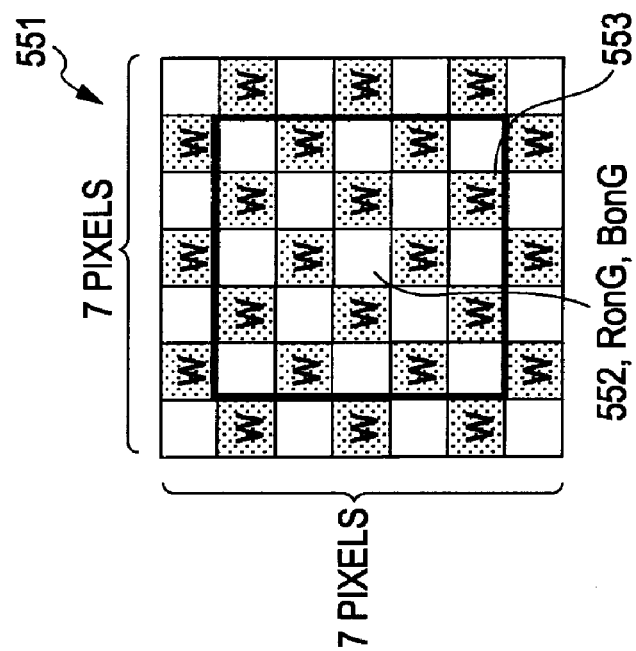 × 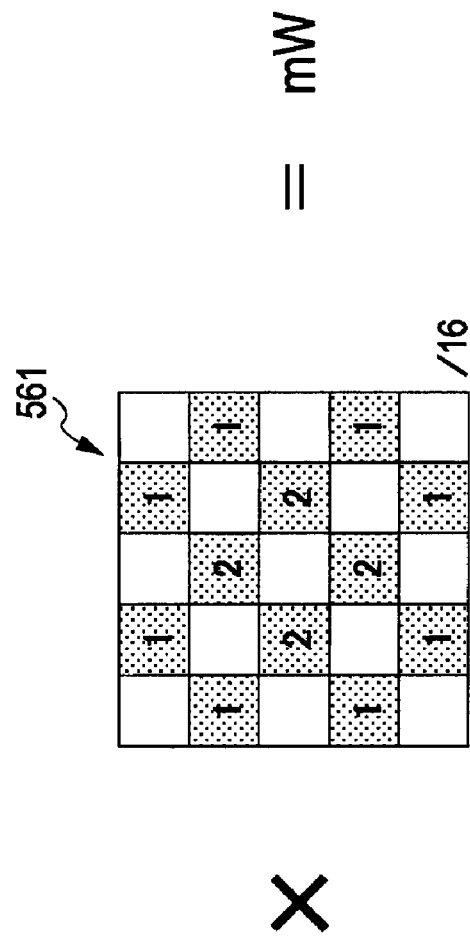 = mW

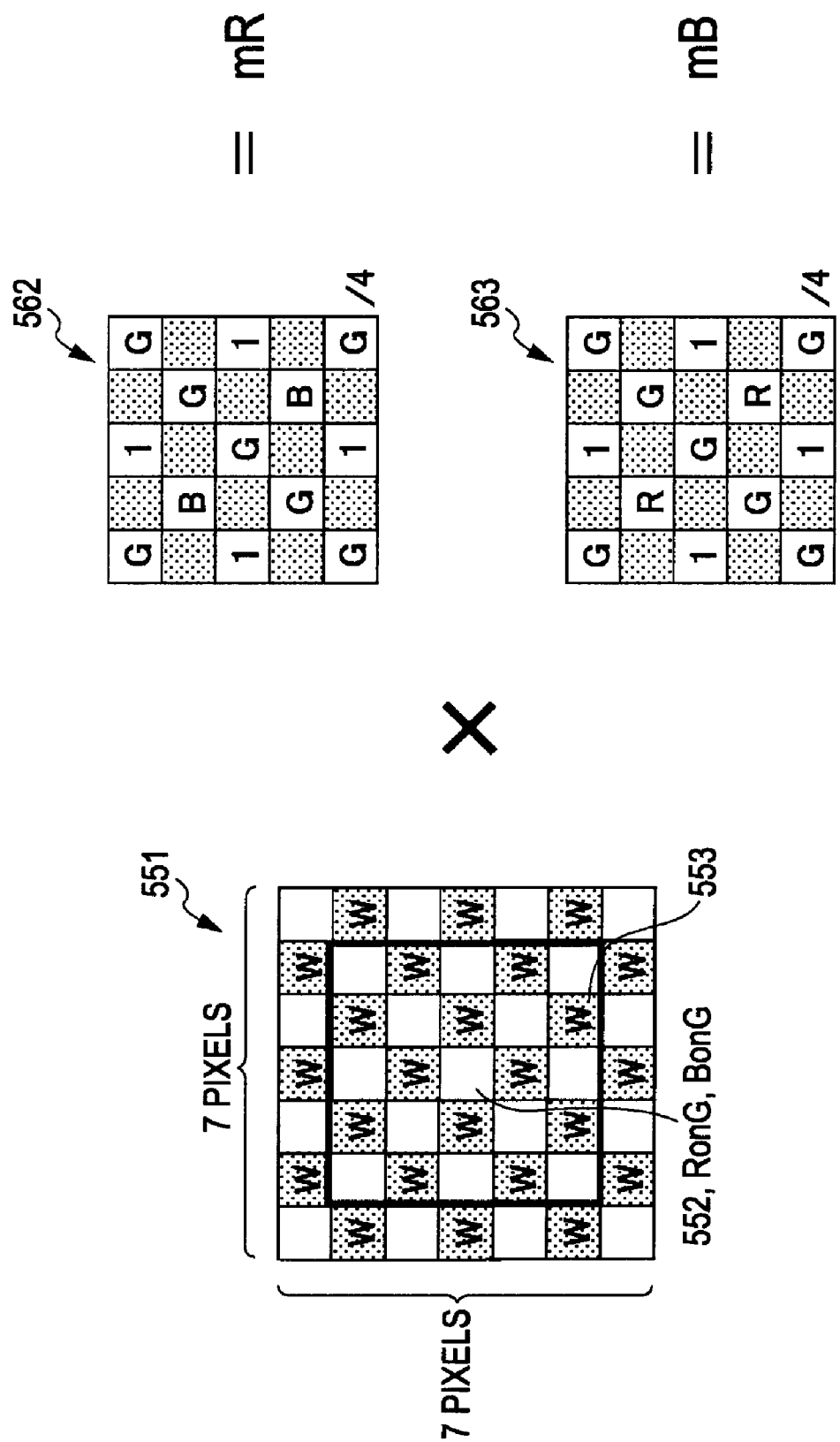

FIG. 25
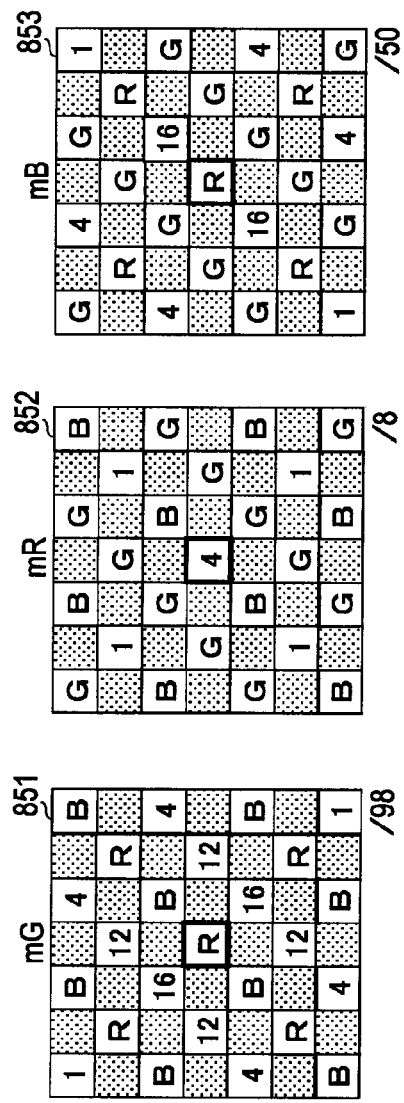
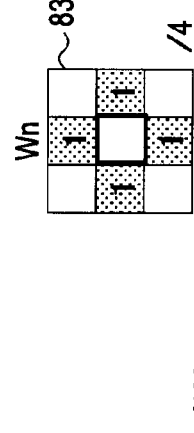
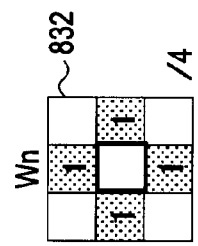
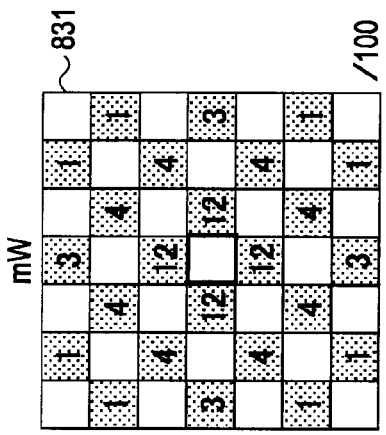

FIG. 27A

$$W = W_{sig} + N \quad N: Noise$$

$$R = \frac{mR}{mW}W = \frac{mR}{mW}(W_{sig} + \underline{N})$$

$$G = \frac{mG}{mW}W = \frac{mG}{mW}(W_{sig} + \underline{N})$$

$$B = \frac{mB}{mW}W = \frac{mB}{mW}(W_{sig} + \underline{N})$$

CORRELATION IN NOISE
⇒ COLORED SUPPRESSION OF NOISE

FIG. 27B

$$\begin{pmatrix} R' \\ G' \\ B' \end{pmatrix} = \begin{bmatrix} 1.58 & -0.57 & -0.01 \\ -0.31 & 1.44 & -0.13 \\ -0.11 & -0.48 & 1.59 \end{bmatrix} \begin{pmatrix} R \\ G \\ B \end{pmatrix}$$

FIG. 27C

$$R' = \frac{W_{sig}}{mW}(1.58 \times mR - 0.57 \times mG - 0.01 \times mB) + \frac{N}{mW}(1.58 \times mR - 0.57 \times mG - 0.01 \times mB)$$

$$G' = \frac{W_{sig}}{mW}(-0.31 \times mR + 1.44 \times mG - 0.13 \times mB) + \frac{N}{mW}(-0.31 \times mR + 1.44 \times mG - 0.13 \times mB)$$

$$B' = \frac{W_{sig}}{mW}(-0.11 \times mR - 0.48 \times mG - 1.59 \times mB) + \frac{N}{mW}(-0.11 \times mR - 0.48 \times mG + 1.59 \times mB)$$

SUPPRESSION OF NOISE ENHANCEMENT BY COLOR MATRIX COMPUTATION

IMAGE PROCESSING DEVICE, IMAGE PROCESSING METHOD, AND PROGRAM PERTAINING TO IMAGE CORRECTION

BACKGROUND OF THE INVENTION

1. Field of the Invention

The present invention relates to an image processing device, and image processing method, and a program, and more particularly relates to an image processing device, and image signal processing method, and a program, for performing signal processing as to output of an imaging device having an RGBW array.

2. Description of the Related Art

Imaging devices (image sensors) used for imaging apparatuses, for example, have a structure wherein a color filter, which transmits specific wavelength component light (R, G, B) in increments of pixels, is applied to the surface thereof. For example, a filter having an RGB array such as shown in FIG. 1A is used. With color image generating processing using output signals of an imaging device, processing is performed for reproducing color components to be used, in sets of multiple pixels. While there are various types of color arrays for color filters, the Bayer array shown in FIG. 1A, configured of three types of filters transmitting only the specific wavelengths of red (R), green (G), and blue (B), is widely used.

As of recent, imaging devices (image sensors) have come to have finer pixel configurations, and accordingly there has arisen the problem that the amount of incident light to each of the pixels decreases and the S/N ratio increases. In order to deal with this problem, there has been proposed an image sensor (imaging device) having, in addition to the filters which transmit only specific wavelength light of RGB or the like, white (W) which broadly transmits visible light, as shown in FIG. 1B. FIG. 1B illustrates an example of a filter having an RGBW array. The W pixels in the RGBW array shown in FIG. 1B are filters which broadly transmit visible light.

Such an imaging device having a color filter with white (W) pixels is described in, for example, US Patent Application Publication Nos. 2007/0024879 and 2007/0024934. Using an imaging device (image sensor) such as shown in FIG. 1B which has white (W) pixels raises the transmissivity of the filter, and higher sensitivity can be realized. However, RGBW type devices have the following problems.

Both the RGB array shown in FIG. 1A and the RGBW array shown in FIG. 1B are single-sensor image sensors where all or part of R, G, B, and W filters are arrayed in mosaic fashion on a single device. Accordingly, demosaicing processing, which is color coding in which RGB pixel values corresponding to the pixels has to be performed when generating a color image.

With the RGBW array shown in FIG. 1B, the sampling rate of the R, G, and B components deteriorates as compared to the RGB array shown in FIG. 1A. Consequently, in the event that data acquired with the RGBW array type device shown in FIG. 1B is used in color image generating processing, there is a problem that false color more readily occurs as compared with the RGB array shown in FIG. 1A. Also, the white (W) wavelength component includes all wavelength components of R, G, and B, so using an optical lens with great chromatic aberration can result in poorer light collection as compared with monochromatic arrangements, leading to deterioration in resolution. This problem becomes more marked as pixel configurations become finer.

As a technique to prevent deterioration in resolution due to chromatic aberration of the optical lens, combining lenses with different refractive indexes effectively prevents chromatic aberration from occurring, but this leads to a new problem of increased costs, since the number of lenses increases. This configuration also leads to a problem in that false color due to deterioration of the sampling rate of the RGB components described above is more marked.

Also, each pixel in a single-sensor image sensor only has monochromatic component information, so demosaic processing is performed in which RGB pixel values for all pixels are obtained to obtain a color image from the R, G, B, and W signals acquired discretely. At the time of demosaic processing, interpolation processing is performed which assumes that the color ratio will be generally constant in local regions and that there is a strong color correlation. Specifically, at the time of calculating pixel values for a particular color of a certain pixel, a method of performing interpolation using the pixel values of surrounding pixels is widely employed. An example of this technique is described in Japanese Unexamined Patent Application Publication No. 2009-17544. However, near the edges, the above assumption of the color ratio being generally constant in local regions and of strong color correlation does not hold. Accordingly, there is a problem that false color readily occurs near the edges.

SUMMARY OF THE INVENTION

It has been found desirable to provide, with regard to color image generating processing in which data acquired by an imaging device (image sensor) having white (W) such as an RGBW type color filter, an image processing device, image processing method, and program, realizing generating of high-quality color image with little false color or blurring.

An image processing device according to an embodiment of the present invention includes: a blurring correction processing unit configured to perform blurring correction processing on output signals of an imaging device having an RGBW array which includes RGB pixels and white (W) pixels, and generate blurring-corrected signals corresponding to each pixels; and a data conversion unit configured to convert the RGBW array into an RGB array; wherein the data conversion unit executes processing of generating blurring-corrected RGB signals (Rd, Gd, Bd) which are blurring-corrected signals corresponding to RGB that have been estimated from blurring-corrected signals generated by the blurring correction processing unit, and applying the blurring-corrected RGB signals (Rd, Gd, Bd) to determine RGB signals values configuring an RGB array.

An image processing device according to an embodiment of the present invention includes: a blurring correction processing unit configured to perform blurring correction processing on output signals of an imaging device having an RGBW array which includes RGB pixels and white (W) pixels, and generate blurring-corrected signals corresponding to each pixels; and a data conversion unit configured to execute demosaic processing of mosaic signals made up of the RGBW array and generate a color image in which all RGB signal values corresponding to each pixel have been determined; wherein the data conversion unit executes processing of generating blurring-corrected RGB signals (Rd, Gd, Bd) which are blurring-corrected signals corresponding to RGB that have been estimated from blurring-corrected signals generated by the blurring correction processing unit, and applying the blurring-corrected RGB signals (Rd, Gd, Bd) to generate a color image in which all RGB signal values corresponding to each pixel have been determined.

The image processing device may further include: an edge detecting unit configured to analyze output signals from an imaging device having an RGBW array which includes RGB pixels and white (W) pixels, and generating edge information including edge intensity information corresponding to each pixel; with the data conversion unit being configured to calculate blurring-uncorrected RGB signals (Rl, Gl, Bl) which are signals to which blurring correction processing is not applied, and perform determine processing of RGB signals values making up an RGB array or color image by blending processing of the blurring-corrected RGB signals and the blurring-uncorrected RGB signals; and determination processing of RGB signal values being performed by executing blending processing in which at pixel positions where determination is made that edge intensity is great from the edge information, the blend ratio of blurring-corrected RGB signals is increased, and at pixel positions where determination is made that edge intensity is small, the blend ratio of blurring-uncorrected RGB signals is increased.

The blurring correction processing unit may execute blurring correction processing only to W signals included in the outputs signals of the imaging device to generate blurring-corrected W signals (Wd) corresponding to each pixel; with the data conversion unit calculating the blurring-calculated RGB signals from the blurring-corrected W signals (Wd), based on an assumption that there is positive correlation between W signals and RGB signals at local regions in the image.

The data conversion unit may apply W signals included, in the output signals of the imaging device to generate noise-removed W signals (Wn) corresponding to each pixel; and calculate the blurring-uncorrected RGB signals from the noise-removed W signals (Wn).

The edge detection unit may be of a configuration to generate edge information corresponding to each pixel from edge detection processing to which only W signals included in the output signals of the imaging device have been applied, and generate edge information including edge intensity and edge direction by calculating signal value gradient of W pixels near a pixel to be processed.

The edge detection unit may be of a configuration to generate edge information corresponding to each pixel from edge detection processing to which only W signals included in the output signals of the imaging device have been applied, and calculate weight-added values of average of absolute values of gradients of W pixel signals near a pixel to be processed, calculate a flatness (weightFlat) by applying the weight-added values, and output the flatness (weightFlat) to the data conversion unit; with the data conversion unit applying the flatness (weightFlat) to determine the blend ratio of the blurring-corrected RGB signals and the blurring-uncorrected RGB signals.

The blurring correction processing unit may be of a configuration to generate the blurring-corrected W signals (Wd) by convolution computation of a Weiner filter as to W signals included in output signals of the imaging device; with, for RGB signal positions included in the output signals of the imaging device, reference W pixels being determined in accordance to the edge direction included in edge information generated by the edge detection unit, interpolation W signal values being determined by interpolation processing to which signals values of the reference W pixels have been applied, and blurring-corrected W signals (Wd) being generated by convolution computation of the Weiner filter as to the interpolation W signals.

The image processing device may further include: an optical lens; and an imaging device having the RGBW array serving as a light-receiving portion configured to receive incident light through the optical lens.

The optical lens may have lens aberration configured such that signal components exceeding the Nyquist frequency for each color component in the RGBW array of the imaging device are not generated.

An image processing method according to an embodiment of the present invention for performing image signal processing with an image processing device, includes the steps of: blurring correction processing, with a blurring correction processing unit, of output signals of an imaging device having an RGBW array which includes RGB pixels and white (W) pixels, and generating of blurring-corrected signals corresponding to each pixels; and converting, a data conversion unit, of the RGBW array into an RGB array; wherein the converting includes processing of generating blurring-corrected RGB signals (Rd, Gd, Bd) which are blurring-corrected signals corresponding to RGB that have been estimated from blurring-corrected signals generated in the blurring correction processing, and applying the blurring-corrected RGB signals (Rd, Gd, Bd) to determine RGB signals values configuring an RGB array.

An image processing method according to an embodiment of the present invention for performing image signal processing with an image processing device, includes the steps of: blurring correction processing, with a blurring correction processing unit, of output signals of an imaging device having an RGBW array which includes RGB pixels and white (W) pixels, and generating of blurring-corrected signals corresponding to each pixels; and converting, with a data conversion unit, of mosaic signals made up of the RGBW array by performing demosaic processing thereof and generating a color image in which all RGB signal values corresponding to each pixel have been determined; wherein the converting includes processing of generating blurring-corrected RGB signals (Rd, Gd, Bd) which are blurring-corrected signals corresponding to RGB that have been estimated from blurring-corrected signals generated by the blurring correction processing, and applying the blurring-corrected RGB signals (Rd, Gd, Bd) to generate a color image in which all RGB signal values corresponding to each pixel have been determined.

The image processing method may further include the step of: analyzing, with an edge detecting unit, of output signals from an imaging device having an RGBW array which includes RGB pixels and white (W) pixels, and generating of edge information including edge intensity information corresponding to each pixel; with the converting including RGB signal value determining further including calculating of blurring-uncorrected RGB signals (Rl, Gl, Bl) which are signals to which blurring correction processing is not applied, and performing determining processing of RGB signals values making up an RGB array or color image by blending processing of the blurring-corrected RGB signals and the blurring-uncorrected RGB signals; and the RGB signal value determining being performed by executing blending processing in which at pixel positions where determination is made that edge intensity is great from the edge information, the blend ratio of blurring-corrected RGB signals is increased, and at pixel positions where determination is made that edge intensity is small, the blend ratio of blurring-uncorrected RGB signals is increased.

A program according to an embodiment of the present invention for causing an image processing device to execute image signal processing, includes the steps of: blurring correction processing, with a blurring correction processing unit, of output signals of an imaging device having an RGBW array which includes RGB pixels and white (W) pixels, and generating of blurring-corrected signals corresponding to each pixels; and converting, a data conversion unit, of the RGBW array into an RGB array; wherein the converting includes processing of generating blurring-corrected RGB signals (Rd, Gd, Bd) which are blurring-corrected signals corresponding to RGB that have been estimated from blurring-corrected signals generated by the blurring correction processing, and applying the blurring-corrected RGB signals (Rd, Gd, Bd) to determine RGB signals values configuring an RGB array.

A program according to an embodiment of the present invention for causing an image processing device to execute image signal processing, includes the steps of: blurring correction processing, with a blurring correction processing unit, of output signals of an imaging device having an RGBW array which includes RGB pixels and white (W) pixels, and generating of blurring-corrected signals corresponding to each pixels; and converting, with a data conversion unit, of mosaic signals made up of the RGBW array by performing demosaic processing thereof, and generating a color image in which all RGB signal values corresponding to each pixel have been determined; wherein the converting includes processing of generating blurring-corrected RGB signals (Rd, Gd, Bd) which are blurring-corrected signals corresponding to RGB that have been estimated from blurring-corrected signals generated by the blurring correction processing, and applying the blurring-corrected RGB signals (Rd, Gd, Bd) to generate a color image in which all RGB signal values corresponding to each pixel have been determined.

The program may further include the step of: analyzing, with an edge detecting unit, of output signals from an imaging device having an RGBW array which includes RGB pixels and white (W) pixels, and generating of edge information including edge intensity information corresponding to each pixel; with the converting including RGB signal value determining further including calculating of blurring-uncorrected RGB signals (Rl, Gl, Bl) which are signals to which blurring correction processing is not applied, and performing determining processing of RGB signals values making up an RGB array or color image by blending processing of the blurring-corrected RGB signals and the blurring-uncorrected RGB signals; and with the RGB signal value determining being performed by executing blending processing in which at pixel positions where determination is made that edge intensity is great from the edge information, the blend ratio of blurring-corrected RGB signals is increased, and at pixel positions where determination is made that edge intensity is small, the blend ratio of blurring-uncorrected RGB signals is increased.

The program may be provided in a computer-readable format to image processing devices and computer systems capable of executing various types of program code, by way of storage medium or communication medium. Providing the program in a computer-readable format enables processing corresponding to the program to be realized at the image processing devices and computer systems.

Further objects, features, and advantages will become apparent from the embodiments described below and the accompanying drawings. Note that the term "system" as used in the Present specification refers to a logical configuration of a collection of multiple devices, and the devices for each configuration do not have to be within the same housing.

According to the above configurations, in color image generating processing applying obtained data of an imaging device (image sensory) having an RGBW type color filter for example, having white (W), generating of high-quality color images with little false color and blurring can be realized. Specifically, output signals of an RGBW array imaging device are analyzed, and edge information and blurring correction signals corresponding to each pixel are generated. Further, blurring-corrected RGB signals which are blurring-corrected signals correlating to RGB that are estimated from blurring correction signals, and blurring-uncorrected RGB signals which are signals to which blurring correction is not applied, are calculated. Further, these signals are blended in blending processing to generated RGB array data or a color image. At pixel positions where the edge intensity is great, the blend ratio of blurring-corrected RGB signals is raised, and at pixel positions where the edge intensity is low, the blend ratio of blurring-uncorrected RGB signals is raised. Due to this processing, generating of high-quality color images with little false color and blurring can be realized.

BRIEF DESCRIPTION OF THE DRAWINGS

FIG. 1A is a diagram illustrating an example of a Bayer array serving as a color array used with a common color filter;

FIG. 1B is a diagram illustrating an example of a RGBW array applied to an embodiment of the present invention;

FIG. 2 is a diagram for describing re-mosaic processing performed as conversion processing from an RGBW array to an RGB array, which is processing according to an embodiment of the present invention;

FIG. 4 is a diagram for describing a configuration example of an imaging apparatus according to an embodiment of the present invention;

FIG. 14 is a diagram for describing a filter configuration for calculating low-frequency component mW of a W signal, and an example of mW calculation processing;

FIG. 15 is a diagram for describing a filter configuration for calculating low-frequency component mR of an R signal and low-frequency component mB of a B signal, and an example of mR and mB calculation processing;

FIG. 25 is a diagram for describing processing of a R-position RGB-interpolation parameter calculating unit shown in FIG. 21;

FIGS. 27A through 27C are diagrams for describing the advantages of demosaic processing of RGBW array signals.

DESCRIPTION OF THE PREFERRED EMBODIMENTS

Figure 3:
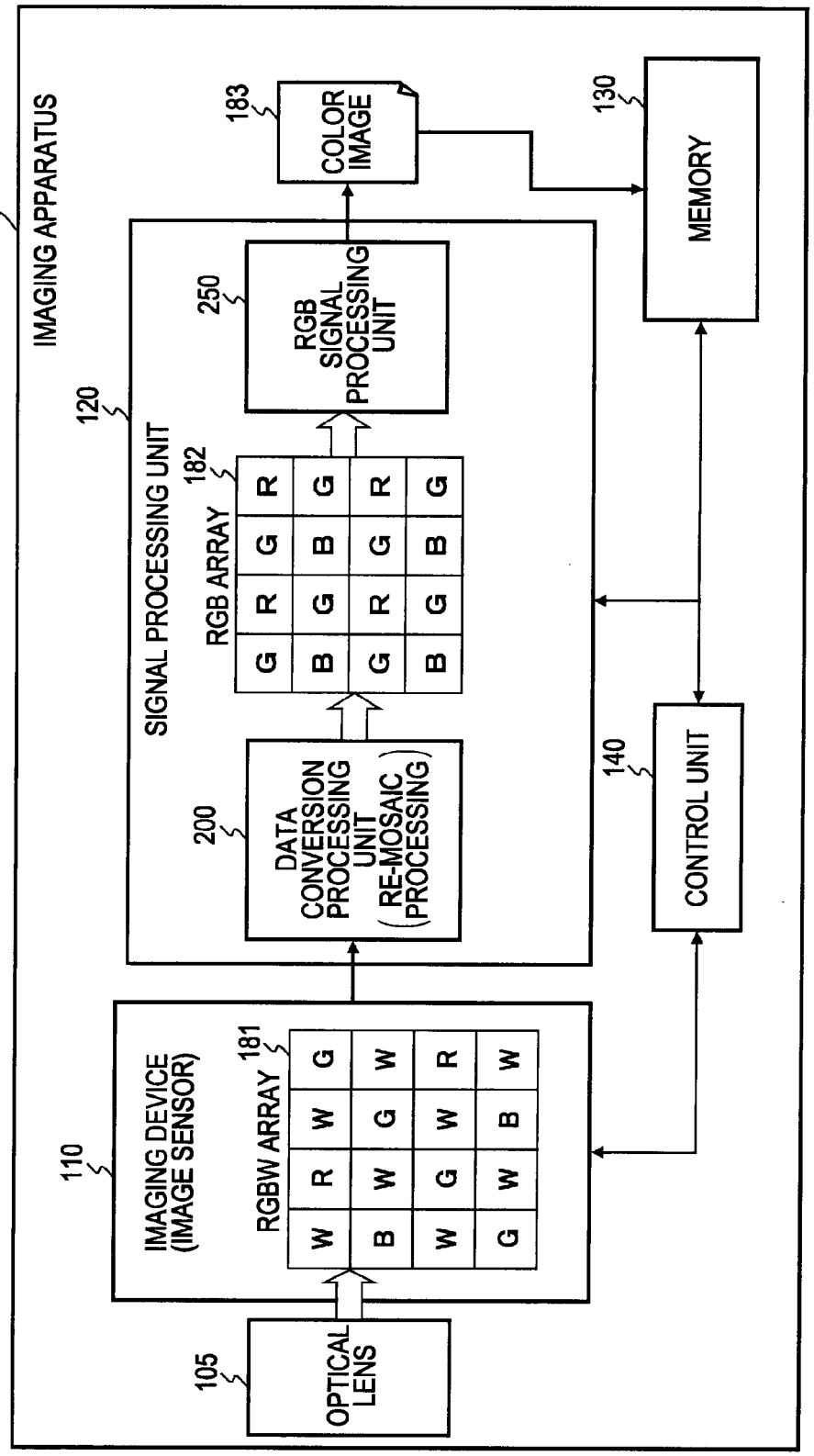
FIG. 3 is a diagram for describing a configuration example of an imaging apparatus according to an embodiment of the present invention.

The image processing device, image processing method, and program, according to an embodiment of the present invention, will be described below with reference to the drawings. Note that description will proceed as follows.
1. Overview of Processing
2. Configuration Example of Imaging Apparatus and Image Processing Device, and Processing Example
3. Details of Processing with Data Conversion Processing Unit
3-1. About Processing with Edge Detection Unit
3-2. About Processing with Blurring Correction Processing Unit
3-3. About Processing with Color Correlation Re-mosaic Processing Unit (data conversion unit)
4. Embodiment of Performing Demosaic Processing on RGBW Array Signals
5. Advantages of Processing According to Embodiments

1. Overview of Processing

First, the overview of processing which an image processing device such as the imaging apparatus according to an embodiment of the present invention executes will be described with reference to FIG. 2. The image processing device according to the embodiment of the present invention performs processing on data acquired by an imaging device (image sensor) which has, in addition to an RGB filter which selectively transmits light of wavelengths of each color of R, G, and B, an RGBW type color filter including white (W) which transmits all light of wavelengths of the colors R, G, and B.

This image processing device executes processing to convert data acquired with an imaging device (image sensor) having an RGBW type color filter including white (W) such as indicated by (1) in FIG. 2, into an RGB array (Bayer array) such as indicated by (2) in FIG. 2. Further, at the time of this conversion processing, processing is also performed to reduce occurrence of blurring and false color.

As shown in FIG. 2, processing is performed wherein at least part of the RGBW pixels set in the RGBW color array are converted or corrected to another color (one of R, G, and B). Specifically, the following five kinds of conversion or correction processing are executed in the conversion processing from the RGBW array to RGB Bayer array.

Converting W-pixel position to G-pixel (estimating G-pixel value) (GonW)

Converting G-pixel position to R-pixel (estimating R-pixel value) (RonG)

Converting G-pixel position to B-pixel (estimating B-pixel value) (BonG)

Converting R-pixel position to R-pixel (correcting R-pixel value) (RonR)

Converting B-pixel position to B-pixel (correcting B-pixel value) (BonB)

Each conversion processing above is performed as pixel value estimation or correction processing for converting the RGBW pixels in the RGBW array to RGB pixels in an RGB array. Executing this processing generates the RGB Bayer array indicated by (2) in FIG. 2 from the RGBW color array indicated by (1) in FIG. 2. Hereinafter, this sort of color array conversion processing will be referred to as "re-mosaic processing".

In the following embodiment, description will be made regarding a configuration to perform re-mosaic processing to convert the RGBW-type color array having white (W) into an RGB-type color array (Bayer array), and reduce occurrence of blurring and false color at the time of this re-mosaic processing.

2. Configuration Example of Imaging Apparatus and Image Processing Device, and Processing Example A configuration example of an imaging apparatus and image processing device according to an embodiment of the invention, and a processing example thereof, will be described with reference to FIGS. 3 and 4. FIG. 3 is a diagram for describing a configuration example of an imaging apparatus 100 according to an embodiment of the present invention. The imaging apparatus 100 includes an optical lens 105, an imaging device (image sensor) 110, a signal processing unit 120, memory 130, and a control unit 140.

Note that the imaging apparatus is one form of the image processing device. The image processing device encompasses devices such as PCs and so forth. In the event that a PC or the like is the image processing device, the image processing device does not have the optical lens 105 or imaging device 110 of the imaging apparatus 100 shown in FIG. 3, and is configured of the other components so as to have a configuration with an input unit and storage unit for the data acquired by the imaging device 110. Specific examples of the imaging apparatus 100 are still cameras, video cameras, and so forth, with the imaging apparatus 100 including an information processing device such as a PC capable of image processing.

Figures 1A, 1B:
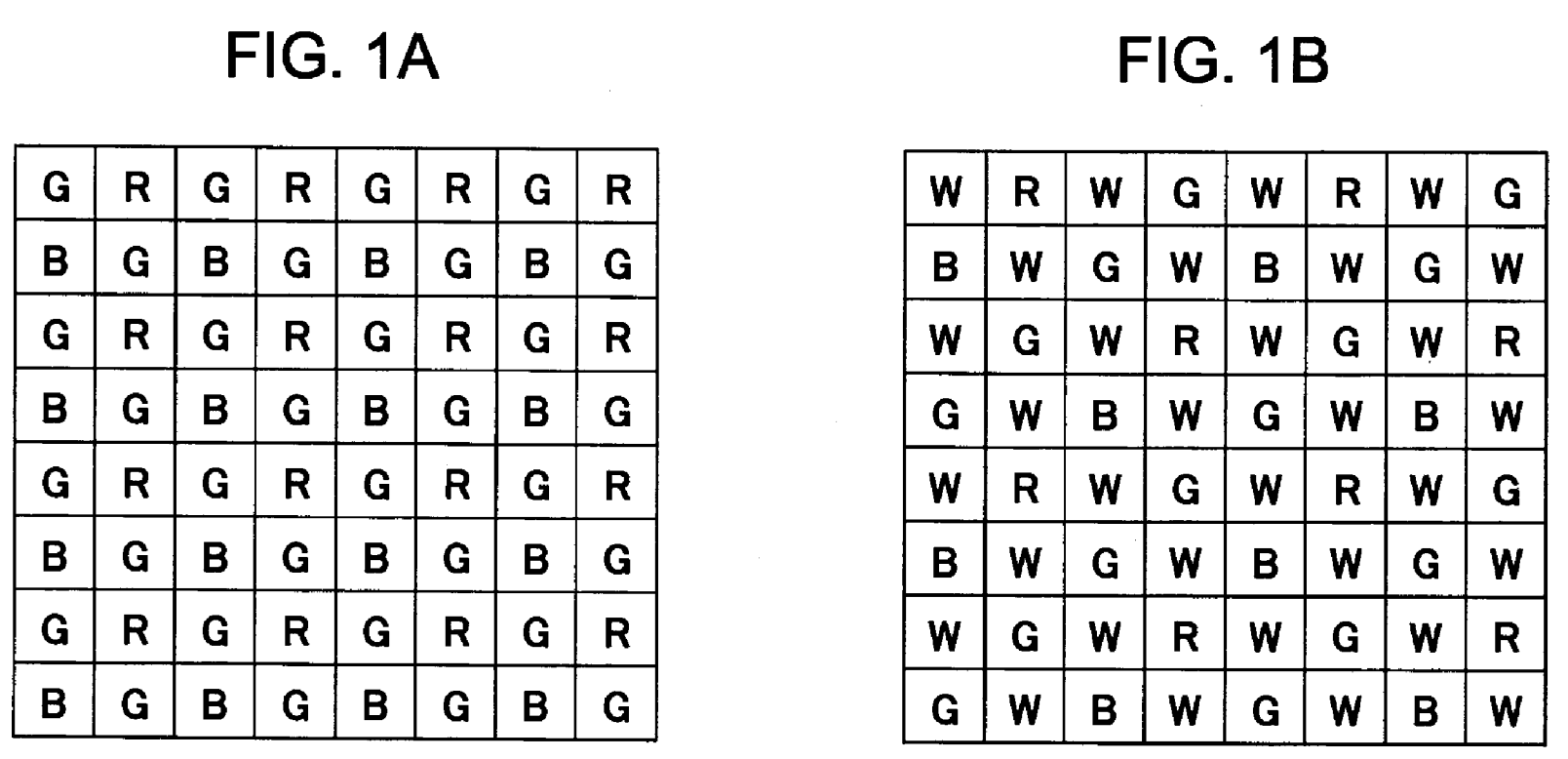

Now, the imaging apparatus 100 will be described as a representative example of the image processing device according to an embodiment of the present invention. The imaging device (image sensor) 110 shown in FIG. 3 is of a configuration having a filter with an RGBW array 181 including white (W) which has been described with reference to FIG. 1B and (1) in FIG. 2. That is to say, the imaging device has a filter having the four types of spectral properties of red (R), transmitting wavelengths around the color red, green (G), transmitting wavelengths around the color green, blue (B), transmitting wavelengths around the color blue, and further white (W), which transmits all of R, G, and B.

The imaging device 110 which has the RGBW array 181 filter receives light of one of R, G, B, and W, via the optical lens 105, in increments of pixels, and generates and outputs electric signals corresponding to the intensity of received light by photoelectric conversion. This imaging device 110 yields a mosaic image made up of the four components of R, G, B, and W.

The output signals of the imaging device (image sensor) 110 are input to a data conversion processing unit 200 of the signal processing unit 120. The data conversion processing unit 200 performs conversion processing from the RGBW array 181 to an RGB array 182, as described with reference to FIG. 2 earlier. At the time of this conversion processing, as described earlier, the following five kinds of conversion or correction processing are executed.

Converting W-pixel position to G-pixel (estimating G-pixel value) (GonW)

Converting G-pixel position to R-pixel (estimating R-pixel value) (RonG)

Converting G-pixel position to B-pixel (estimating B-pixel value) (BonG)

Converting R-pixel position to R-pixel (correcting R-pixel value) (RonR)

Converting B-pixel position to B-pixel (correcting B-pixel value) (BonB)

Further, processing for suppressing false color and blurring is performed at the time of this conversion/correction processing.

The RGB array 182 which the data conversion processing unit 200 has generated, i.e., the data having the Bayer array, is data having a color array obtained by an imaging device of a camera or the like according to the related art. This color array data is input to an RGB signal processing unit 250. The RGB signal processing unit 250 executes processing in the same way with a signal processing unit provided to a camera or the like according to the related art. Specifically, the RGB signal processing unit 250 performs demosaic processing, white balance adjustment processing, γ correction processing, and so forth, to generate a color image 183. The generated color image 183 is stored in memory 130.

The control unit 140 executes this series of processing. For example, a program which cases execution of the series of processing is stored in the memory 130, and the control unit 140 controls the series of processing by executing the program read out from the memory 130.

Detailed configuration of the data conversion processing unit 200 will be described with reference to FIG. 4. The data conversion processing unit 200 executes conversion processing from the RGBW color array to the RGB array 182. Further, processing for suppressing false color and blurring is performed at the time of this processing.

As shown in FIG. 4, the data conversion processing unit 200 has a line memory 201, an edge detecting unit 202, a blurring correction processing unit 203, and a color correlation re-mosaic processing unit (data conversion unit) 210. The color correlation re-mosaic processing unit (data conversion unit) 210 has a W-position G-interpolation parameter calculation unit 211, a G-position RB-interpolation parameter calculation unit 212, an R-position R-interpolation parameter calculation unit 213, a B-position B-interpolation parameter calculation unit 214, and a weight adding processing unit 215.

The signals output from the imaging device 110 are temporarily stored in the line memory 201. The line memory 201 has seven horizontal lines worth line memory for the imaging device, and seven horizontal lines with of data are sequentially output in parallel from the line memory 201. The output destinations are the edge detecting unit 202, blurring correction processing unit 203, and color correlation re-mosaic processing unit 210. Seven lines at a time of imaged data of the RGBW array 181 are output to these processing units.

The edge detecting unit 202 and blurring correction processing unit 203 execute processing using only the white (W) signal out of the imaged data of the RGBW array 181. The color correlation re-mosaic processing unit 210 executes processing using all of the R, G, B, and W signals of the imaged data of the RGBW array 181.

Note that the data output mode from the line memory 201 is one of the two following modes, for example.

One mode is for all RGBW imaged data of the RGBW array 181 to be output to each of the edge detecting unit 202, blurring correction processing unit 203, and color correlation re-mosaic processing unit 210, in increments of seven lines.

The second mode is for only the W signals in the RGBW array 181 to be supplied to the edge detecting unit 202 and blurring correction processing unit 203. For example, signals may be supplied wherein all RGB signals are set to 0. In this case, an arrangement is made wherein, for example, an output control unit is configured at the output unit of the line memory 201, with signals being supplied to the edge detecting unit 202 and blurring correction processing unit 203 with all signal values other than W signals having been set to 0.

The edge detecting unit 202 verifies the discrete white (W) signals included in the output signals from the line memory 201, generates edge information including the edge direction and edge intensity, for example, included in the image, and outputs the edge information to the color correlation re-mosaic processing unit 210.

The blurring correction processing unit 203 verifies the discrete white (W) signals included in the output signals from the line memory 201, performs processing for reducing image blurring, and calculates blurring-corrected white (W) signals Wd corresponding to all pixels obtained as the result of the processing. That is to say, the blurring correction processing unit 203 verifies the discrete white (W) signals, analyzes the way in which blurring is occurring, generates blurring-corrected white (W) signals Wd corresponding to all pixels with blurring suppressed, and outputs to the color correlation re-mosaic processing unit 210.

The color correlation re-mosaic processing unit 210 inputs the RGBW signals in the output signals from the line memory 201, the edge information output from the edge detecting unit 202, and the blurring-corrected white (W) signals Wd corresponding to all pixels output from the blurring correction processing unit 203. The color correlation re-mosaic processing unit 210 then uses this information to execute conversion processing from the RGBW color array to the RGB array 182.

Specifically, as described with reference to FIG. 2 earlier, the following five kinds of conversion or correction processing are executed.
Converting W-pixel position to G-pixel (estimating G-pixel value) (GonW)
Converting G-pixel position to R-pixel (estimating R-pixel value) (RonG)
Converting G-pixel position to B-pixel (estimating B-pixel value) (BonG)
Converting R-pixel position to R-pixel (correcting R-pixel value) (RonR)
Converting B-pixel position to B-pixel (correcting B-pixel value) (BonB)

The W-position G-interpolation parameter calculation unit 211 calculates interpolation parameters to be applied to calculation of G pixel values to be set in W-pixel positions in the RGBW array 181. These are interpolation parameters to be applied to the processing of GonW shown above. Specifically, the W-position G-interpolation parameter calculation unit 211 uses the W signals and G signals in the input signals from the line memory 201, and the blurring-corrected W signals Wd input from the blurring correction processing unit 203, to calculate the signal values of G signals with blurring correction Gd, and
G signals without blurring correction Gl.

These signal values are interpolation parameters to be applied to G-pixel value calculation for setting the W-pixel positions in the RGBW array 181 to G pixels in the RGB array 182 (GonW interpolation parameters).

The G-position RB-interpolation parameter calculation unit 212 calculates interpolation parameters to be applied to calculation of R pixel values or B pixel values to be set in G-pixel positions in the RGBW array 181. These are interpolation parameters to be applied to the processing of RonG and BonG shown above. Specifically, the G-position RB-interpolation parameter calculation unit 212 uses the G signals and R signals in the input signals from the line memory 201, and the blurring-corrected W signals Wd input from the blurring correction processing unit 203, to calculate the signal values of R signals with blurring correction Rd, and
R signals without blurring correction Rl.

These signal values are interpolation parameters to be applied to R-pixel value calculation for setting the G-pixel positions in the RGBW array 181 to R pixels in the RGB array 182 (RonG interpolation parameters).

The G-position RB-interpolation parameter calculation unit 212 further uses the G signals and B signals in the input signals from the line memory 201, and the blurring-corrected W signals Wd input from the blurring correction processing unit 203, to calculate the signal values of B signals with blurring correction Bd, and
B signals without blurring correction Bl.

These signal values are interpolation parameters to be applied to B-pixel value calculation for setting the G-pixel positions in the RGBW array 181 to B pixels in the RGB array 182 (BonG interpolation parameters).

The R-position R-interpolation parameter calculation unit 213 calculates interpolation parameters to be applied to calculation of corrected R pixel values to be set in R-pixel positions in the RGBW array 181. These are parameters to be applied to the processing of RonR shown above. Specifically, the R-position R-interpolation parameter calculation unit 213 uses the R signals and W signals in the input signals from the line memory 201, and the blurring-corrected W signals Wd input from the blurring correction processing unit 203, to calculate the signal values of R signals with blurring correction Rd, and
R signals without blurring correction Rl.

These signal values are interpolation parameters to be applied to R-pixel value correction processing for setting the R-pixel positions in the RGBW array 181 to corrected R pixels in the RGB array 182 (RonR interpolation parameters).

The B-position B-interpolation parameter calculation unit 214 calculates interpolation parameters to be applied to calculation of corrected B pixel values to be set in B-pixel positions in the RGBW array 181. These are parameters to be applied to the processing of BonB shown above. Specifically, the B-position B-interpolation parameter calculation unit 214 uses the W signals and B signals in the input signals from the line memory 201, and the blurring-corrected W signals Wd input from the blurring correction processing unit 203, to calculate the signal values of B signals with blurring correction Bd, and
B signals without blurring correction Bl.

These signal values are interpolation parameters to be applied to B-pixel value correction processing for setting the B-pixel positions in the RGBW array 181 to corrected B pixels in the RGB array 182 (BonB interpolation parameters).

The weight adding processing unit 215 applies the edge information input from the edge detecting unit 202 to calculate weight average values Gr, Rr, and Br, for blurring-corrected signals Gd, Rd, and Bd, and
blurring-uncorrected signals Gl, Rl, and Bl.

The Gr, Rr, and Br calculated by the weight adding processing unit 215 correspond to the RGB signal values of each of the pixels making up the RGB array (Bayer array) 182. Thus, a RGB array (Bayer array) 182 made up of the Gr, Rr, and Br calculated by the weight adding processing unit 215 is generated, and provided to the RGB signal processing unit 250.

The RGB signal processing unit 250 is similar to a signal processing unit handling RGB array (Bayer array) signals which a common camera or image processing device has. The RGB signal processing unit 250 subjects the RGB array (Bayer array) 182 output from the weight adding processing unit 215 to signal processing and generates the color image 183 (see FIG. 3). Specifically, the RGB signal processing unit 250 performs white balance adjustment processing, demosaic processing, shading processing, RGB color matrix processing, γ correction processing, and so forth, to generate the color image 183.

3. Details of Processing with Data Conversion Processing Unit

Next, the details of processing, which the processing units making up the data conversion processing unit 200 shown in FIG. 4 execute, will be described.

3-1. About Processing with Edge Detection Unit

First, description will be made regarding the details of the processing of the edge detecting unit 202 within the data conversion processing unit 200 shown in FIG. 4. The edge detecting unit 202 verifies the discrete white (W) signals included in the output signals from the line memory 201, and generates edge information of the image, specifically edge information including edge direction and edge intensity for example, and outputs to the color correlation re-mosaic processing unit 210.

A method for determining the edge direction and edge intensity using W pixels, which the edge detecting unit 202 executes, will now be described with reference to FIG. 5A and subsequent drawings.

The edge detecting unit 202 uses only the white (W) signal in the signals of the RGBW array 181 input from the line memory 201 to determining the edge direction and edge intensity. Of the RGBW array data, signal values and position information of at least W are input from the line memory 201 in increments of seven horizontal lines. The edge detecting unit 202 executes edge detection processing in increments of 7×7 pixel regions of the input data. The edge detecting unit 202 sequentially shifts the 7×7 pixel regions one pixel at a time to execute edge detection processing. Processing on one 7×7 pixel region yields edge information (edge direction and edge intensity) corresponding to the center pixel of the 7×7 pixel region. Edge information corresponding to each pixel is output to the color correlation re-mosaic processing unit 210.

Various techniques may be applied to edge detection processing. One of the techniques will be described with reference to FIGS. 5A through 6B. In the technique described below, 4×4 pixels near the center of the 7×7 pixel region are used.

Figure 5A:
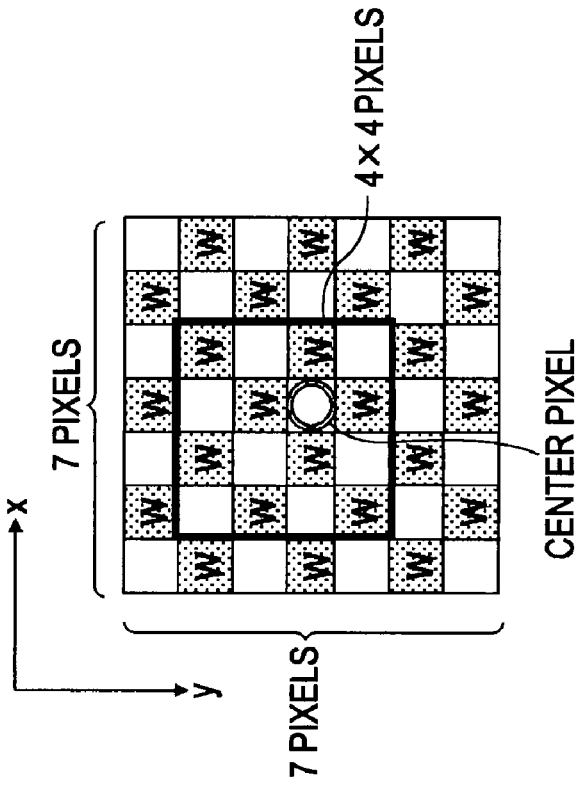
FIGS. 5A and 5B are diagrams for describing an edge direction and edge intensity determination method using W pixels, which an edge detecting unit performs.
Figure 5B:
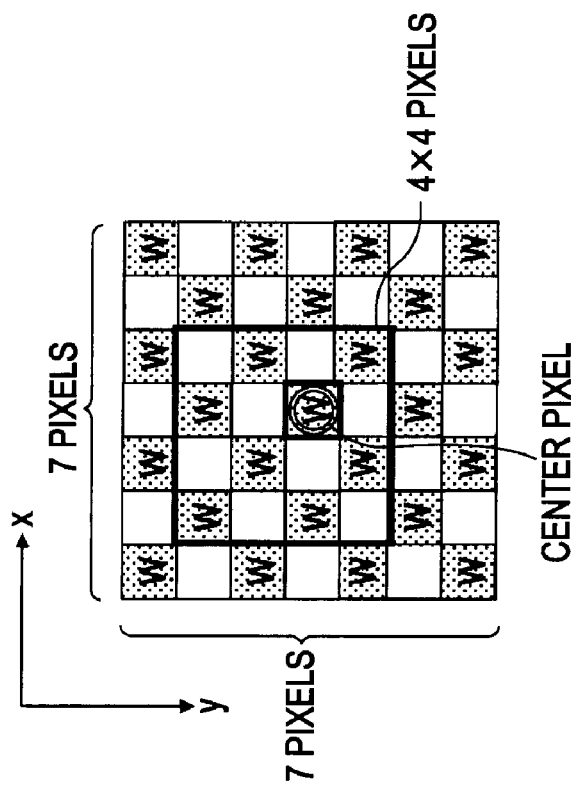

The center pixel of the 7×7 pixels to be processed may be a W pixel, as in the case shown in FIG. 5A, or may be other than a W pixel, as in the case shown in FIG. 5B. Note that in FIGS. 5A and 5B, the grayed pixels represent W pixels, and other pixels are R, G, or B pixels. Different calculation expressions are used for the two cases in FIGS. 5A and 5B to perform edge determination processing, in which the edge direction is one of the four of horizontal, vertical, upper-right oblique, and upper-left oblique, and also the intensity thereof is estimated.

Figure 6A:
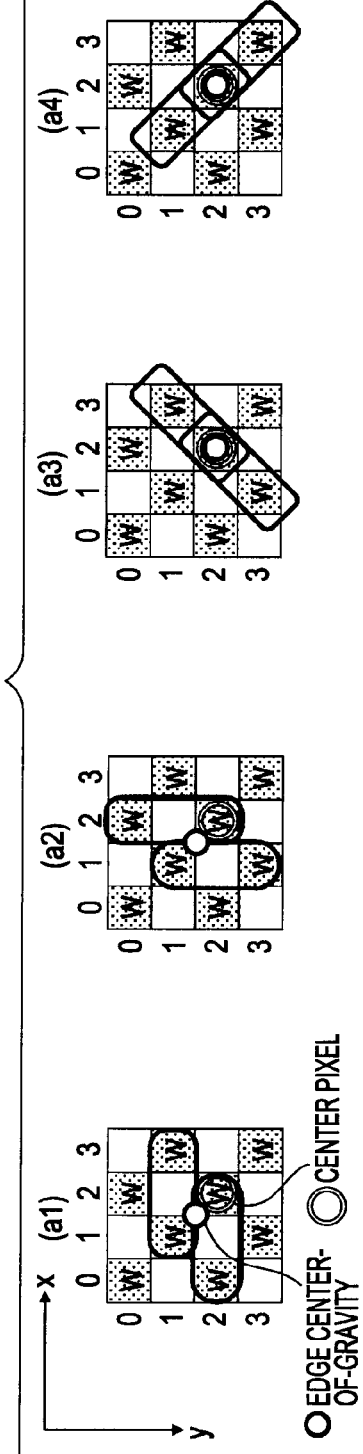
FIGS. 6A and 6B are diagrams for describing an edge direction and edge intensity determination method using W pixels, which the edge detecting unit performs.
Figure 6B:
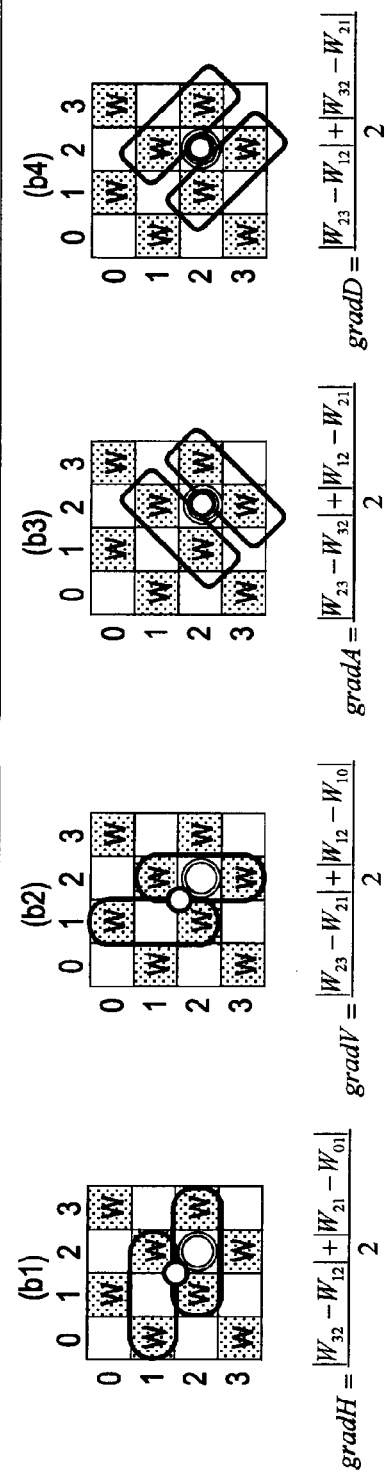

Specific processing will be described with reference to FIGS. 6A and 6B. FIGS. 6A and 6B illustrate calculation expressions to be applied for processing to determine the edge direction and edge intensity for the case shown in FIG. 6A where the center pixel is a W pixel, and the case shown in FIG. 6B where the center pixel is other than a W pixel. The calculation expressions to be applied are expressions for calculating the gradient of pixel values in a particular direction in the image, for calculating the following values.

gradH: average of absolute values of gradient in horizontal direction gradV: average of absolute values of gradient in vertical direction gradA: average of absolute values of gradient in upper right oblique direction gradD: average of absolute values of gradient in upper left oblique direction The gradH, gradV, gradA, and gradD are equivalent to the average of absolute values of gradient (difference) of pixel values in each of the different directions. Specific calculation processing thereof will now be described.

Processing in Case that Center Pixel is W Pixel

First, description will be made regarding processing in the case shown in FIG. 6A where the center pixel is a W pixel. FIG. 6A illustrates an example of calculation processing for gradH, gradV, gradA, and gradD in the event that a W pixel is the center pixel in each of (1) through (4), respectively. Note that in the drawings, the double circle represents the center pixel position of the 7×7 pixels, and the heavy single circle represents the center-of-gravity position of the edge.

In the event that the center pixel is a W pixel, gradH, gradV, gradA, and gradD are calculated by the following calculation expressions.

$$gradH = \frac{|W_{22} - W_{02}| + |W_{31} - W_{11}|}{2}$$

$$gradV = \frac{|W_{22} - W_{20}| + |W_{13} - W_{11}|}{2}$$

$$gradA = \frac{|W_{22} - W_{31}| + |W_{13} - W_{22}|}{2}$$

$$gradD = \frac{|W_{22} - W_{11}| + |W_{33} - W_{22}|}{2}$$

Note that Wxy represents the W pixel value at an x-y coordinate position in a coordinate system as shown in FIGS. 6A and 6B in which the coordinates at the upper left pixel of 4×4 pixels is (0, 0) and the coordinates at the lower right pixel is (3, 3), with (x) representing the horizontal direction, and (y) representing the vertical direction.

Of these, gradH is the average of absolute values of gradient in the horizontal direction, corresponding to the average value of absolute values of difference of W pixels adjacent in the horizontal direction. As shown in (1) in FIG. 6A, the average value of absolute values of difference of two W pixels adjacent in the horizontal direction in two horizontal lines at the middle portion of the 4×4 pixel region is calculated as gradH.

Also, gradV is the average of absolute values of gradient in the vertical direction, corresponding to the average value of absolute values of difference of W pixels adjacent in the vertical direction. As shown in (2) in FIG. 6A, the average value of absolute values of difference of two W pixels adjacent in the vertical direction in two vertical lines at the middle portion of the 4×4 pixel region is calculated as gradV.

Further, gradA is the average of absolute values of gradient in the upper right oblique direction, corresponding to the average value of absolute values of difference of W pixels adjacent in the upper right oblique direction. As shown in (3) in FIG. 6A, the average value of absolute values of difference of two W pixels adjacent in the upper right oblique direction in one upper right oblique line at the middle portion of the 4×4 pixel region is calculated as gradA.

Moreover, gradD is the average of absolute values of gradient in the upper left oblique direction, corresponding to the average value of absolute values of difference of W pixels adjacent in the upper left oblique direction. As shown in (4) in FIG. 6A, the average value of absolute values of difference of two W pixels adjacent in the upper left oblique direction in one upper left oblique line at the middle portion of the 4×4 pixel region is calculated as gradD.

The greater the average of absolute values of gradient in the horizontal direction gradH is, the higher the probability is that the edge intensity in the vertical direction is great. Also, the greater the average of absolute values of gradient in the vertical direction gradV is, the higher the probability is that the edge intensity in the horizontal direction is great. Further, greater the average of absolute values of gradient in the upper right oblique direction gradA is, the higher the probability is that the edge intensity in the upper left oblique direction is great. Moreover, greater the average of absolute values of gradient in the upper left oblique direction gradD is, the higher the probability is that the edge intensity in the upper right oblique direction is great. Thus, the edge direction and edge intensity can be determined based on the calculation values of gradH, gradV, gradA, and gradD.

Processing in Case that Center Pixel is Other than a W Pixel

Next, description will be made regarding the case shown in FIG. 6B where the center pixel is other than a W pixel. FIG. 6B illustrates an example of calculation processing for gradH, gradV, gradA, and gradD in the event that other than a W pixel is the center pixel in each of (1) through (4), respectively. Note that in the drawings, the double circle represents the center pixel position of the 7×7 pixels, and the heavy single circle represents the center-of-gravity position of the edge.

In the event that the center pixel is other than a W pixel, gradH, gradV, gradA, and gradD are calculated by the following calculation expressions.

$$gradH = \frac{|W_{32} - W_{12}| + |W_{21} - W_{01}|}{2}$$

$$gradV = \frac{|W_{23} - W_{21}| + |W_{12} - W_{10}|}{2}$$

$$gradA = \frac{|W_{23} - W_{32}| + |W_{12} - W_{21}|}{2}$$

$$gradD = \frac{|W_{23} - W_{12}| + |W_{32} - W_{21}|}{2}$$

Note that Wxy represents the W pixel value at an x-y coordinate position in a coordinate system as shown in FIGS. 6A and 6B in which the coordinates at the upper left pixel of 4×4 pixels is (0, 0) and the coordinates at the lower right pixel is (3, 3), with (x) representing the horizontal direction, and (y) representing the vertical direction.

Of these, gradH is the average of absolute values of gradient in the horizontal direction, corresponding to the average value of absolute values of difference of W pixels adjacent in the horizontal direction. As shown in (1) in FIG. 6B, the average value of difference of two W pixels adjacent in the horizontal direction in two horizontal lines at the middle portion of the 4×4 pixel region is calculated as gradH.

Also, gradV is the average of absolute values of gradient in the vertical direction, corresponding to the average value of absolute values of difference of W pixels adjacent in the vertical direction. As shown in (2) in FIG. 6B, the average value of difference of two W pixels adjacent in the vertical direction in two vertical lines at the middle portion of the 4×4 pixel region is calculated as gradV.

Further, gradA is the average of absolute values of gradient in the upper right oblique direction, corresponding to the average value of absolute values of difference of W pixels adjacent in the upper right oblique direction. As shown in (3) in FIG. 6B, the average value of difference of two W pixels adjacent in the upper right oblique direction in two upper right oblique lines at the middle portion of the 4×4 pixel region is calculated as gradA.

Moreover, gradD is the average of absolute values of gradient in the upper left oblique direction, corresponding to the average value of absolute values of difference of W pixels adjacent in the upper left oblique direction. As shown in (4) in FIG. 6B, the average value of difference of two W pixels adjacent in the upper left oblique direction in two upper left oblique lines at the middle portion of the 4×4 pixel region is calculated as gradD.

The greater the average of absolute values of gradient in the horizontal direction gradH is, the higher the probability is that the edge intensity in the vertical direction is great. Also, the greater the average of absolute values of gradient in the vertical direction gradV is, the higher the probability is that the edge intensity in the horizontal direction is great. Further, greater the average of absolute values of gradient in the upper right oblique direction gradA is, the higher the probability is that the edge intensity in the upper left oblique direction is great. Moreover, greater the average of absolute values of gradient in the upper left oblique direction gradD is, the higher the probability is that the edge intensity in the upper right oblique direction is great.

Thus, the edge direction and edge intensity can be estimated based on calculation values of the values gradH, gradV, gradA, and gradD. The edge detecting unit 202 obtains the edge information (edge direction and edge intensity) corresponding to each pixel based on the values of gradH, gradV, gradA, and gradD. The obtained edge information is output to the color correlation re-mosaic processing unit 210.

Note that the method for detecting edge direction and intensity described above is only an example, and a configuration may be made wherein other edge detection methods are used. For example, the edge detection method described with reference to FIGS. 6A and 6B uses particular pixel value information for an extremely narrow range, and accordingly erroneous determination can be expected in the event that noise is great. An edge information obtaining processing example in which such erroneous determination is avoided will be described with reference to FIGS. 7A and 7B.

Figure 7A:
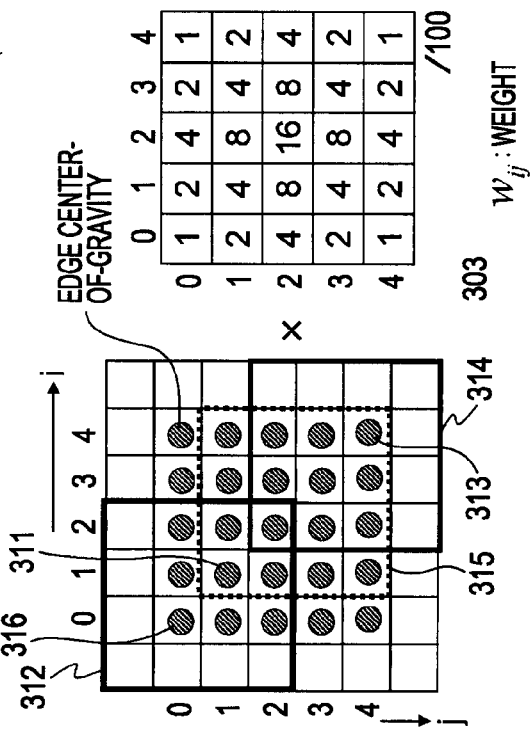
FIGS. 7A and 7B are diagrams for describing an edge direction and edge intensity determination method using W pixels, which the edge detecting unit performs.
Figure 7B:
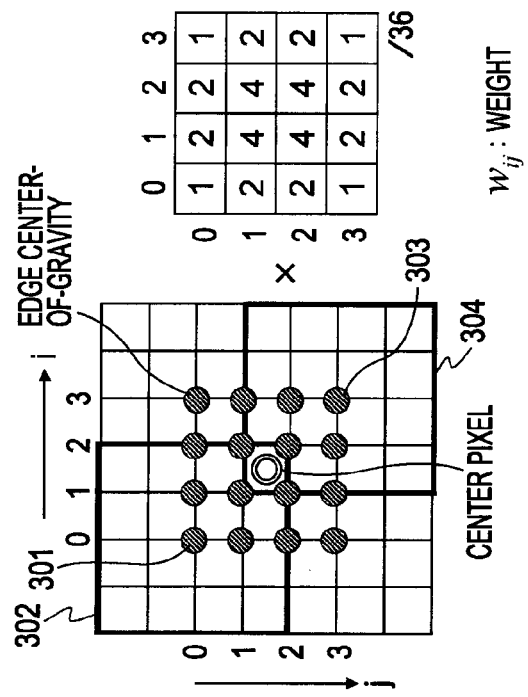

The edge information obtaining processing example illustrated in FIGS. 7A and 7B is a technique using processing for weight adding of the average of absolute value of gradient, which is the calculated value described with reference to FIGS. 6A and 6B. Shown are a horizontal/vertical component edge information obtaining processing example, in FIG. 7A, and an oblique component edge information obtaining processing example, in FIG. 7B.

FIGS. 7A and 7B illustrate 7×7 pixel image data. This data is data to be processed by the edge detecting unit 202, and is data in which only the white pixel values are discreetly arrayed, as with the case in FIGS. 6A and 6B. Edge information (edge direction and edge intensity) corresponding to the center pixel positioned at the center of the 7×7 pixels is to be obtained.

First, the horizontal/vertical component edge information obtaining processing example in FIG. 7A will be described. FIG. 7A shows 16 edge centers-of-gravity. These correspond to the edge centers-of-gravity in (1) and (2) in FIG. 6A and (1) and (2) in FIG. 6B, and more specifically correspond to the edge centers-of-gravity for calculating the values of gradH (average of absolute values of gradient in horizontal direction) and gradV (average of absolute values of gradient in vertical direction).

The 4×4 pixel regions shown in (1) and (2) in FIG. 6A and (1) and (2) in FIG. 6B are set to the 7×7 pixel region shown in FIG. 7A. There are 16 settable 4×4 pixel regions, from the 4×4 pixel region 302 shown at the upper left corner, to the 4×4 pixel region 304 shown at the lower right corner. The 16 edge centers-of-gravity shown in FIG. 7A are the edge centers-of-gravity corresponding to these 16 4×4 pixel regions, i.e., the edge centers-of-gravity the same as those shown in (1) and (2) in FIG. 6A and (1) and (2) in FIG. 6B.

A scale of 0, 1, 2, and 3, shown in FIG. 7A, is set with the horizontal axis as i and the vertical axis as j, and representing the coordinate position of the edge center-of-gravity as (i, j), means that the edge center-of-gravity (0, 0) 301 is an edge center-of-gravity corresponding to the 4×4 pixel region 302. With the 4×4 pixel region 302 as the 4×4 pixel regions shown in (1) and (2) in FIG. 6A and (1) and (2) in FIG. 6B, the edge center-of-gravity (0, 0) 301 corresponds to the centers-of-gravity shown in (1) and (2) in FIG. 6A and (1) and (2) in FIG. 6B.

Also, the edge center-of-gravity (3, 3) 303 is an edge center-of-gravity set corresponding to the 4×4 pixel region 304. With the 4×4 pixel region 304 as the 4×4 pixel regions shown in (1) and (2) in FIG. 6A and (1) and (2) in FIG. 6B, the edge center-of-gravity (3, 3) 303 corresponds to the centers-of-gravity shown in (1) and (2) in FIG. 6A and (1) and (2) in FIG. 6B.

16 sets of 4×4 pixel regions and edge centers-of-gravity are set for the 7×7 pixel region shown in FIG. 7A. Using the calculation expressions described with reference to (1) and (2) in FIG. 6A and (1) and (2) in FIG. 6B for these 16 sets allows 16 values to be calculated for each of gradH (average of absolute values of gradient in horizontal direction) and gradV (average of absolute values of gradient in vertical direction).

The average of absolute values of gradient gradH and gradV calculated using the 4×4 pixel regions corresponding to the edge center-of-gravity (i, j) will be written as $gradH_{i,j}$ and $gradV_{i,j}$, respectively. These are used to calculate weight-added values of the average of absolute values of gradients dirH (horizontal gradient information) and dirV (vertical gradient information) using the following calculation expressions $$dirH = \frac{\sum_{i,j} w_{i,j} \cdot gradH_{i,j}}{\sum_{i,j} w_{ij}}, \quad dirV = \frac{\sum_{i,j} w_{i,j} \cdot gradV_{i,j}}{\sum_{i,j} w_{i,j}}$$

where $w_{i,j}$ is a weight coefficient corresponding to the edge center-of-gravity at the position (i, j). A weight coefficient is set as a coefficient where the center portion is greater and the surrounding portion is set smaller, as shown in FIG. 7A, for example. FIG. 7A shows an example where weight coefficients of 4/36 through 1/36 have been correlated with the 16 edge centers-of-gravity, as an example of weight coefficients.

Next, the oblique component edge information obtaining processing example in FIG. 7B will be described. FIG. 7B shows 25 edge centers-of-gravity. These correspond to the edge centers-of-gravity in (3) and (4) in FIG. 6A and (3) and (4) in FIG. 6B, and more specifically correspond to the edge centers-of-gravity for calculating the values of gradA (average of absolute values of gradient in upper right oblique direction) and gradD (average of absolute values of gradient in upper left oblique direction).

The 4×4 pixel regions shown in (3) and (4) in FIG. 6A and (3) and (4) in FIG. 6B are set to the 7×7 pixel region shown in FIG. 7B. There are 16 settable 4×4 pixel regions, from the 4×4 pixel region 312 shown at the upper left corner, to the 4×4 pixel region 314 shown at the lower right corner. Of the 25 edge centers-of-gravity shown in FIG. 7B, the 16 edge centers-of-gravity within the dotted rectangular frame 315 shown in FIG. 7B are the edge centers-of-gravity corresponding to these 16 4×4 pixel regions, i.e., the edge centers-of-gravity the same as those shown in (3) and (4) in FIG. 6A and (3) and (4) in FIG. 6B.

A scale of 0, 1, 2, 3, and 4, shown in FIG. 7B, is set with the horizontal axis as i and the vertical axis as j, and representing the coordinate position of the edge center-of-gravity as (i, j), means that the edge center-of-gravity (1, 1) 311 is an edge center-of-gravity corresponding to the 4×4 pixel region 312. With the 4×4 pixel region 312 as the 4×4 pixel regions shown in (3) and (4) in FIG. 6A and (3) and (4) in FIG. 6B, the edge center-of-gravity (1, 1) 311 corresponds to the centers-of-gravity shown in (3) and (4) in FIG. 6A and (3) and (4) in FIG. 6B.

Also, the edge center-of-gravity (4, 4) 313 is an edge center-of-gravity set corresponding to the 4×4 pixel region 314. With the 4×4 pixel region 314 as the 4×4 pixel regions shown in (3) and (4) in FIG. 6A and (3) and (4) in FIG. 6B, the edge center-of-gravity (4, 4) 313 corresponds to the centers-of-gravity shown in (3) and (4) in FIG. 6A and (3) and (4) in FIG. 6B.

FIG. 7B also shows edge centers-of-gravity on the outer side of the dotted line rectangular frame 315, which are the edge centers-of-gravity (i, j)=(0, 0) through (0, 4) and (1, 0) through (4, 0) at the position i=0 and j=0.

As shown in (3) and (4) in FIG. 6A and (3) and (4) in FIG. 6B, the pixels positions used for calculating the values of gradA (average of absolute values of gradient in upper right oblique direction) and gradD (average of absolute values of gradient in upper left oblique direction) are just the eight pixels around the edge center-of-gravity. Accordingly, gradA and gradV can be calculated even in the event that the edge center-of-gravity is at the position of i=0, j=0 as shown in FIG. 7B.

This means that gradA and gradD which can be calculated with edge centers-of-gravity set to different positions using the 7×7 pixel region are the 25 sets of data corresponding to the 25 edge center-of-gravity positions shown in FIG. 7B.

Using the calculation expressions described with reference to (3) and (4) in FIG. 6A and (3) and (4) in FIG. 6B for the 7×7 pixel region shown in FIG. 7B allows 25 values to be calculated for each of gradA (average of absolute values of gradient in upper right oblique direction) and gradD (average of absolute values of gradient in upper left oblique direction).

The average of absolute values of gradient gradA and gradD calculated using the 4×4 pixel regions corresponding to the edge center-of-gravity (i, j) will be written as $gradA_{i,j}$ and $gradD_{i,j}$, respectively. These are used to calculate weight-added values of the average of absolute values of gradients dirA (upper right oblique gradient information) and dirD (upper left oblique gradient information) using the following calculation expressions $$dirA = \frac{\sum_{i,j} w_{i,j} \cdot gradA_{i,j}}{\sum_{i,j} w_{ij}}, \quad dirD = \frac{\sum_{i,j} w_{i,j} \cdot gradD_{i,j}}{\sum_{i,j} w_{i,j}}$$

where $w_{i,j}$ is a weight coefficient corresponding to the edge center-of-gravity at the position (i, j).

A weight coefficient is set as a coefficient where the center portion is greater and the surrounding portion is set smaller, as shown in FIG. 7B, for example. FIG. 7B shows an example where weight coefficients of 16/100 through 1/100 have been correlated with the 25 edge centers-of-gravity, as an example of weight coefficients.

The edge information calculated by the processing described with reference to FIGS. 7A and 7B, i.e., dirH (horizontal gradient information), dirV (vertical gradient information), dirA (upper right oblique gradient information), and dirD (upper left oblique gradient information), are edge information calculated using the pixel value (W pixel value) of a great number of pixels included in the 7×7 pixel region. Accordingly, the probability of erroneous results due to noise or the like is smaller as compared with edge information calculated applying the pixel information of a smaller number of pixels, described with reference to FIGS. 6A and 6B. Note that the setting example of the weight coefficient $W_{ij}$ in the above expression and in FIGS. 7A and 7B is only an example, and that other averaged coefficients may be used as well.

The edge detecting unit 202 takes the maximum value of the dirH, dirV, dirA, and dirD, obtained in this way, as the edge intensity corresponding to the center pixel of the 7×7 pixels. The edge intensity is expressed as ratioFlat in the following expression.

$$\text{ratioFlat}=\max(dirH, dirV, dirA, dirD)$$

Further, the edge detecting unit 202 applies a preset non-linear function $f_{flat}$ to the above edge intensity (ratioFlat), and calculates a value weightFlat which indicates an index value of flatness with the following expression.

$$\text{Flatness(weightFlat)}=f_{flat}(\text{ratioFlat})$$

Figure 8:
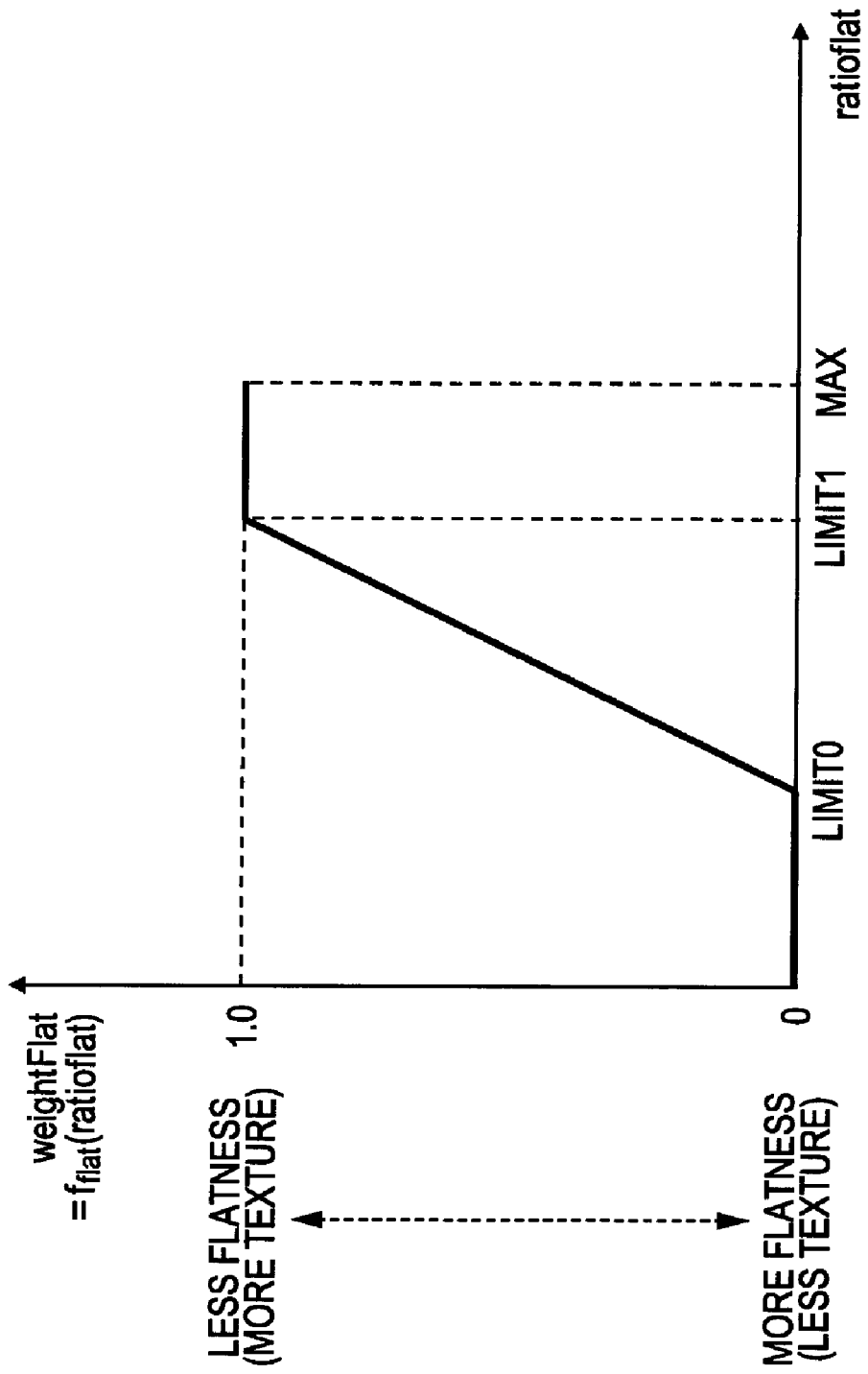
FIG. 8 is a diagram for describing flatness (weightFlat) information as an example of edge information.

As shown in FIG. 8, flatness (weightFlat) has a value of a range between 0 and 1, and is an index value of flatness indicating an image state such that the closer to 1, the less flatness (more texture), and the closer to 0, the more flatness (less texture).

As shown in FIG. 8, two predetermined threshold values Limit0 and Limit1 are used to calculate the flatness (weightFlat) as follows.

If $0 \leq \text{ratioFlat} < \text{Limit0}$, then weightFlat=0
If $\text{Limit0} \leq \text{ratioFlat} < \text{Limit1}$, then $0 \leq \text{weightFlat} \leq 1$
If $\text{Limit1} \leq \text{ratioFlat}$, then weightFlat=1

The edge detecting unit 202 outputs, for example, the above flatness (weightFlat) information to the color correlation re-mosaic processing unit 210 as edge information. Note that this flatness (weightFlat) information is an example of edge information which the edge detecting unit 202 outputs to the color correlation re-mosaic processing unit 210. Edge information which the edge detecting unit 202 outputs to the color correlation re-mosaic processing unit 210 is not restricted to this flatness (weightFlat) information, and may be the pixel value gradient information (gradH, gradV, gradA, gradD) described above with reference to FIGS. 6A and 6B. Alternatively, the edge information which the edge detecting unit 202 outputs to the color correlation re-mosaic processing unit 210 may be the weight-added values of the average of absolute values of gradients (dirH, dirV, dirA, dirD), described with reference to FIGS. 7A and 7B.

3-2. About Processing with Blurring Correction Processing Unit

Next, processing with the blurring correction processing unit 203 within the data conversion processing unit 200 shown in FIG. 4 will be described. However, before describing the processing of the blurring correction processing unit, aberration at the optical lens 105 upstream from the imaging device (image sensor) 110 will be described.

In the event that a signal exceeding the Nyquist frequency (½ frequency of the sampling frequency) of the imaging device (image sensor) 110 is included in the signals input to the imaging device (image sensor) 110, aliasing (also called folding noise) based on the sampling theorem can occur, causing deterioration in image quality. With the combination of optical lenses of the performance commonly used in many cameras according to the related art, and RGB Bayer array sensors thereof, the sampling rate is higher than the light collecting performance of the optical lens, so aliasing is seldom a problem.

However, in the event of using an imaging device 110 having the RGBW array 181 shown in FIG. 3, the sampling rate of the color components is half that of the RGB Bayer array, so there is a problem that false color due to aliasing occurs more readily. While false color can be suppressed by adding an optical low-pass filter between the imaging device 110 and the optical lens 105 so as to cut out signals exceeding the Nyquist frequency, there is a problem of increased costs.

Further, with the RGBW array described with reference to FIG. 1B and other drawings, the pixel distribution ratio differs for each of R, G, B, and W. That is to say, the Nyquist frequency differs for each wavelength, so if designed for the R signals or B signals with the lowest sampling rates for example, the high-frequency components of W signals and G signals are eliminated. On the other hand, in the event that the design is made for W signals with the highest sampling rate, intense aliasing occurs at the R signals and B signals.

To solve this issue, aberration design of the optical lens 105 is preferably performed so as to match the sampling rate of the sensor, so that aliasing does not occur at the color components. That is to say, occurrence of aliasing can be suppressed by designing the lens aberration for the sampling rate for each color component so as to blur the input signals.

Further, using an optical lens 105 with great lens aberration can suppress false color be reducing changing in color ratio at local regions. Particularly, with the color correlation re-mosaic processing unit 210 of the image processing device according to an embodiment of the present invention, interpolation parameter Gd, Rd, and Bd signals, and so forth, are generated, and signal conversion using the interpolation parameter Gd, Rd, and Bd signals is performed at the time of conversion from the RGBW array to the RGB array. In this case, any aliasing present can readily result in false color, due to erroneous estimation of the interpolation parameter Gd, Rd, and Bd signals.

Accordingly, with the image processing device (imaging apparatus) according to an embodiment of the present invention, an optical lens 105 is used in which the lens aberration matches the sampling rate for each color component. With this setting, occurrence of aliasing is suppressed, estimation of the interpolation parameters such as the Gd, Rd, and Bd signals and so forth at the color correlation re-mosaic processing unit 210 is correctly performed, and occurrence of false color can be suppressed. Specifically, an optical lens is used which has lens aberration wherein signal components exceeding the Nyquist frequency for the same color component are not generated.

Note that using an optical lens 105 with aberration raised to suppress aliasing of color components means that there is similar aberration in the W component which is the added result of the R, G, and B wavelengths, resulting in a blurred image. It is desirable for the W component in the RGBW array in FIG. 1B to have a higher sampling rate than the RGB color components, and have high resolution properties since it serves as a luminance reference signal.

To satisfy this, with the image processing device according to an embodiment of the present invention, blurring correction processing based on the aberration information or the optical lens as to the W component is performed at the blurring correction processing unit 203. Due to this processing, high resolution properties can be realized, and also an image with little false color can be obtained. Note that in the event that the signal excessively deteriorates due to lens aberration, the signal component becomes buried in noise, and becomes irreproducible. Accordingly, an optical lens is preferably used having settings wherein the intensity of W signals regarding which blurring correction processing is performed is not too small over the entire frequency band at the Nyquist frequency and below.

Processing at the blurring correction processing unit 203 will now be described. The following Expression (1) holds $$g(x,y)=\iint h(x-x',y-y') \cdot f(x',y') \cdot dx'dy' + n(x,y) \quad (1)$$

where f(x, y) represents an ideal image with blurring resolved, g(x, y) represents an observed image including blurring, h(x, y) represents a deterioration function due to lens aberration and hand shaking, n(x, y) represents noise component, and an assumption is made that h(x, y) is immovable.

Subjecting both sides of the above Expression (1) to Fourier transform, $$G(u,v)=H(u,v) \cdot F(u,v)+N(u,v) \quad (2)$$

holds, where G(u, v), H(u, v), F(u, v), and N(u, v) represent Fourier transform of g(x, y), f(x, y), f(x, y), and n(x, y), respectively.

In the event that there is no zero for the deterioration function due to lens aberration and hand shaking in the Expression, and the noise component is known, F(u, v) can be obtained from the following Expression (3).

$$F(u, v) = \frac{G(u, v) - N(u, v)}{H(u, v)} \quad (3)$$

However, in the event that H(u, v) which is the Fourier transform of the deterioration function has zero, or in the event that the level is so weak the noise is overpowering, the above Expression (3) becomes incomputable. Accordingly, care has to be taken so that the aberration of the optical lens 105 of the imaging apparatus 100 is such that the intensity of W signals is not too small over the entire frequency band at the Nyquist frequency and below. Also, the noise component generally is unknown, so even in the event that H(u, v) does not have zero, Expression (3) is insolvable in the strict sense.

There is also available blurring correction using a Wiener filter K(u, v) in Expression (4) below, to minimize error between the ideal image and restored image. See Japanese Unexamined Patent Application Publication No. 2008-42874, for example.

$$K(u, v) = \frac{H^*(u, v)}{|H(u, v)|^2 + c} \quad (4)$$

where c is a constant determined by SN ratio.

As shown in Expression (5) below, convoluting k(x, y) which is an inverse Fourier transform of this filter, and the observed image, in real space, enables a blurring-corrected image f'(x, y) to be obtained.

$$f'(x,y)=k(x,y) \otimes g(x,y) \quad (5)$$

The pixel values of the white (W) pixels making up the blurring-corrected image f'(x, y) obtained from this Expression are output to the color correlation re-mosaic processing unit 210 as blurring-corrected W signals Wd. Note that while blurring restoration processing using a Wiener filter has been illustrated an example, blurring corresponding processing by iterative processing may be performed based on maximum likelihood estimation or Bayes' estimation.

Generally, in the case of an optical lens of which the purpose is to collect light, the power is highest at the center pixel. Accordingly, the filer for performing blurring correction also is highest at the center pixel. With the blurring correction processing unit 203, blurring correction can be performed by performing convolution computation of a resampled Weiner filter in the event that the center pixel is a W pixel, but in the event that the center pixel is not a W pixel, the W signal is missing for the pixel where the weight is centered, so sufficient blurring correction effects are not expected. Accordingly, in this case, a center W signal is interpolated from the surrounding W signals, and blurring correction processing is performed using this signal and the surrounding W pixel signals.

A method for interpolating the center W signal from surrounding W signals in the event that the center pixel is not a W pixel will be described with reference to FIG. 9.

Figure 9:
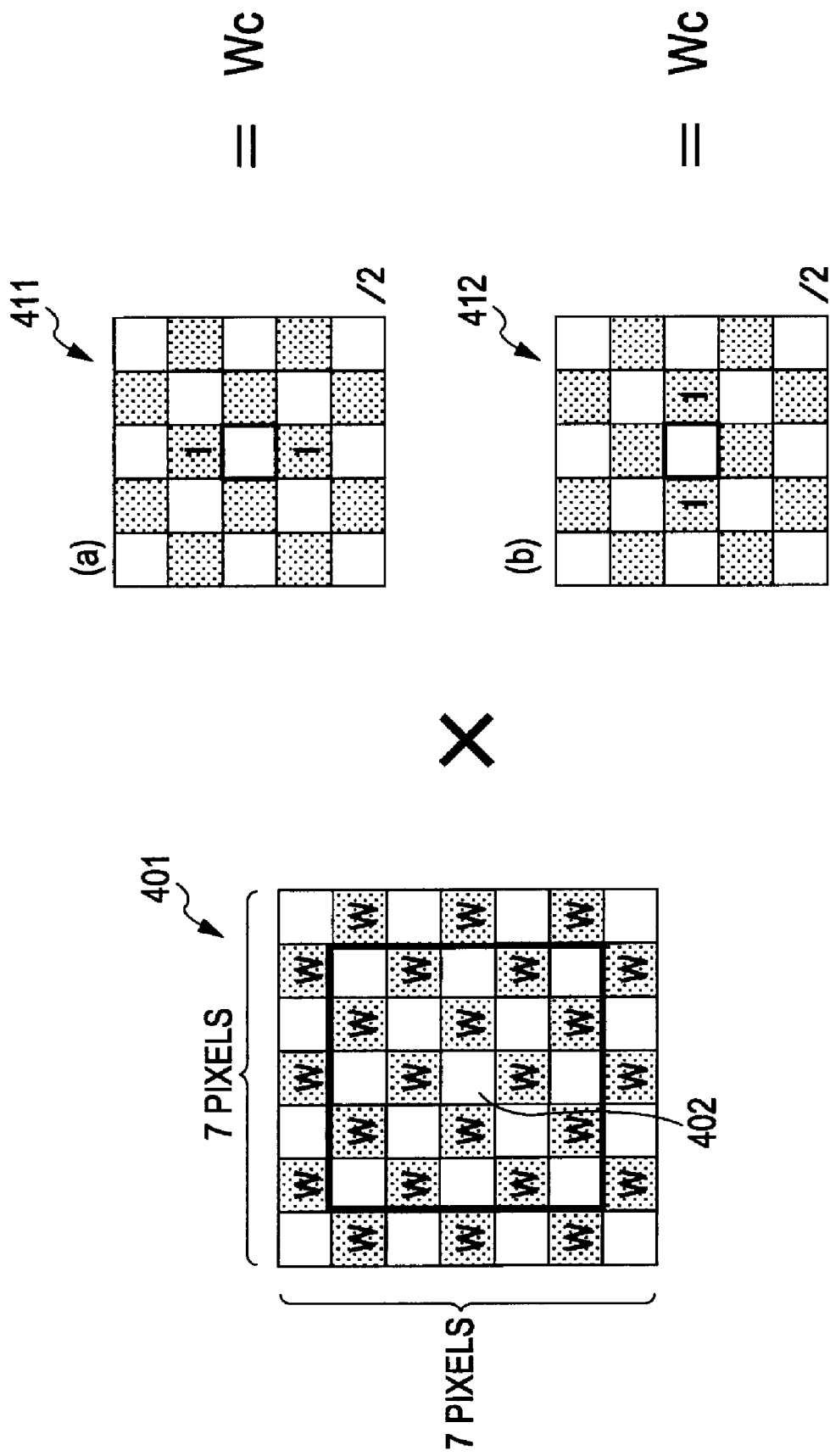
FIG. 9 is a diagram for describing a method for interpolating a center W signal from surrounding W signals in the event that the processing is to be executed by a blurring correction processing unit and the center pixel is not a W pixel.

The blurring correction processing unit 203 compares the magnitude of the weight-added values dirH and dirV of the average of absolute values of gradients calculated at the edge detecting unit 202, and in the event that dirH≧dirV, determination is made that the edge is a vertical direction edge, so the filter 411 shown at (a) in FIG. 9 is applied to set the W pixel values for pixels other than the W pixel. That is to say, with the W pixel values in the vertical direction as reference pixels, the W pixel values of these reference pixels are used to estimate the W pixel value of the center pixel.

In the other hand, in the event that dirH<dirV, determination is made that the edge is a horizontal direction edge, so the filter 412 shown at (b) in FIG. 9 is applied to set the W pixel values for pixels other than the W pixel. That is to say, with the W pixel values in the horizontal direction as reference pixels, the W pixel values of these reference pixels are used to estimate the W pixel value of the center pixel. Note that with the filters 411 and 412 shown in FIG. 9, the pixels indicated by gray are positions corresponding to W pixels, and other pixels are RGB pixels.

With the center of the 7×7 pixel input signals 401 as an interpolation object pixel 402, in the event that dirH dirV, determination is made that the edge is a vertical direction edge, so the filter 411 shown at (a) in FIG. 9 is applied to calculate the average value Wc of the two W pixels above and below the interpolation object pixel 402, which is taken as the W pixel value of the interpolation object pixel 402. On the other hand, in the event that dirH<dirV, determination is made that the edge is a horizontal direction edge, so the filter 412 shown at (b) in FIG. 9 is applied to calculate the average value Wc of the two W pixels to the right and left of the interpolation object pixel 402, which is taken as the W pixel value of the interpolation object pixel 402.

Blurring correction processing is performed by convolution of the above-described Wiener filter on the interpolated W signal and checkerboard pattern W signals output from the line memory 201. That is to say, the pixel values of white (W) pixels making up the blurring-corrected image f'(x, y) obtained by the convolution computation applying the Wiener filter are output to the color correlation re-mosaic processing unit 210 as the blurring-corrected W signals Wd. Note that as described above, blurring restoration processing by iterative processing may be performed based on maximum likelihood estimation or Bayes' estimation, and such processing may be applied to generate the blurring-corrected W signals Wd.

The blurring correction processing unit 203 thus applies the white (W) pixels in the data input from the line memory 201, sets W pixels in RGB pixel positions other than W pixels by interpolation processing, further performs blurring correction processing, and generates blurring-corrected W signals corresponding to all pixels, i.e., generates blurring-corrected W signals Wd, and outputs these to the color correlation re-mosaic processing unit 210.

3-3. About Processing with Color Correlation Re-Mosaic Processing Unit (Data Conversion Unit)

Next, description will be made regarding the processing of the color correlation re-mosaic processing unit 210 within the data conversion processing unit 200 shown in FIG. 4. The color correlation re-mosaic processing unit 210 executes conversion processing from an RGBW color array to the RGB array 182.

Specifically, as described with reference to FIG. 2 earlier, the following five kinds of conversion or correction processing are executed.
Converting W-pixel position to G-pixel (estimating G-pixel value) (GonW)
Converting G-pixel position to R-pixel (estimating R-pixel value) (RonG)
Converting G-pixel position to B-pixel (estimating B-pixel value) (BonG)
Converting R-pixel position to R-pixel (correcting R-pixel value) (RonR)
Converting B-pixel position to B-pixel (correcting B-pixel value) (BonB)

The color correlation re-mosaic processing unit 210 estimates the pixel value of one of R, G, and B to be set to each pixel in the RGBW array, assuming that there is positive correlation between the W signals which is the primary component of luminance in the RGBW array 181, and the G, R, and B signals which are the color component. The color correlation re-mosaic processing unit 210 has a W-position G-interpolation parameter calculation unit 211, a G-position RB-interpolation parameter calculation unit 212, an R-position R-interpolation parameter calculation unit 213, a B-position B-interpolation parameter calculation unit 214, and a weight adding processing unit 215.

First, the processing of the W-position G-interpolation parameter calculation unit 211 which is an interpolation parameter calculation unit for converting W pixel positions in the RGBW array 181 to G pixels in the RGB array 182 (estimating G pixel values) will be described. The W-position G-interpolation parameter calculation unit 211 calculates interpolation parameters to be applied to calculation of G pixel values to be set to the W pixel positions in the RGBW array 181. These are interpolation parameters to be applied to the above-described GonW processing.

Specifically, the W-position G-interpolation parameter calculation unit 211 uses the W signals and G signals in the input signals from the line memory 201, and the blurring-corrected W signals Wd input from the blurring correction processing unit 203, to calculate the signal values of
G signals with blurring correction Gd, and
G signals without blurring correction Gl.

These signal values are interpolation parameters to be applied to G-pixel value calculation for setting the W-pixel positions in the RGBW array 181 to G pixels in the RGB array 182 (GonW interpolation parameters).

Note that the color correlation re-mosaic processing unit 210 also performs processing with 7×7 pixel regions as processing increments. The W-position G-interpolation parameter calculation unit 211 first obtains the ratio between W signals and G signals in the 7×7 pixel region which is an increment of processing.

Figure 10:
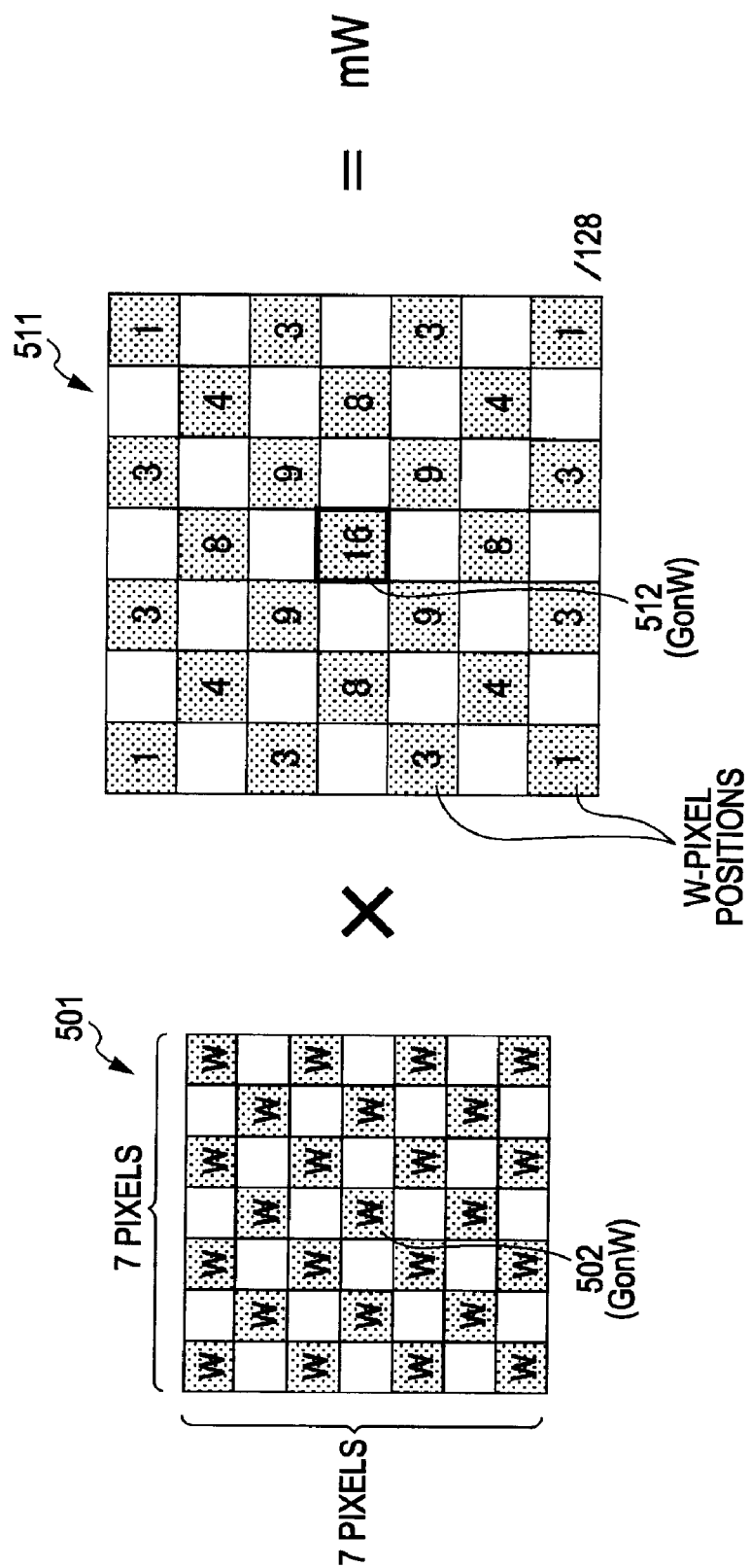
FIG. 10 is a diagram describing a filter configuration for calculating the low-frequency component mW of W signals, and an example of W calculation processing.
Figure 11:
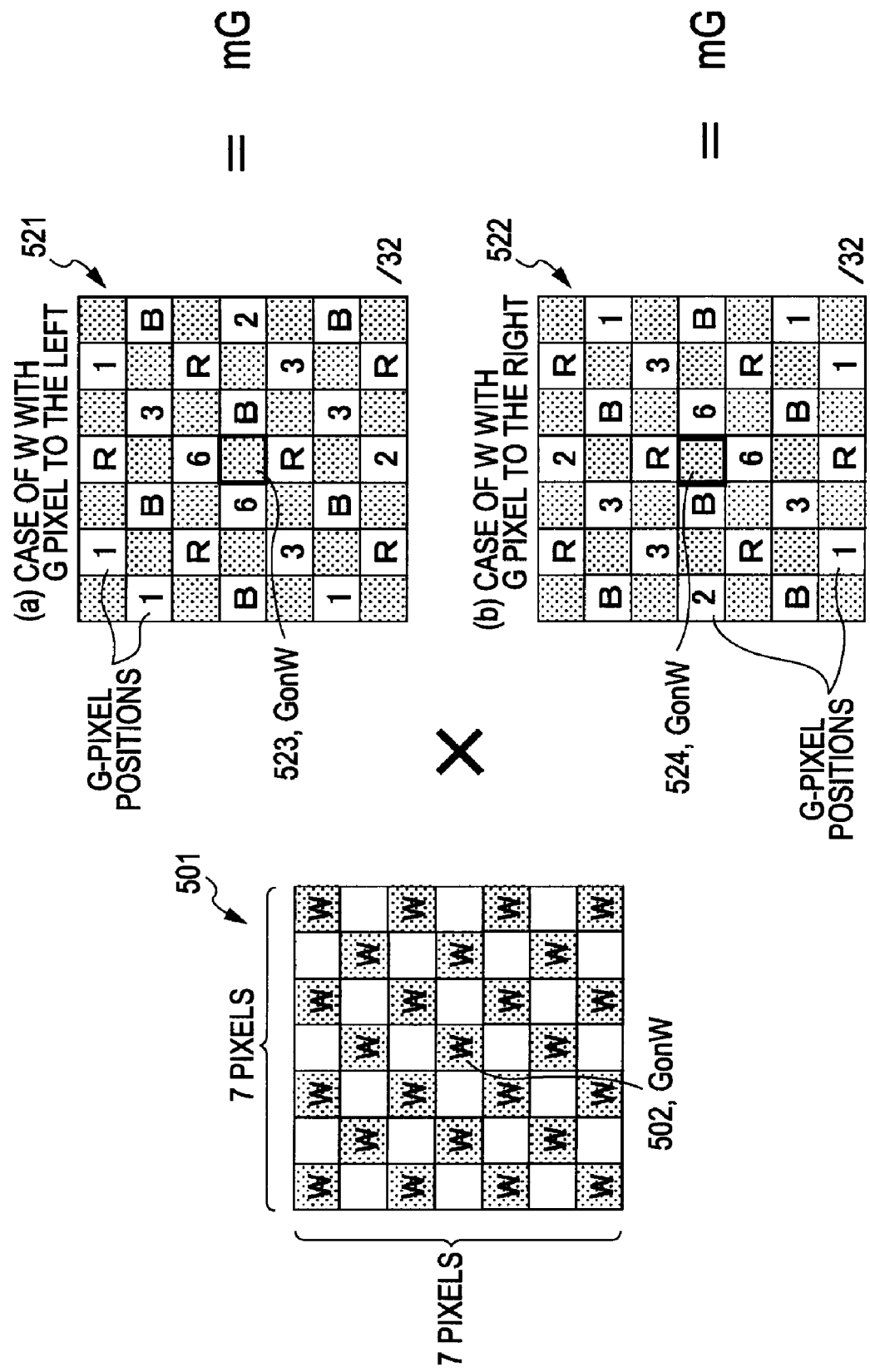
FIG. 11 is a diagram for describing a filter configuration for calculating low-frequency component mG of a G signal, and an example of mG calculation processing.

The smoothing filter 511 shown in FIG. 10 is used to calculate the low-frequency component mW of the W signals, and the smoothing filter 521 or smoothing filter 522 shown in FIG. 11 is used to calculate the low-frequency component mG of the G signals.

First, the calculation processing for the low-frequency component mW of the W signals will be described with reference to FIG. 10. The smoothing filter 511 shown in FIG. 10 is applied to the input signals 501 of 7×7 pixels so as to calculate the low-frequency component mW corresponding to the input signals 501 of 7×7 pixels. The W pixel which is the object of conversion to a G pixel is the pixel-to-be-converted 502 at the center of the input signals 501 of 7×7 pixels. In the input signals 501 shown in FIG. 10, the pixels indicated by gray are the W pixels, and the others are RGB pixels. In the same way, the pixels indicated by gray in the smoothing filter 511 shown in FIG. 10 are positions corresponding to W pixels, and the others are positions corresponding to RGB pixels. Note that in the following drawings as well, W pixels or positions corresponding to W pixels will be illustrated with gray, and RGB pixel positions or corresponding positions will be illustrated with white.

The smoothing filter 511 is a filter wherein the filter coefficient of a position corresponding to pixel to be converted 512 is the greatest, belong lower the farther away. The coefficients of $16/128$ through $1/128$ have been set as coefficients. This smoothing filter 511 is applied to calculate the low-frequency component mW. The pixel values at the W pixel positions of the input signals 501 of 7×7 pixels are multiplied by the filter coefficients at the corresponding pixel positions in the smoothing filter 511, with the added values of the multiplication results being calculated as the low-frequency component mW of the W signals.

Note that the filter coefficient settings example of the smoothing filter 511 shown in FIG. 10 is only an example, and filters with other filter coefficients set may be used. The smoothing filter 511 shown in FIG. 10 is configured so that the total of the filter coefficients is an exponential of 2. This configuration enables a divider to be realized with bit shift alone, enabling reduction in computation costs. Other smoothing filters, having low-pass properties for example, may be used instead of the filter example shown in FIG. 10.

Note that the input signals 501 to be input for calculation of the low-frequency component mW are preferably W signals regarding which other blurring correction processing has not been performed. However, blurring-corrected W signals Wd following blurring processing, which the blurring correction processing unit 203 has generated, maybe used to reduce computation costs.

Next, the calculation processing for the low-frequency component mG of the G signals will be described with reference to FIG. 11. The smoothing filter 521 shown as (a) in FIG. 11 or the smoothing filter 522 shown as (b) in FIG. 11 is applied to the input signals 501 of 7×7 pixels so as to calculate the low-frequency component mG corresponding to the input signals 501 of 7×7 pixels. The G pixel which is the object of conversion to a G pixel is the pixel-to-be-converted 502 at the center of the input signals 501 of 7×7 pixels.

Here, there are two types of W pixels to be the object of conversion to G pixels. One is the pixel-to-be-converted 502 with the phase having a G pixel to the immediate left, and the other with the phase having a G pixel to the immediate right. Accordingly, different filters are applied for each phase. In the event of the phase having a G pixel to the immediate left, the smoothing filter 521 shown as (a) in FIG. 11 is used, and in the event of the phase having a G pixel to the immediate right, the smoothing filter 522 shown as (b) in FIG. 11 is used. With either filter, the pixels exhibiting values indicating the filter coefficients are positions corresponding to G pixels.

Both the smoothing filter 521 and smoothing filter 522 are filters wherein the filter coefficient of a position corresponding to the G pixel to be converted near the pixel-to-be-converted positions 523 and 524 is the greatest, belong lower the farther away. The coefficients of $6/32$ through $1/32$ have been set as coefficients. The smoothing filters 521 and 522 are applied to calculate the low-frequency component mG. The pixel values at the G pixel positions of the input signals 501 of 7×7 pixels are multiplied by the filter coefficients at the corresponding pixel positions in one of the smoothing filters 521 or 522, with the added values of the multiplication results being calculated as the low-frequency component mG of the G signals.

Note that the filter coefficient settings examples of the smoothing filters 521 and 522 shown in FIG. 11 are only an example, and filters with other filter coefficients set may be used. The W-position G-interpolation parameter calculation unit 211 thus calculates the low-frequency components mW and mG of the W signals and G signals, with the 7×7 pixel region, having a W pixel to be converted to a G pixel as the center pixel, as an increment of processing.

Figure 12:
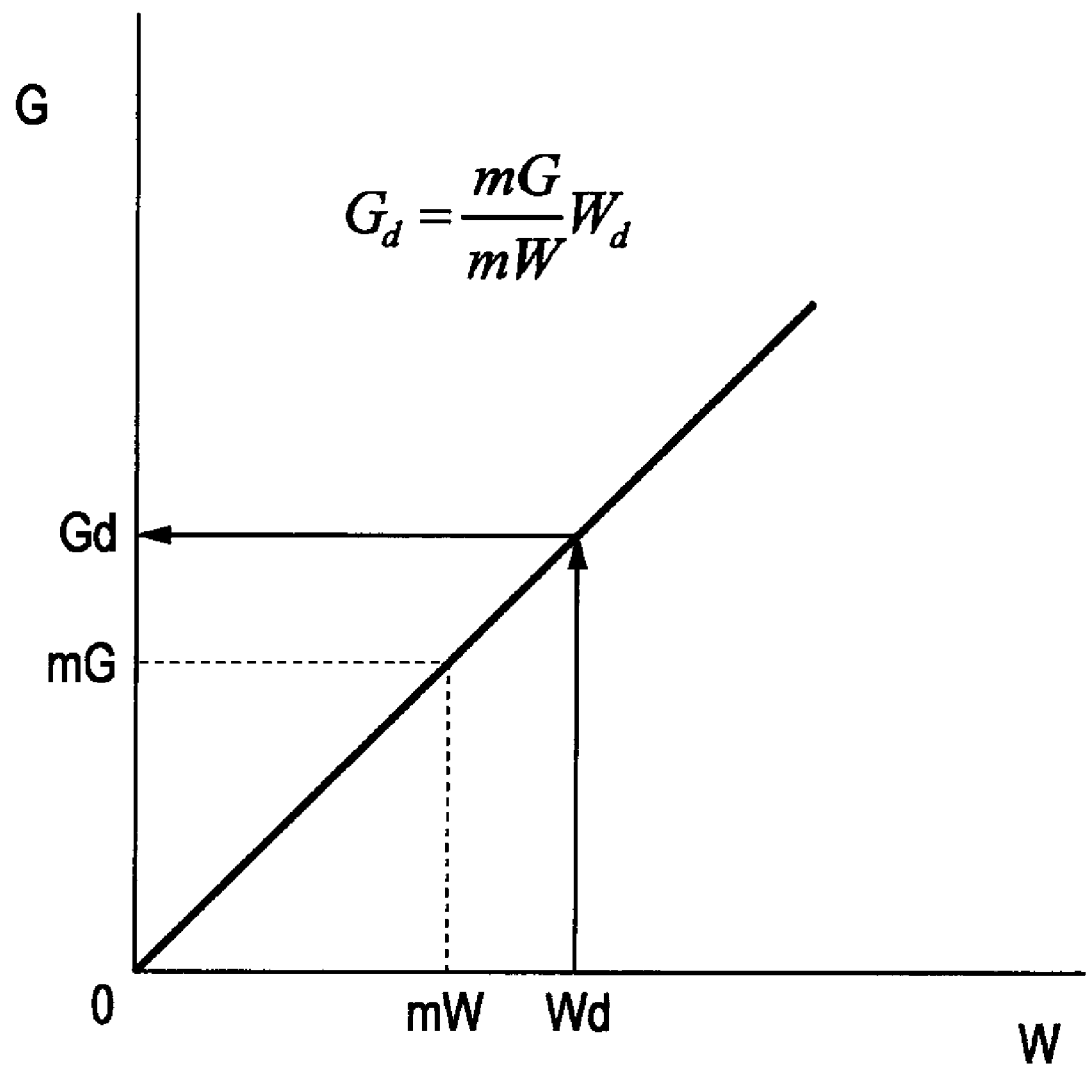
FIG. 12 is a diagram for describing processing for calculating a blurring-corrected G signal (Gd) from a blurring correction W signal (Wd) in the event of assuming that the ratio of mW and mG will be maintained in a local region within the image.

We will assume that the ratio of the mW and mG calculated in this way is maintained in the local region within the image. According to this assumption, the pixel value ratio of W and G in the local region is in the corresponding relation shown in the graph in FIG. 12. In the graph in FIG. 12, the horizontal axis represents the W-pixel value, and the vertical axis represents the G-pixel value. If we say that the ratio of W pixel values and G pixel values is constant in particular narrow local regions of the image, we can assume that these are in a proportionate relation as indicated by the straight line in FIG. 12.

Under this assumption, we will calculate a blurring-corrected G signal Gd using the blurring-corrected white W signal Wd at the pixel-to-be-converted position output from the blurring correction processing unit 203, following the expression $$Gd=(mG/mW)Wd$$

where the signal Gd is a G signal including the high-frequency component.

Note that an estimation technique has been illustrated as an example wherein the ratio of the W pixel values and G pixel values is assumed to be constant, but other estimation techniques using the correlation between W pixel values and G pixel values may be used.

As described above, the W-position G-interpolation parameter calculation unit 211 calculates the signal values of G signals with blurring correction Gd, and G signals without blurring correction Gl, as interpolation parameters to be applied to calculation of G pixel values to be set in the W pixel positions of the RGBW array 181. The weight adding processing unit 215 blends the two signals Gd and Gl according to the edge information of the pixel-to-be-converted, and determines the final G pixel value.

Figure 13:
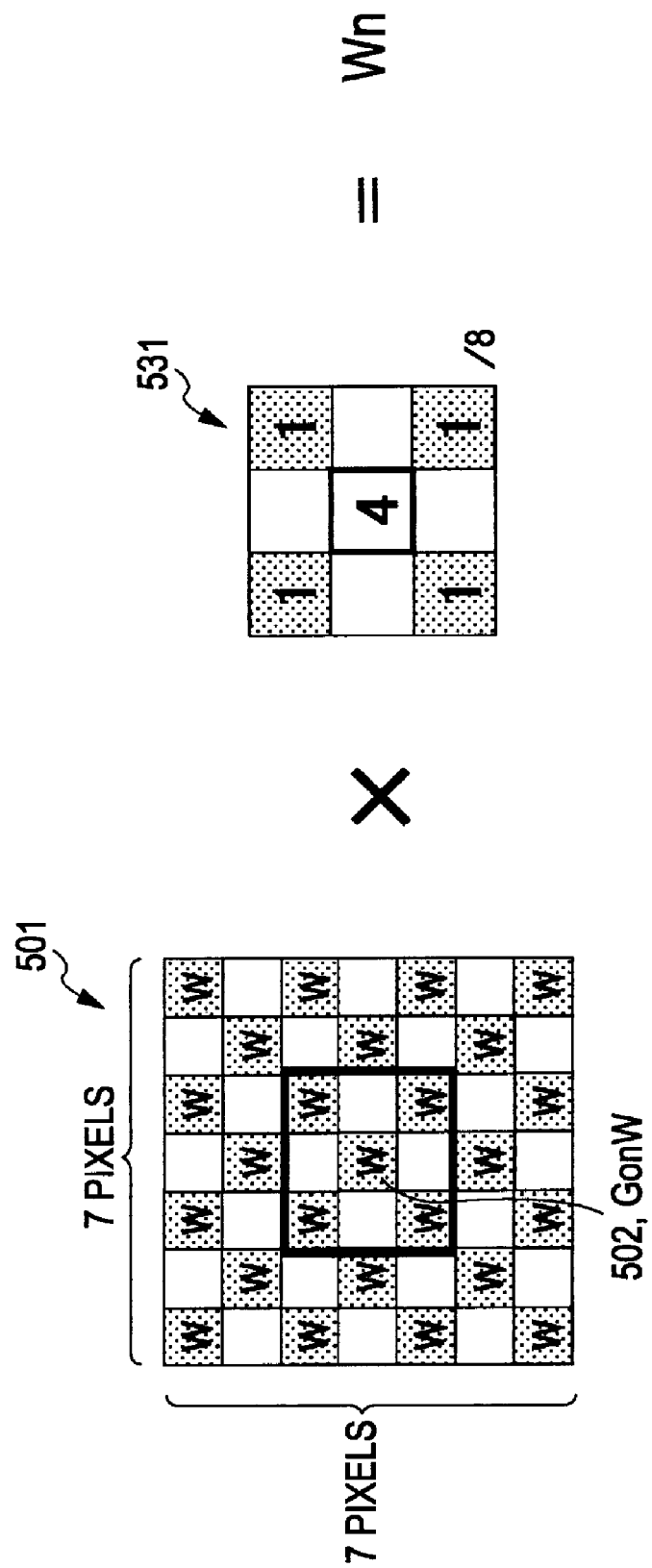
FIG. 13 is a diagram for describing a filter configuration for calculating a noise removal signal (Wn), and an example of Wn calculation processing.

Calculation processing of the blurring-uncorrected G signal Gl will be described. At the time of calculation of the blurring-uncorrected G signal Gl, first, the smoothing filter 531 shown in FIG. 13 is used to calculate W signals Wn with noise signals removed. The W pixel values in nine pixels centered on the W-pixel position of the pixel-to-be-converted 502 of the 7×7 pixel input signals 501 are multiplied by the filter coefficients at the corresponding pixel positions in the smoothing filter 531, so as to calculate the added value of the multiplication results as a noise-removed white W signal Wn. The filter coefficients of the smoothing filter 531 are set to 4/8 through 1/8 for the corresponding position W pixel of the pixel-to-be-converted 502 and the surrounding W pixels.

Note that these filter coefficients are only one example, and a configuration may be made wherein other coefficients are used. Also, a configuration may be made wherein a region wider than nine pixels is used. Further, a configuration may be made wherein W signals input from the line memory 201 are used as they are, to reduce computation costs.

This noise-removed W signal Wn and the low-frequency components mW and mG of the W signal and G signal are applied to calculate the G signal without blurring correction Gl with the following expression.

$$Gl=(mG/mW)Wn$$

Note that this signal Gl is not that with the blurring correction signal Wd applied, and corresponds to a G signal in which the high-frequency component has not been enhanced.

Note that an estimation technique has been illustrated as an example wherein the ratio of the W pixel values and G pixel values is assumed to be constant, but other estimation techniques using the correlation between W pixel values and G pixel values may be used.

The weight adding processing unit 215 blends the two signals Gd and Gl according to the edge information of the pixel-to-be-converted, and determines the final G pixel value. Specifically, the weight adding processing unit 215 performs blending processing so as to set the ratio of blurring-uncorrected G signals Gd so as to be high at edge portions which are not flat and the degree of texture is high, and set the ratio of blurring-corrected G signals Gl so as to be high at flat portions, so as to determine the final G pixel value. This processing will be described later.

Next, the processing of the G-position RB-interpolation parameter calculation unit 212 which is an interpolation parameter calculation unit for converting G pixel positions in the RGBW array 181 to R pixels or B pixels in the RGB array 182 will be described. The G-position RB-interpolation parameter calculation unit 212 calculates interpolation parameters to be applied to processing for converting G-pixel positions to R pixels (estimating R pixel values), i.e., RonG, and for converting G-pixel positions to B pixels (estimating B pixel values), i.e., BonG.

Specifically, the G-position RB-interpolation parameter calculation unit 212 calculates the signal values of R signals with blurring correction Rd,
R signals without blurring correction Rl,
B signals with blurring correction Bd, and
B signals without blurring correction Bl.

These signal values are interpolation parameters to be applied to R-pixel value or B-pixel value calculation for setting the G-pixel positions in the RGBW array 181 to R pixels or B pixels in the RGB array 182 (RonG interpolation parameters or BonG interpolation parameters).

The G-position RB-interpolation parameter calculation unit 212 first obtains the 7×7 pixel region, which is an increment of processing, having the pixel to be converted as the center pixel, and calculates the ratio between W signals and R signals, and between W signals and B signals. The smoothing filter 561 shown in FIG. 14 is used to calculate the low-frequency component mW of the W signals. Note that with the example being described here, processing is performed here with only the middle 5×5 pixel region 553 being used out of the 7×7 pixel region which is an increment of processing.

The smoothing filter 561 shown in FIG. 14 is applied to the middle 5×5 pixel region 553 of the input signals 551 of 7×7 pixels so as to calculate the low-frequency component mW. The G pixel which is the object of conversion is the pixel-to-be-converted 552 at the center of the input signals 551 of 7×7 pixels.

The smoothing filter 561 is a filter wherein the filter coefficient of a position corresponding to pixel to be converted 552 is the greatest, belong lower the farther away. The coefficients of 2/16 through 1/16 have been set as coefficients. This smoothing filter 561 is applied to calculate the low-frequency component mW. The pixel values at the W pixel positions of the 5×5 pixel region at the middle of the input signals 551 of 7×7 pixels are multiplied by the filter coefficients at the corresponding pixel positions in the smoothing filter 561, with the added values of the multiplication results being calculated as the low-frequency component mW of the W signals.

Note that the filter coefficient settings example of the smoothing filter 561 shown in FIG. 14 is only an example, and filters with other filter coefficients set may be used. Other smoothing filters, having low-pass properties for example, may be used instead of the filter example shown in FIG. 14. Note that the input signals 551 to be input for calculation of the low-frequency component mW are preferably W signals regarding which other blurring correction processing has not been performed. However, blurring-corrected W signals Wd following blurring processing, which the blurring correction processing unit 203 has generated, maybe used to reduce computation costs.

Note that with the example shown in FIG. 14, smoothing processing wherein the 5×5 pixel region 553 has been set is performed to match the reference ranges of R signals and B signals. This processing allows the single common filter 561 shown in FIG. 14 to be used for the processing of converting G pixels into R pixels and the processing of converting G pixels into B pixels, thereby enabling sharing parts and suppressing computation costs.

Further, the G-position RB-interpolation parameter calculation unit 212 calculates the low-frequency component mR of R signals, to be used for R-signal estimation at the time of converting G pixels into R pixels, and the low-frequency component mB of B signals, to be used for B-signal estimation at the time of converting G pixels into B pixels. The smoothing filter 562 and smoothing filter 563 shown in FIG. 15 are used for the calculation processing of these mR and mB. The smoothing filter 562 in FIG. 15 is used for calculating the low-frequency component mR of R signals. The pixels with numbers indicating filter coefficients are R-pixel corresponding positions. The smoothing filter 563 in FIG. 15 is used for calculating the low-frequency component mB of B signals. The pixels with numbers indicating filter coefficients are B-pixel corresponding positions.

In either case, processing is performed here with only the middle 5×5 pixel region 553 being used out of the 7×7 pixel region which is an increment of processing. The smoothing filter 562 and smoothing filter 563 shown in FIG. 15 are applied to the middle 5×5 pixel region 553 of the 7×7 pixel region of the input signals 551 to calculate the low-frequency component mR of the R signals and the low-frequency component mB of the B signals. The G pixel which is the object of conversion is the pixel-to-be-converted 552 at the center of the input signals 551 of 7×7 pixels.

Both smoothing filters 562 and 563 are configured with filter coefficient settings having been performed in which pixel values of R pixel or B pixel positions near to the position corresponding to the pixel-to-be-converted 552 are obtained evenly, and ¼ has been set as the coefficient.

The smoothing filters 562 and 563 are applied to calculate the low-frequency components mR and mB. At the time of calculation processing for mR, the pixel values at the R pixel positions of the middle 5×5 pixel region 553 of the 7×7 pixels of the input signals 551 are multiplied by the filter coefficients at the corresponding pixel positions in the smoothing filter 562, with the added values of the multiplication results being calculated as the low-frequency component mR of the R signals. Also, at the time of calculation processing for mB, the pixel values at the B pixel positions of the middle 5×5 pixel region 553 of the 7×7 pixels of the input signals 551 are multiplied by the filter coefficients at the corresponding pixel positions in the smoothing filter 562, with the added values of the multiplication results being calculated as the low-frequency component mB of the B signals. Note that the filter coefficient settings examples of the smoothing filters 562 and 563 shown in FIG. 15 are only an example, and filters with other filter coefficients set may be used.

Figure 16A:
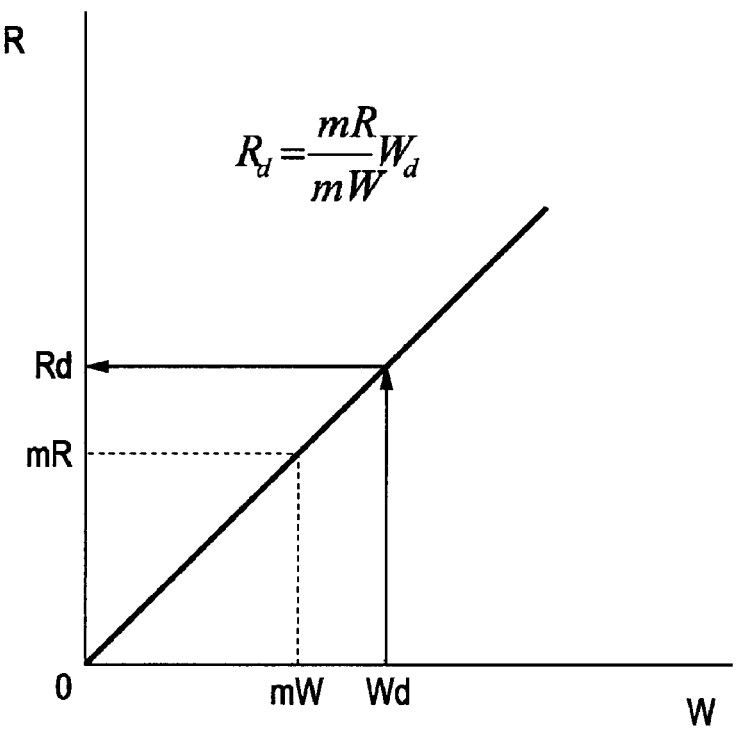
FIGS. 16A and 16B are diagrams for describing processing for calculating a blurring-corrected R signal (Rd) and a blurring-corrected B signal (Bd) from a blurring correction W signal (Wd) in the event of assuming that the ratio of mW and mR or mB will be maintained in a local region within the image.
Figure 16B:
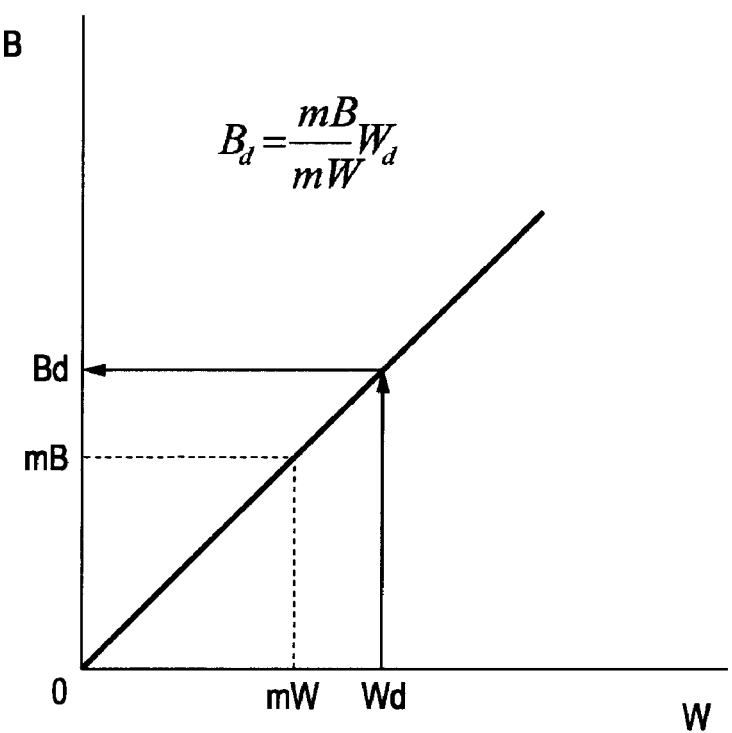

We will assume that the ratio of the mW and mR or mB calculated in this way is maintained in the local region within the image. According to this assumption, the pixel value ratio of W and R, and W and B, in the local region, is in the corresponding relation shown in the graph in FIGS. 16A and 16B. In the graph in FIG. 16A, the horizontal axis represents the W-pixel value, and the vertical axis represents the R-pixel value. In the graph in FIG. 16B, the horizontal axis represents the W-pixel value, and the vertical axis represents the B-pixel value. If we say that the ratio of W pixel values and R pixel values, and W pixel values and B pixel values, is constant in particular narrow local regions of the image, we can assume that these are in a proportionate relation as indicated by the straight line in FIGS. 16A and 16B.

Under this assumption, we will calculate a blurring-corrected R signal Rd using the blurring-corrected white W signal Wd at the pixel-to-be-converted position output from the blurring correction processing unit 203, following the expression $$Rd=(mR/mW)Wd$$

where the signal Rd is a R signal including the high frequency component.

We will also calculate a blurring-corrected B signal Bd following the expression $$Bd=(mB/mW)Wd$$

where the signal Bd is a B signal including the high-frequency component.

Note that an estimation technique has been illustrated as an example wherein the ratio of the W pixel values and R pixel values or B pixel values is assumed to be constant, but other estimation techniques using the correlation between W pixel values and R pixel values or B pixel values may be used.

As described above, the G-position RB-interpolation parameter calculation unit 212 calculates the signal values of R signals with blurring correction Rd and R signals without blurring correction Rl, and the signal values of B signals with blurring correction Bd and B signals without blurring correction Bl, as interpolation parameters to be applied to calculation of R pixel values and B pixel values to be set in the G pixel positions of the RGBW array 181. For the R pixels, the weight adding processing unit 215 blends the two signals Rd and Rl according to the edge information of the pixel-to-be-converted, and determines the final R pixel value. For the B pixels, the weight adding processing unit 215 blends the two signals Bd and Bl according to the edge information of the pixel-to-be-converted, and determines the final R pixel value.

Figure 17:
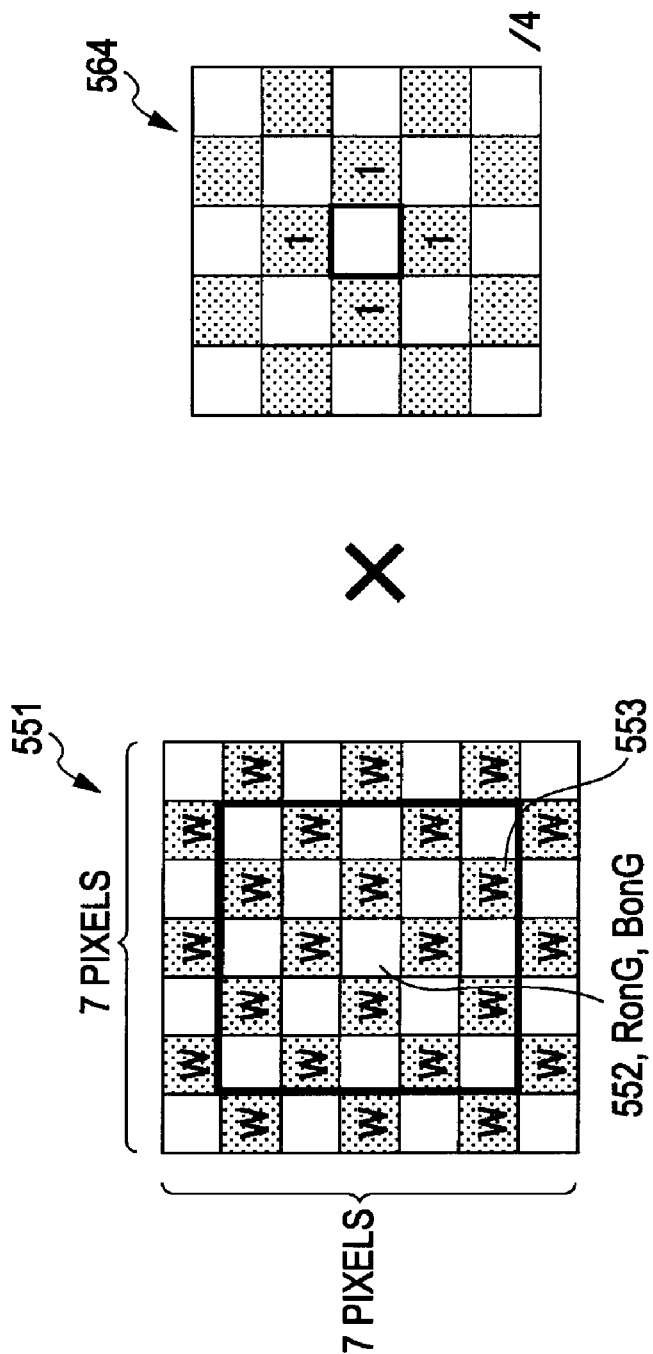
FIG. 17 is a diagram for describing a filter configuration for calculating a noise removal W signal (Wn), and an example of Wn calculation processing.

Calculation processing of the blurring-uncorrected R signal Rl and blurring-uncorrected B signal Bl will be described. At the time of calculation of these signals, first, the smoothing filter 564 shown in FIG. 17 is used to calculate W signals Wn with noise signals removed. The W pixel values of just the four W pixels around the pixel-to-be-converted 552 in the 5×5 pixel region 553 centered on the G-pixel position of the pixel-to-be-converted 552 at the center of the input signals 551 of 7×7 pixels are multiplied by the filter coefficients of the smoothing filter 564 in which filter coefficients have been set, so as to calculate the added value of the multiplication results as a noise-removed white W signal Wn. The filter coefficients of the smoothing filter 564 are set to ¼ for the surrounding W pixels of the pixel-to-be-converted 552. Note that these filter coefficients are only one example, and a configuration may be made wherein other coefficients are used.

This noise-removed W signal Wn and the low-frequency components mW and mR of the W signal and R signal are applied to calculate the R signal without blurring correction Rl with the following expression.

$$Rl=(mR/mW)Wn$$

Note that this signal Rl is not that with the blurring correction signal Wd applied, and corresponds to an R signal in which the high-frequency component has not been enhanced.

Also, this noise-removed W signal Wn and the low-frequency components mW and mB of the W signal and B signal are applied to calculate the B signal without blurring correction Bl with the following expression.

$$Bl=(mB/mW)Wn$$

Note that this signal Bl is not that with the blurring correction signal Wd applied, and corresponds to a B signal in which the high-frequency component has not been enhanced.

Note that an estimation technique has been illustrated as an example wherein the ratio of the W pixel values and R pixel values or B pixel values is assumed to be constant, but other estimation techniques using the correlation between W pixel values and R pixel values or B pixel values may be used.

The weight adding processing unit 215 blends the two signals Rd and Rl according to the edge information of the pixel-to-be-converted, and determines the final R pixel value. Specifically, the weight adding processing unit 215 performs blending processing so as to set the ratio of blurring-corrected R signals Rd so as to be high at edge portions which are not flat and the degree of texture is high, and set the ratio of blurring-corrected R signals Rl so as to be high at flat portions, so as to determine the final R pixel value. This processing will be described later.

Also, the weight adding processing unit 215 blends the two signals Bd and Bl according to the edge information of the pixel-to-be-converted, and determines the final B pixel value. Specifically, the weight adding processing unit 215 performs blending processing so as to set the ratio of blurring-uncorrected B signals Bd so as to be high at edge portions which are not flat and the degree of texture is high, and set the ratio of blurring-corrected B signals Bl so as to be high at flat portions, so as to determine the final B pixel value. This processing will be described later.

Next, processing of the R-position R-interpolation parameter calculation unit 213 which is an interpolation parameter calculation unit for converting the R pixel positions in the RGBW array 181 to R pixels in the RGB array 182 (correcting R pixel values) will be described. The R pixel positions in the RGBW array 181 correspond to the R pixel positions in the RGB array (Bayer array) 182, and the R signals can be used as they are. However, there are cases where this information has high-frequency signals lost due to the effects of the aberration of the optical lens. In such a case, there is the possibility that there may be properties different to the R signals and B signals to be set to the G pixel positions.

To prevent such difference in properties from occurring, The R-position R-interpolation parameter calculation unit 213 uses the W signals and R signals included in the input signal to calculate parameters for correction of R signals. Specifically, the signal values are calculated for R signals with blurring correction Rd, and R signals without blurring correction Rl. These signal values are interpolation parameters to be applied to R-pixel value correction processing for setting the R-pixel positions in the RGBW array 181 to corrected R pixels in the RGB array 182 (RonR interpolation parameters).

The R-position R-interpolation parameter calculation unit 213 first calculates the low-frequency component mW of the W signals using the smoothing filter 561 shown in FIG. 14, that has been described in the processing of the G-position RB-interpolation parameter calculation unit 212. Note that in this case, the center pixel of the input signals 551 of 7×7 pixels is an R pixel. Of the 7×7 pixel region which is a processing increment, only the middle 5×5 pixel region 553 is used in this processing. The smoothing filter 561 shown in FIG. 14 is applied to the middle 5×5 pixel region 553 of the input signals 551 of 7×7 pixels to calculate the low-frequency component mW. The R pixel to be converted (corrected) is the pixel-to-be-converted 552 at the center of the input signals 551 of 7×7 pixels.

Note that the input signals 551 for calculation of the low-frequency component mW are preferably W signals regarding which other blurring correction processing has not been performed. However, blurring-corrected W signals Wd following blurring processing, which the blurring correction processing unit 203 has generated, maybe used to reduce computation costs.

Figure 18:
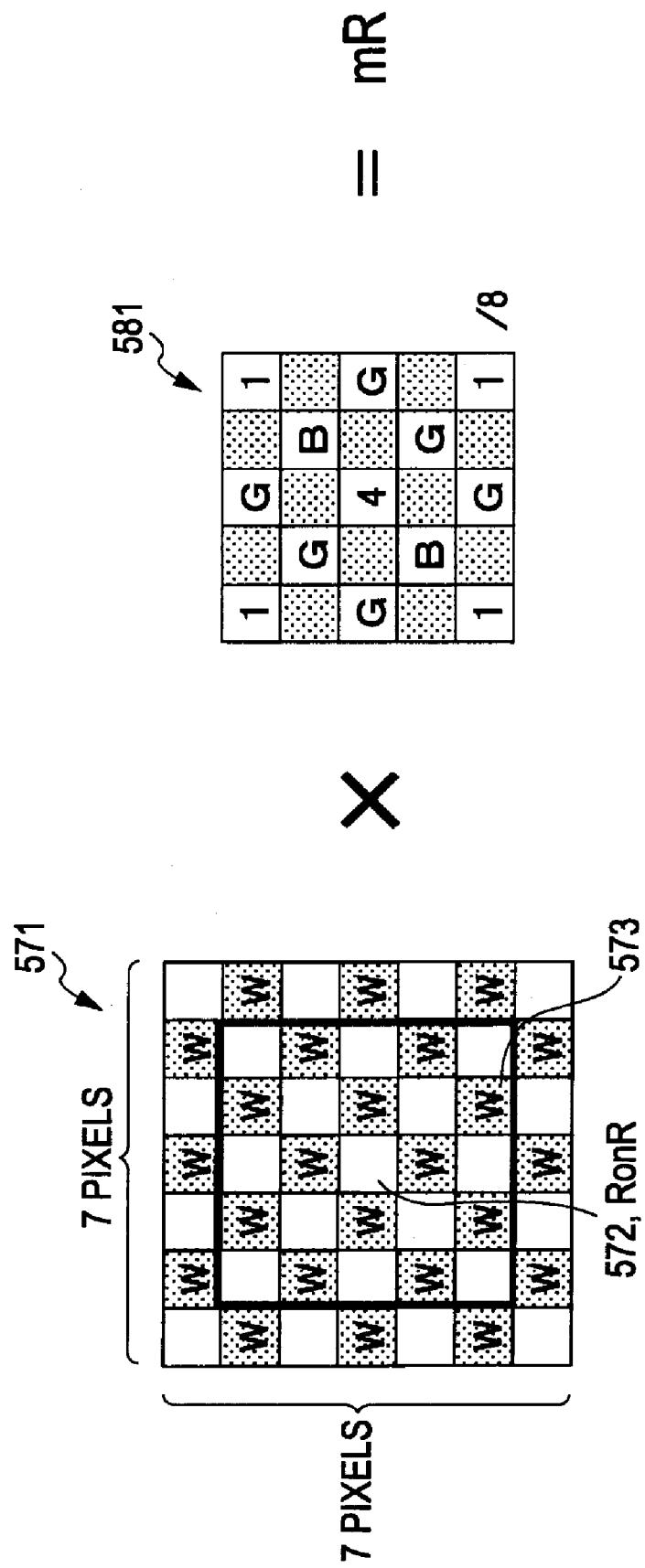
FIG. 18 is a diagram for describing a filter configuration for calculating low-frequency component mR of an R signal, and an example of mR calculation processing.

Further, the R-position R-interpolation parameter calculation unit 213 calculates the low-frequency component mR of the R signals to be used at the time of R signal estimation when calculating the corrected R pixel values for R pixels. The smoothing filter 581 shown in FIG. 18 is used for calculation of the low-frequency component mR of the R signals. The pixels with numbers indicating filter coefficients are R-pixel corresponding positions.

Of the 7×7 pixels which is a processing increment of the input signals 571, only the middle 5×5 pixel region 573 is used in this processing example. The smoothing filter 581 shown in FIG. 18 is applied to the middle 5×5 pixel region 573 of the input signals 571 of 7×7 pixels to calculate the low-frequency component mR of the R signals. The R pixel to be corrected here is the pixel-to-be-converted 572 at the center of the input signals 571 of 7×7 pixels.

The smoothing filter 581 has the coefficients of R pixels at the position corresponding to the position corresponding to the pixel-to-be-converted 572 set higher, and the coefficients of surrounding R pixel positions set lower. 4/8 to 1/8 has been set as the coefficient.

The smoothing filter 581 is applied to calculate the low-frequency component mR. At the time of calculation processing of mR, the pixel values of the R pixels positions in the middle 5×5 pixel region 573 of the input signals 571 of 7×7 pixels are multiplied by the filter coefficients at the corresponding pixel positions in the smoothing filter 581, and the added value of the multiplication results is calculated as the low-frequency component mR of the R signals. Note that the filter coefficient setting example of the smoothing filter 581 shown in FIG. 18 is only one example, and a configuration may be made wherein other filter coefficients are set.

We will assume that the ratio of the mW and mR calculated in this way is maintained in the local region within the image. According to this assumption, the pixel value ratio of W and R in the local region is in the corresponding relation shown in the graph in FIG. 16A. If we say that the ratio of W pixel values and R pixel values is constant in particular narrow local regions of the image, we can assume that these are in a proportionate relation as indicated by the straight line in FIG. 16A. Under this assumption, we will calculate a blurring-corrected R signal Rd using the blurring-corrected white W signal Wd at the pixel-to-be-converted position output from the blurring correction processing unit 203, following the expression $$Rd = (mR/mW)Wd$$

where the signal Rd is a R signal including the high-frequency component.

Note that an estimation technique has been illustrated as an example wherein the ratio of the W pixel values and R pixel values is assumed to be constant, but other estimation techniques using the correlation between W pixel values and R pixel values may be used.

Calculation processing of the blurring-uncorrected R signal Rl is further performed. The smoothing filter 564 described earlier with reference to FIG. 17 is used to calculate W signals Wn with noise signals removed. In this case, the pixel-to-be-converted 552 of the of the input signals 551 of 7×7 pixels is an R pixel. Just the four W pixels around the pixel-to-be-converted 552 in the 5×5 pixel region 553 centered on the R-pixel position of the pixel-to-be-converted 552 are multiplied by the filter coefficients of the smoothing filter 564 in which filter coefficients have been set, so as to calculate the added value of the multiplication results as a noise-removed white W signal Wn. The filter coefficients of the smoothing filter 564 are set to ¼ for the pixel-to-be-converted 552 and the surrounding W pixels. Note that these filter coefficients are only one example, and a configuration may be made wherein other coefficients are used.

This noise-removed W signal Wn and the low-frequency components mW and mR of the W signal and R signal are applied to calculate the R signal without blurring correction Rl with the following expression.

$$Rl = (mR/mW)Wn$$

Note that this signal Rl is not that with the blurring correction signal Wd applied, and corresponds to a R signal in which the high-frequency component has not been enhanced.

Note that an estimation technique has been illustrated as an example wherein the ratio of the W pixel values and R pixel values is assumed to be constant, but other estimation techniques using the correlation between W pixel values and R pixel values may be used.

The weight adding processing unit 215 blends the two signals Rd and Rl according to the edge information of the pixel-to-be-converted, and determines the final R pixel value. Specifically, the weight adding processing unit 215 performs blending processing so as to set the ratio of blurring-uncorrected R signals Rd so as to be high at edge portions which are not flat and the degree of texture is high, and set the ratio of blurring-corrected R signals Rl so as to be high at flat portions, so as to determine the final R pixel value. This processing will be described later.

Next, processing of the B-position B-interpolation parameter calculation unit 214 which is an interpolation parameter calculation unit for converting the B pixel positions in the RGBW array 181 to B pixels in the RGB array 182 (correcting B pixel values) will be described. The B pixel positions in the RGBW array 181 correspond to the B pixel positions in the RGB array (Bayer array) 182, and the B signals can be used as they are. However, there are cases where this information has high-frequency signals lost due to the effects of the aberration of the optical lens. In such a case, there is the possibility that there may be properties different to the R signals and B signals to be set to the G pixel positions.

To prevent such difference in properties from occurring, The B-position B-interpolation parameter calculation unit 214 uses the W signals and B signals included in the input signal to calculate parameters for correction of B signals. Specifically, the signal values are calculated for B signals with blurring correction Bd, and B signals without blurring correction Bl. These signal values are interpolation parameters to be applied to B-pixel value correction processing for setting the B-pixel positions in the RGBW array 181 to corrected B pixels in the RGB array 182 (BonB interpolation parameters).

The B-position B-interpolation parameter calculation unit 214 first calculates the low-frequency component mW of the W signals using the smoothing filter 561 shown in FIG. 14, that has been described in the processing of the G-position RB-interpolation parameter calculation unit 212. Note that in this case, the center pixel of the input signals 551 of 7×7 pixels is a B pixel. Of the 7×7 pixel region which is a processing increment, only the middle 5×5 pixel region 553 is used in this processing. The smoothing filter 561 shown in FIG. 14 is applied to the middle 5×5 pixel region 553 of the input signals 551 of 7×7 pixels to calculate the low-frequency component mW. The B pixel to be converted (corrected) is the pixel-to-be-converted 552 at the center of the input signals 551 of 7×7 pixels.

Note that the input signals 551 for calculation of the low-frequency component mW are preferably W signals regarding which other blurring correction processing has not been performed. However, blurring-corrected W signals Wd following blurring processing, which the blurring correction processing unit 203 has generated, may be used to reduce computation costs.

Figure 19:
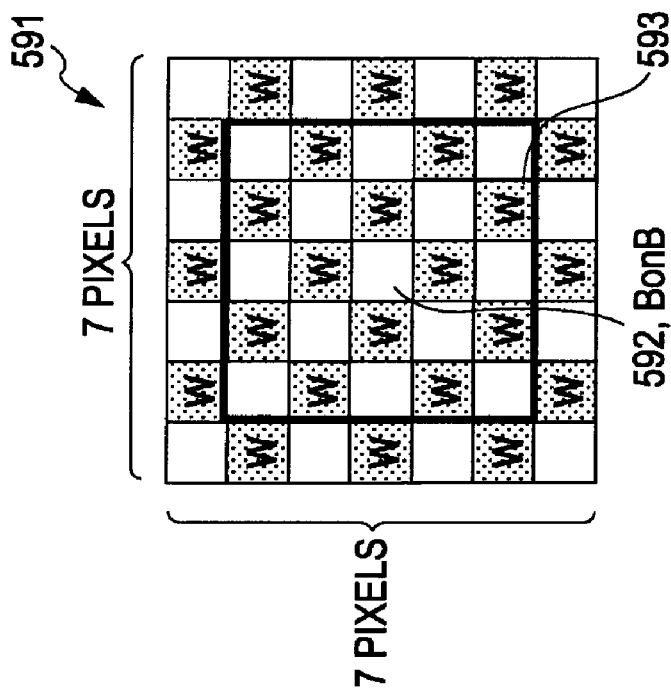
FIG. 19 is a diagram for describing a filter configuration for calculating low-frequency component mB of a B signal, and an example of mB calculation processing.

Further, the B-position B-interpolation parameter calculation unit 213 calculates the low-frequency component mB of the B signals to be used at the time of B signal estimation when calculating the corrected B pixel values for B pixels. The smoothing filter 582 shown in FIG. 19 is used for calculation of the low-frequency component mB of the B signals. The pixels with numbers indicating filter coefficients are R-pixel corresponding positions.

Of the 7×7 pixels which is a processing increment of the input signals 591, only the middle 5×5 pixel region 593 is used in this processing example. The smoothing filter 582 shown in FIG. 19 is applied to the middle 5×5 pixel region 593 of the input signals 591 of 7×7 pixels to calculate the low-frequency component mB of the B signals. The B pixel to be corrected here is the pixel-to-be-converted 592 at the center of the input signals 591 of 7×7 pixels.

The smoothing filter 582 has the coefficients of B pixels at the position corresponding to the position corresponding to the pixel-to-be-converted 592 set higher, and the coefficients of surrounding B pixel positions set lower. 4⁄8 to 1⁄8 has been set as the coefficient.

The smoothing filter 582 is applied to calculate the low-frequency component mB. At the time of calculation processing of mB, the pixel values of the B pixels positions in the middle 5×5 pixel region 593 of the input signals 591 of 7×7 pixels are multiplied by the filter coefficients at the corresponding pixel positions in the smoothing filter 582, and the added value of the multiplication results is calculated as the low-frequency component mB of the B signals. Note that the filter coefficient setting example of the smoothing filter 582 shown in FIG. 19 is only one example, and a configuration may be made wherein other filter coefficients are set.

We will assume that the ratio of the mW and mB calculated in this way is maintained in the local region within the image. According to this assumption, the pixel value ratio of W and B in the local region is in the corresponding relation shown in the graph in FIG. 16B. If we say that the ratio of W pixel values and B pixel values is constant in particular narrow local regions of the image, we can assume that these are in a proportionate relation as indicated by the straight line in FIG. 16B. Under this assumption, we will calculate a blurring-corrected B signal Bd using the blurring-corrected white W signal Wd at the pixel-to-be-converted position output from the blurring correction processing unit 203, following the expression $$Bd=(mB/mW)Wd$$

where the signal Bd is a B signal including the high-frequency component.

Note that an estimation technique has been illustrated as an example wherein the ratio of the W pixel values and B pixel values is assumed to be constant, but other estimation techniques using the correlation between W pixel values and B pixel values may be used.

Calculation processing of the blurring-uncorrected B signal Bl is further performed. The smoothing filter 564 described earlier with reference to FIG. 17 is used to calculate W signals Wn with noise signals removed. In this case, the pixel-to-be-converted 552 of the of the input signals 551 of 7×7 pixels is a B pixel. Just the four W pixels around the pixel-to-be-converted 552 in the 5×5 pixel region 553 centered on the B-pixel position of the pixel-to-be-converted 552 are multiplied by the filter coefficients of the smoothing filter 564 in which filter coefficients have been set, so as to calculate the added value of the multiplication results as a noise-removed white W signal Wn. The filter coefficients of the smoothing filter 564 are set to ¼ for the pixel-to-be-converted 552 and the surrounding W pixels. Note that these filter coefficients are only one example, and a configuration may be made wherein other coefficients are used.

This noise-removed W signal Wn and the low-frequency components mW and mB of the W signal and B signal are applied to calculate the B signal without blurring correction Bl with the following expression.

$$Bl=(mB/mW)Wn$$

Note that this signal Bl is not that with the blurring correction signal Wd applied, and corresponds to a B signal in which the high-frequency component has not been enhanced.

Note that an estimation technique has been illustrated as an example wherein the ratio of the W pixel values and B pixel values is assumed to be constant, but other estimation techniques using the correlation between W pixel values and B pixel values may be used.

The weight adding processing unit 215 blends the two signals Bd and Bl according to the edge information of the pixel-to-be-converted, and determines the final B pixel value. Specifically, the weight adding processing unit 215 performs blending processing so as to set the ratio of blurring-corrected B signals Bd so as to be high at edge portions which are not flat and the degree of texture is high, and set the ratio of blurring-corrected B signals Bl so as to be high at flat portions, so as to determine the final B pixel value. This processing will be described later.

As described above, the W-position G-interpolation parameter calculation unit 211, G-position RB-interpolation parameter calculation unit 212, R-position R-interpolation parameter calculation unit 213, and B-position B-interpolation parameter calculation unit 214 calculate blurring-corrected G, R, and B signals Gd, Rd, and Bd, and blurring-uncorrected G, R, and B signals Gl, Rl, and Bl.

Next, the processing at the weight adding processing unit 215 will be described. The weight adding processing unit 215 applies edge information input from the edge detecting unit 202 to calculate the weighted mean values Gr, Rr, and Br of the blurring-corrected signals Gd, Rd, and Bd, and blurring-uncorrected signals Gl, Rl, and Bl. The Gr, Rr, and Br calculated by the weight adding processing unit 215 correspond to the R, G, and B pixel values of the pixels making up the RGB array (Bayer array) 182.

The Gd, Rd, and Bd, calculated at each of the W-position G-interpolation parameter calculation unit 211, G-position RB-interpolation parameter calculation unit 212, R-position R-interpolation parameter calculation unit 213, and B-position B-interpolation parameter calculation unit 214, have been calculated using the blurring-corrected W signal Wd which the blurring correction processing unit 203 has generated as a W signal subjected to blurring correction processing, and accordingly are signals which include high-frequency signal components and also have amplified noise. On the other hand, Gl, Rl, and Bl are signals calculated from W signals with no blurring correction processing having been performed, and accordingly are signals which do not include high-frequency signal components and have little noise.

The weight adding processing unit 215 determines the blend ratio of the blurring-corrected signals Gd, Rd, and Bd, and blurring-uncorrected signals Gl, Rl, and Bl, in accordance with the edge information of the pixels to be converted, so as to perform blending processing and determine the final G, R, and B pixel values. Specifically, at edge portions which are not flat portions and have more texture, the ratio of the blurring-corrected signals Gd, Rd, and Bd is raised, and at flat portions, the ratio of the blurring-uncorrected signals Gl, Rl, and Bl is raised in the blending processing, thereby determining the final G, R, and B pixel values.

While it is preferable to have sharp signals with high-frequency components restored near the edge, the flat portions do not include high-frequency components to begin with and accordingly signals with noise suppressed are preferable. Accordingly, the weight adding processing unit 215 performs weighted mean processing on the blurring-corrected signals Gd, Rd, and Bd, and blurring-uncorrected signals Gl, Rl, and Bl, according to the following expressions, corresponding to the edge information of pixels to be processed calculated at the edge detecting unit 202, so as to calculate the pixels values Gr, Rr, and Br, to be set to the RGB array 182.

$$Gr=(\text{weightFlat})\times(Gd)+(1-\text{weightFlat})\times Gl$$

$$Br=(\text{weightFlat})\times(Bd)+(1-\text{weightFlat})\times Bl$$

$$Rr=(\text{weightFlat})\times(Rd)+(1-\text{weightFlat})\times Rl$$

The pixels values Gr, Rr, and Br obtained as a result of these calculations are set as signals to the RGB array 182, and output to the RGB signal processing unit 250 According to this processing, high-resolution Gr, Rr, and Br signals can be obtained while suppressing amplification of noise.

The RGB array (Bayer array) 182 configured of the Gr, Rr, and Br signals generated by the weight adding processing unit 215 is supplied to the RGB signal processing unit 250 as shown in FIGS. 3 and 4. The RGB signal processing unit 250 is similar to a signal processing unit for processing an RGB array (Bayer array) signal in a common camera or image processing device. The RGB signal processing unit 250 subjects the RGB array (Bayer array) 182 output from the weight adding processing unit 215 to signal processing, and generates a color image 183 (see FIG. 3). More particularly, the RGB signal processing unit 250 performs white balance adjustment processing, demosaic processing, shading processing, RGB color matrix processing, γ correction processing, and so forth, to generate the color image 183.

While the above embodiment has been described as an example of processing on the RGBW array shown in FIG. 1B, embodiments of the present invention are not restricted to this color array, and is applicable to conversion processing of various types of color arrays having W pixels with a higher sampling rate than color signals into color signal arrays not including W pixels.

4. Embodiment of Performing Demosaic Processing on RGBW Array Signals

The above-described embodiment is an embodiment wherein re-mosaic processing for converting RGBW array signals into an RGB array according to the related art is performed, following which the RGB signal processing unit 250 performs demosaic processing and the like using the RGB array (Bayer array) similar to that in the related art, to generate a color image. The following is description is an embodiment wherein re-mosaic processing for converting RGBW array signals into an RGB array according to the related art is not performed, and demosaic processing is directly applied to the RGBW signals to calculate RGB pixels values corresponding to the pixels in the RGBW signals, so as to generate a color image.

Figure 20:
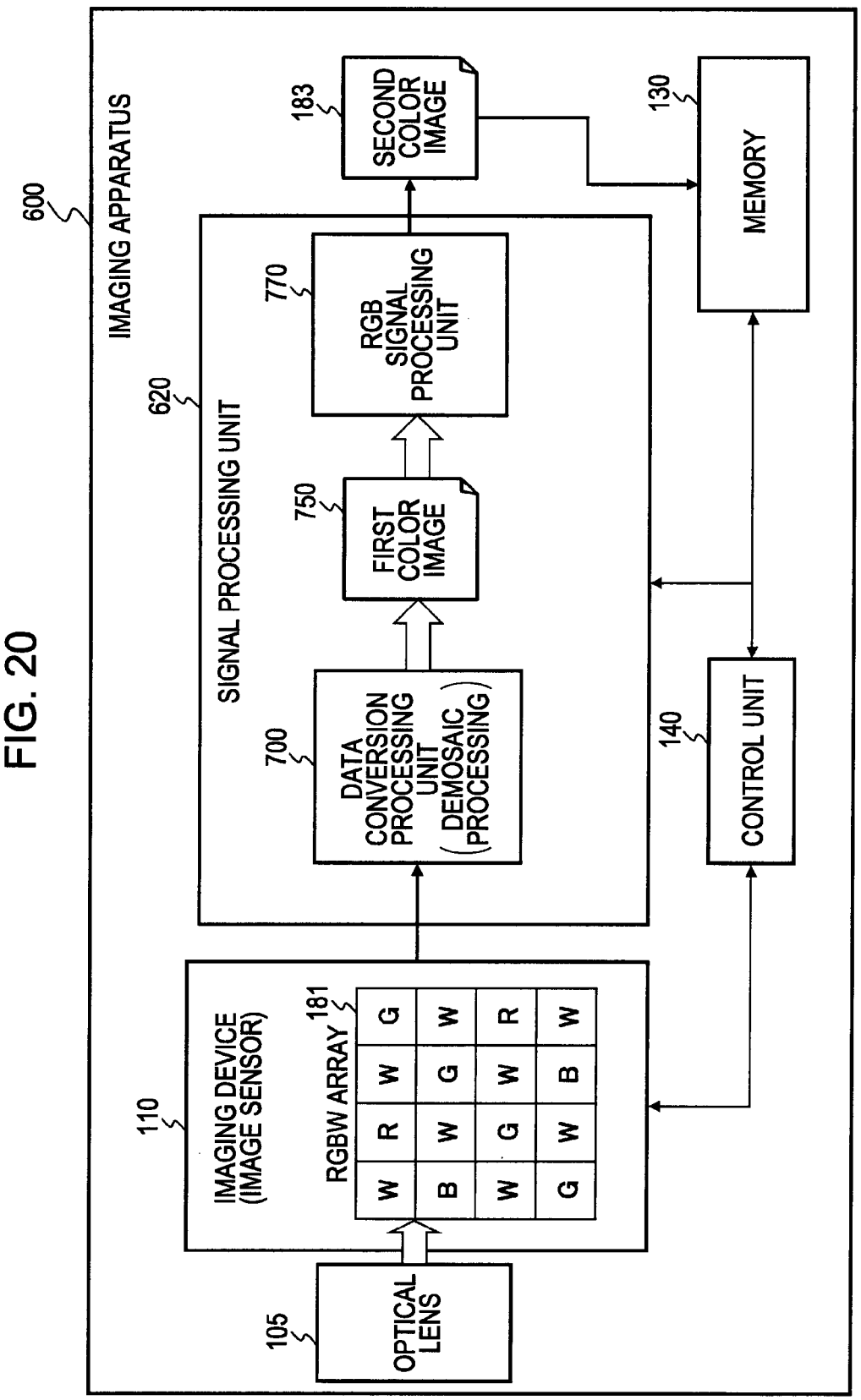
FIG. 20 is a diagram for describing a configuration example of an imaging apparatus of an embodiment.

FIG. 20 is a diagram illustrating a configuration example of an imaging apparatus 600 according to the present embodiment. The imaging apparatus 600 includes an optical lens 105, an imaging device (image sensor) 110, signal processing unit 620, memory 130, and a control unit 140. The signal processing unit 620 includes a data conversion processing unit 700 for performing demosaic processing and generating a first color image 750, and an RGB signal processing unit 770 for performing image correction processing and so forth on the first color image 750. Note that while one form of the image processing device is an imaging apparatus, in the event that a PC or the like is the image processing device, the image processing device does not have the optical lens 105 or imaging device 110 of the imaging apparatus 600 shown in FIG. 20, and is configured of the other components.

The imaging apparatus 600 according to the present embodiment and the imaging apparatus 100 described with reference to FIG. 3 differ in the configuration of the signal processing unit 620. Other configurations are the same, and accordingly description thereof will be omitted here. The detailed configuration of the signal processing unit 620 will be described with reference to FIG. 21. The signal processing unit 620 includes the data conversion processing unit 700 which performs demosaic processing to generate the first color image 750, and the RGB signal processing unit 770 which performs image correction processing and so forth on the first color image 750.

Figure 21:
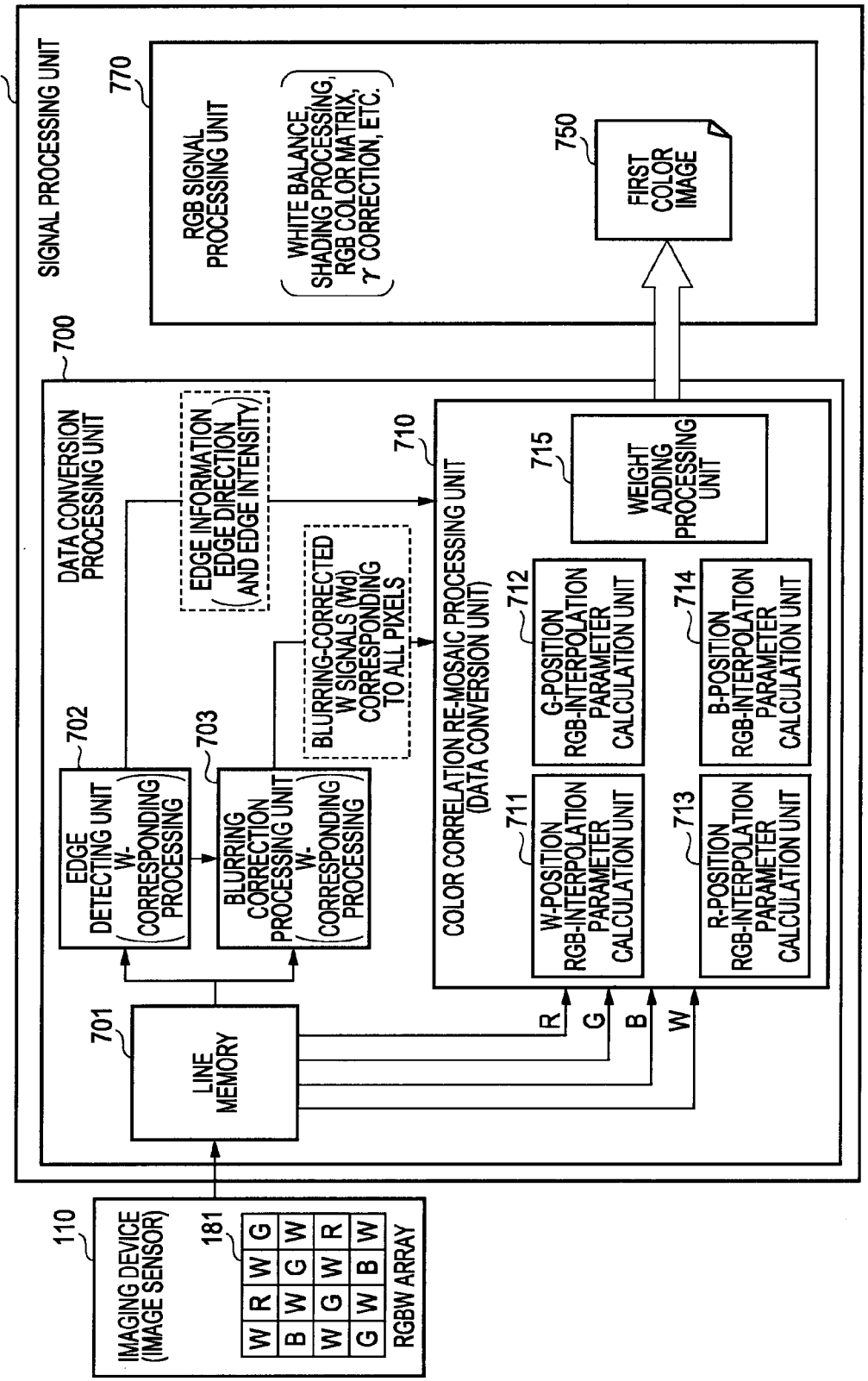
FIG. 21 is a diagram for describing a configuration example of an imaging apparatus of an embodiment.

As shown in FIG. 21, the data conversion processing unit 700 includes line memory 701, an edge detecting unit 702, a blurring correction processing unit 703, and a color correlation re-mosaic processing unit (data conversion unit) 710. The color correlation re-mosaic processing unit (data conversion unit) 710 includes a W-position RGB-interpolation parameter calculation unit 711, a G-position RGB-interpolation parameter calculation unit 712, an R-position RGB-interpolation parameter calculation unit 713, a B-position RGB-interpolation parameter calculation unit 714, and a weight adding processing unit 715.

Signals output from the imaging device 110 are temporarily stored in the line memory 701. The line memory 701 has seven horizontal lines worth line memory for the imaging device, and seven horizontal lines with of data are sequentially output in parallel from the line memory 701. The output destinations are the edge detecting unit 702, blurring correction processing unit 703, and color correlation re-mosaic processing unit 710. Seven lines at a time of imaged data of the RGBW array 181 are output to these processing units.

The edge detecting unit 702 and blurring correction processing unit 703 execute processing the same as with the edge detecting unit 102 and blurring correction processing unit 103 described in the previous embodiment with reference to FIG. 4. The edge detecting unit 702 verifies the discrete white (W) signals included in the output signals from the line memory 701, generates edge information including the edge direction and edge intensity, for example, included in the image, such as flatness information (weightFlat), and outputs to the color correlation re-mosaic processing unit 710.

The blurring correction processing unit 703 verifies the discrete white (W) signals included in the output signals from the line memory 701, performs processing for reducing image blurring, calculates blurring-corrected white (W) signals Wd corresponding to all pixels obtained as the result of the processing, and outputs to the color correlation re-mosaic processing unit 710.

The color correlation re-mosaic processing unit 710 inputs the RGBW signals in the output signals from the line memory 701, the edge information output from the edge detecting unit 702, and the blurring-corrected white (W) signals Wd corresponding to all pixels output from the blurring correction processing unit 703. The color correlation re-mosaic processing unit 710 then uses this information to perform demosaic processing of the RGBW color array, performs processing to generate RGB signals corresponding to each pixel, and generates the first color image 750.

The first color image 750 is a color image in which all RGB pixels values have been set for the pixels. The first color image 750 is supplied to the RGB signal processing unit 770, subjected to white balance adjustment processing, shading processing, RGB color matrix processing, γ correction processing, and so forth, to generate the second color image 183. With the present embodiment, the data conversion processing unit 700 performs the demosaic processing of the RGBW image, so the RGB signal processing unit 770 does not perform demosaic processing.

The color correlation re-mosaic processing unit 710 of the data conversion processing unit 700 includes the W-position RGB-interpolation parameter calculation unit 711, G-position RGB-interpolation parameter calculation unit 712, R-position RGB-interpolation parameter calculation unit 713, B-position RGB-interpolation parameter calculation unit 714, and weight adding processing unit 715. The W-position RGB-interpolation parameter calculation unit 711 calculates interpolation parameters to be applied to calculation processing of RGB pixel values to be set to the W-pixel positions included in the RGBW array, the G-position RGB-interpolation parameter calculation unit 712 calculates interpolation parameters to be applied to calculation processing of RGB pixel values to be set to the G-pixel positions included in the RGBW array, the, R-position RGB-interpolation parameter calculation unit 713 calculates interpolation parameters to be applied to calculation processing of RGB pixel values to be set to the R-pixel positions included in the RGBW array, and the B-position RGB-interpolation parameter calculation unit 714 calculates interpolation parameters to be applied to calculation processing of RGB pixel values to be set to the B-pixel positions included in the RGBW array.

The interpolation parameters to be calculated by the processing units are blurring-corrected RGB signals Rd, Gd, and Bd, and blurring-uncorrected RGB signals Rl, Gl, and Bl.

These signals are signals having similar nature to the signals described in the previous embodiment.

The processing of the W-position RGB-interpolation parameter calculation unit 711 will be described with reference to FIGS. 22 and 23. The W-position RGB-interpolation parameter calculation unit 711 calculates interpolation parameters to be applied to calculation processing of RGB pixel values to be set to the W-pixel positions included in the RGBW array.

The interpolation parameter calculation units 711 through 714 of the data conversion processing unit 700 execute processing basically in the same way as with the embodiment described above, with 7×7 pixel regions as increments of processing. The data which is to be processed by the W-position RGB-interpolation parameter calculation unit 711 is that with a W pixel as the center pixel of the 7×7 pixel region, and the parameters of blurring-corrected RGB signals Rd, Gd, and Bd, and blurring-uncorrected RGB signals Rl, Gl, and Bl, are calculated as interpolation parameters for calculating R, G, and B pixel values corresponding to the W-pixel position of the center pixel.

The calculation expressions for these interpolation parameters are the same as with the earlier embodiment. That is to say, the interpolation parameters are calculated based on the assumption that the ratios of the W signal which is the primary component of luminance in the RGBW array, as to the G, R, and B signals which are color components will each be maintained as similar ratios locally. As shown in FIGS. 22 and 23, the calculation expressions of $Rd=(mR/mW)Wd$ $Rl=(mR/mW)Wn$ $Gd=(mG/mW)Wd$ $Gl=(mG/mW)Wn$ $Bd=(mB/mW)Wd$ $Bl=(mB/mW)Wn$ are used to calculate the six interpolation parameters of Rd, Gd, Bd, Rl, Gl, and Bl. While an estimation technique has been illustrated as an example wherein the ratio of the W pixel values and G pixel values, R pixel values, or B pixel values, is assumed to be constant, other estimation techniques using the correlation between W pixel values and G pixel values, R pixel values, or B pixel values, may be used.

Note that mW represents the low-frequency component of the W signals, in the same way as with the description made above with reference to FIG. 10. Also, Wn represents noise-removed white (W) signals in the same way as with the description made above with reference to FIG. 13. Further, a configuration may be made wherein W signals input from the line memory 701 are used as they are, to reduce computation costs. Note that mR is the low-frequency component of R signals, mG is the low-frequency component of G signals, and mB is the low-frequency component of B signals.

Figure 22:
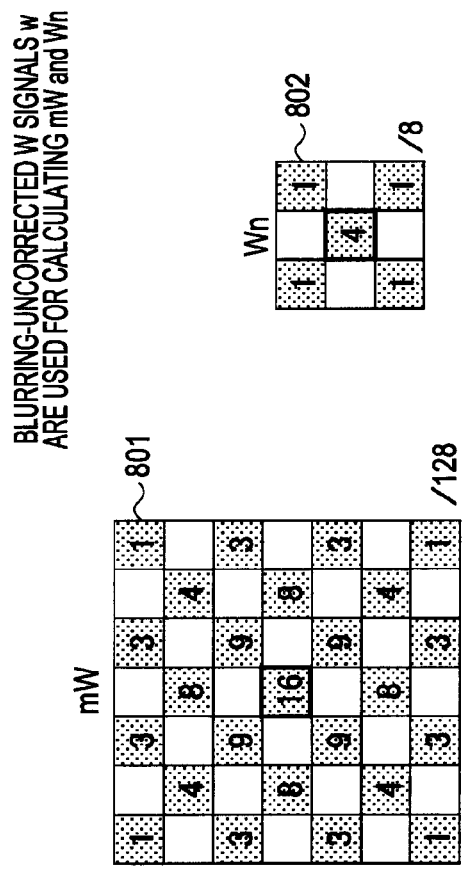
FIG. 22 is a diagram for describing processing of a W-position RGB-interpolation parameter calculating unit shown in FIG. 21.
Figure 23:
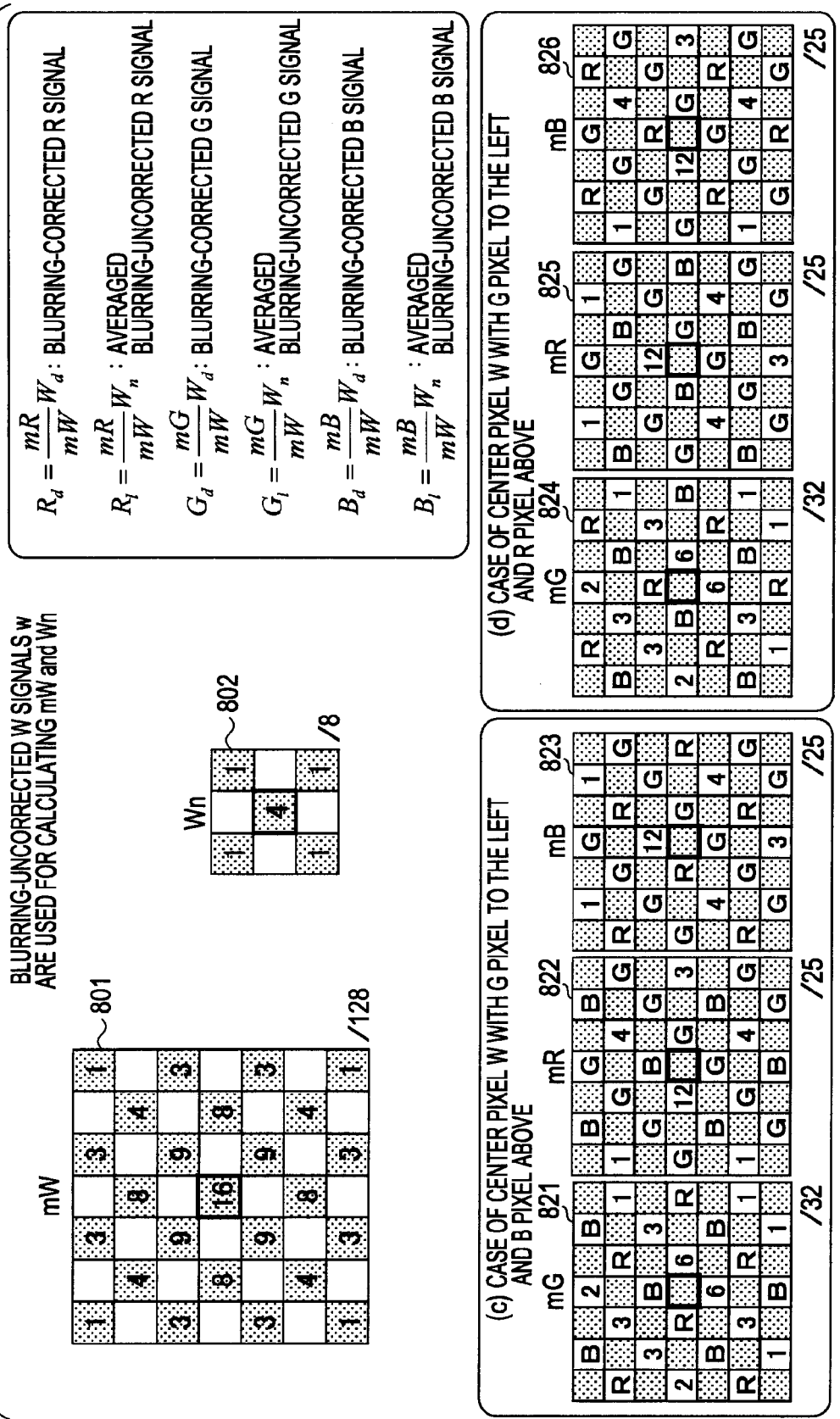
FIG. 23 is a diagram for describing processing of the W-position RGB-interpolation parameter calculating unit shown in FIG. 21.

FIGS. 22 and 23 illustrate filters to be applied to calculation of these values, which are an mW-calculation filter 801, a Wn-calculation filter 802, mG-calculation filters 811, 814, 821, and 824, mR-calculation filters 812, 815, 822, and 825, and mB-calculation filters 813, 816, 823, and 826. The gray portions shown in the filters are positions corresponding to W pixels, and the white portions are positions corresponding to RGB pixels. The numbers within the filters are filter coefficients, wherein the portions in the mW/Wn calculation filter where filter coefficients are shown are positions corresponding to W pixels, the portions in the mG calculation filter where filter coefficients are shown are positions corresponding to G pixels, the portions in the mR calculation filter where filter coefficients are shown are positions corresponding to R pixels, and the portions in the mB calculation filter where filter coefficients are shown are positions corresponding to B pixels.

These filters are applied to input signals of a 7×7 pixel region with the W pixel to be processed at the center pixel. Applying these filters calculates the values of mW, Wn, mG, mR, and mB. While the input signals for calculation of these values are preferably W signals regarding which other blurring correction processing has not been performed, blurring-corrected W signals Wd following blurring correction processing, which the blurring correction processing unit 703 has generated, may be used to reduce computation costs. Also, a 3×3 filter is applied for calculation of Wn as shown in the drawings, and an arrangement may be made wherein only the 3×3 pixels centered on the center pixel of the 7×7 pixel region of the input signals are subjected to this processing.

The filters shown in FIGS. 22 and 23 are filters to be applied at the W-position RGB-interpolation parameter calculation unit 711, and are filters to be applied to input signals of the 7×7 pixel region with the W pixel regarding which an RGB pixel value is to be obtained at the center pixel. Also, each of the mG calculation filter, mR calculation filter, and mB calculation filter, shown to the bottom in FIGS. 22 and 23 have different filter configurations to be applied, depending on the pixel layout of the input 7×7 pixel region to be processed.

FIGS. 22 and 23 show filter configurations according to the layout of surrounding pixels of the center pixel W in the 7×7 pixel region to be processed, with regard to four types of data to be processed. Here, (a) represents a case wherein the pixel to the left of the center pixel W is a G pixel and the pixel to the right is a B pixel, (b) represents a case wherein the pixel to the left of the center pixel W is a G pixel and the pixel to the right is an R pixel, (c) represents a case wherein the pixel to the right of the center pixel W is a G pixel and the pixel above is a B pixel, and (d) represents a case wherein the pixel to the right of the center pixel W is a G pixel and the pixel above is an R pixel.

The W-position RGB-interpolation parameter calculation unit 711 calculates the values of mW, Wn, mG, mR, and mB, by applying the filters shown in FIGS. 22 and 23 on the input signals of the 7×7 pixel region with the W pixel at the center pixel. The pixel values of the input signals of the 7×7 pixel region are multiplied by the filter coefficients at the corresponding pixel positions of each of the filters, the multiplication results are added, and the values of mW, Wn, mG, mR, and mB, are calculated.

We will assume that the ratios of mW, Wn, mG, mR, and mB, calculated by application of the filters, will be maintained within a local region within the image. Following this assumption, the six interpolation parameters of Rd, Gd, Bd, Rl, Gl, and Bl are calculated according to the following expressions.

$Rd=(mR/mW)Wd$ $Rl=(mR/mW)Wn$ $Gd=(mG/mW)Wd$ $Gl=(mG/mW)Wn$ $Bd = (mB/mW)Wd$ $Bl = (mB/mW)Wn$

While an estimation technique has been illustrated as an example wherein the ratio of the W pixel values and G pixel values, R pixel values, or B pixel values, is assumed to be constant, other estimation techniques using the correlation between W pixel values and G pixel values, R pixel values, or B pixel values, may be used.

The weight adding processing unit 715 determines the blend ratio between Rd and Rl, the blend ratio between Gd and Gl, and the blend ratio between Bd and Bl, in accordance with the edge information of the pixel to be converted, and further determines the final R pixel value from the blending processing of Rd and Rl, determines the final G pixel value from the blending processing of Gd and Gl, and determines the final B pixel value from the blending processing of Bd and Bl.

Specifically, blending processing is performed wherein, at the edge portions which are not flat and there is more texture, the ratio of the blurring-corrected RGB signals Rd, Gd, and Bd, is raised, and at flat portions the ratio of the blurring-uncorrected RGB signals Rl, Gl, and Bl is raised, so as to determine final RGB pixel values.

The weight adding processing unit 715 performs weighted mean processing in accordance with the edge information of the pixel to be processed that has been calculated at the edge detecting unit 702, i.e., the flatness (weightFlat), and calculates the pixel values for each of R, G, and B, for the W pixel positions in the RGBW array 181. Specifically, the RGB pixel values are determined by the following expressions.

$R = (\text{weightFlat}) \times (Rd) + (1 - \text{weightFlat}) \times Rl$ $G = (\text{weightFlat}) \times (Gd) + (1 - \text{weightFlat}) \times Gl$ $B = (\text{weightFlat}) \times (Bd) + (1 - \text{weightFlat}) \times Bl$ The R, G, and B, obtained as a result of the calculation of these expressions are determined as the pixel values for RGB at the W pixel position in the RGBW array 181.

Next, The processing of the G-position RGB-interpolation parameter calculation unit 712 will be described with reference to FIG. 24. The G-position RGB-interpolation parameter calculation unit 712 calculates interpolation parameters to be applied to calculation processing of RGB pixel values to be set to the G-pixel positions included in the RGBW array.

The data which is to be processed by the G-position RGB-interpolation parameter calculation unit 712 is that with a G pixel as the center pixel of the 7×7 pixel region, and the parameters of blurring-corrected RGB signals Rd, Gd, and Bd, and blurring-uncorrected RGB signals Rl, Gl, and Bl, are calculated as interpolation parameters for calculating R, G, and B pixel values corresponding to the G-pixel position of the center pixel.

The calculation expressions for these interpolation parameters are the same as with the earlier embodiment. That is to say, the interpolation parameters are calculated based on the assumption that the ratios of the W signal which is the primary component of luminance in the RGBW array, as to the G, R, and B signals which are color components will each be maintained as similar ratios locally. Specifically, as shown in FIG. 24, the calculation expressions of $Rd = (mR/mW)Wd$ $Rl = (mR/mW)Wn$ $Gd = (mG/mW)Wd$ $Gl = (mG/mW)Wn$ $Bd = (mB/mW)Wd$ $Bl = (mB/mW)Wn$ are used to calculate the six interpolation parameters of Rd, Gd, Bd, Rl, Gl, and Bl. While an estimation technique has been illustrated as an example wherein the ratio of the W pixel values and G pixel values, R pixel values, or B pixel values, is assumed to be constant, other estimation techniques using the correlation between W pixel values and G pixel values, R pixel values, or B pixel values, may be used.

Here, mW represents the low-frequency component of the W signals, Wn represents noise-removed W signals, mR represents the low-frequency component of R signals, mG represents the low-frequency component of G signals, and mB represents the low-frequency component of B signals.

Figure 24:
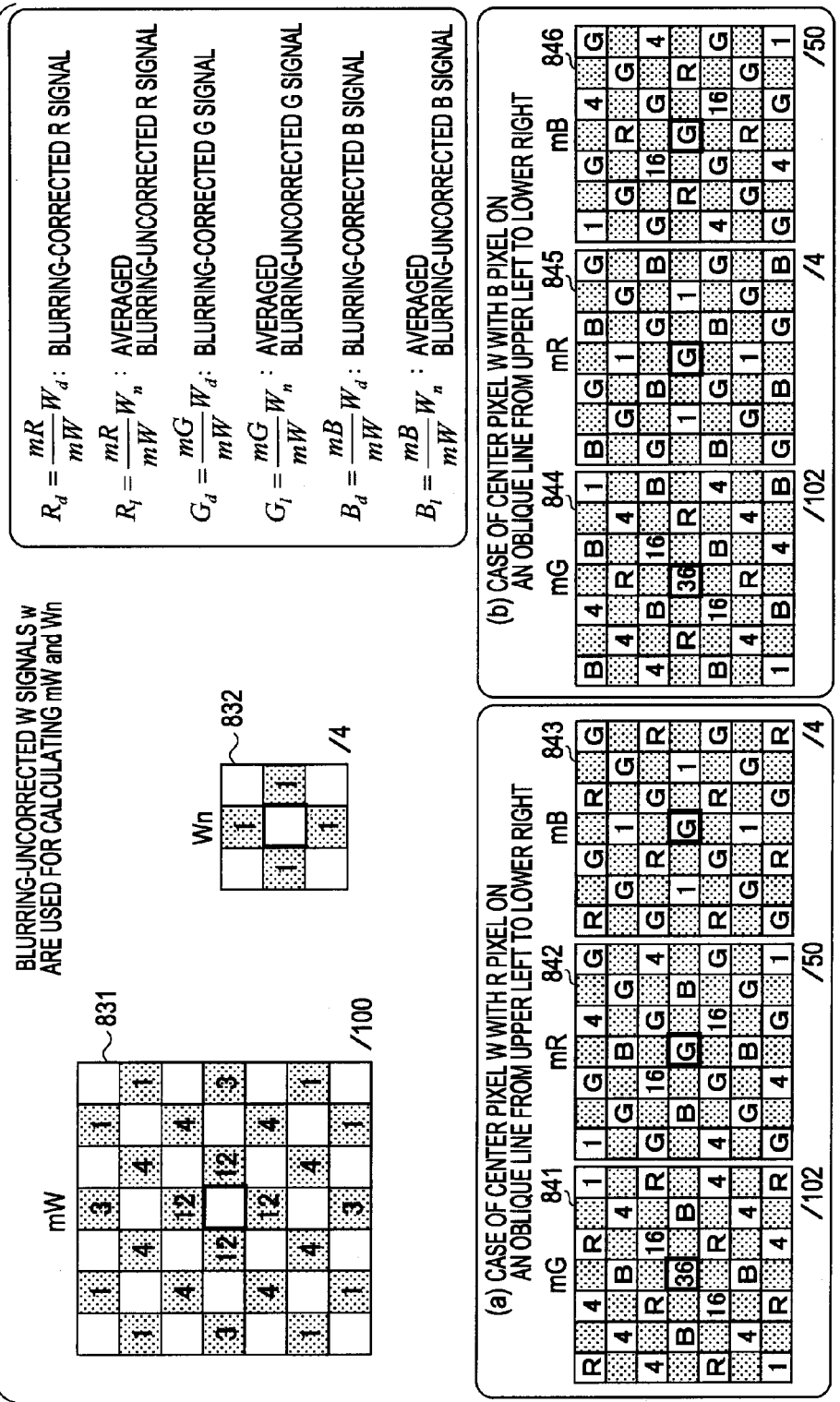
FIG. 24 is a diagram for describing processing of a G-position RGB-interpolation parameter calculating unit shown in FIG. 21.

FIG. 24 illustrate filters to be applied to calculation of these values, which are an mW-calculation filter 831, a Wn-calculation filter 832, mG-calculation filters 841 and 844, mR-calculation filters 842 and 845, and mB-calculation filters 843 and 846. The gray portions shown in the filters are positions corresponding to W pixels, and the white portions are positions corresponding to RGB pixels. The numbers within the filters are filter coefficients, wherein the portions in the mW/Wn calculation filter where filter coefficients are shown are positions corresponding to W pixels, the portions in the mG calculation filter where filter coefficients are shown are positions corresponding to G pixels, the portions in the mR calculation filter where filter coefficients are shown are positions corresponding to R pixels, and the portions in the mB calculation filter where filter coefficients are shown are positions corresponding to B pixels.

These filters are applied to input signals of a 7×7 pixel region with the G pixel to be processed at the center pixel. Applying these filters calculates the values of mW, Wn, mG, mR, and mB. While the input signals for calculation of these values are preferably W signals regarding which other blurring correction processing has not been performed, blurring-corrected W signals Wd following blurring correction processing, which the blurring correction processing unit 703 has generated, may be used to reduce computation costs. Also, a 3×3 filter is applied for calculation of Wn as shown in the drawings, and an arrangement may be made wherein only the 3×3 pixels centered on the center pixel of the 7×7 pixel region of the input signals are subjected to this processing.

The filters shown in FIG. 24 are filters to be applied at the G-position RGB-interpolation parameter calculation unit 712, and are filters to be applied to input signals of the 7×7 pixel region with the G pixel regarding which an RGB pixel value is to be obtained at the center pixel. Also, each of the mG calculation filter, mR calculation filter, and mB calculation filter, shown to the bottom in FIG. 24 have different filter configurations to be applied, depending on the pixel layout of the pixels in the input 7×7 pixel region to be processed.

FIG. 24 shows filter configurations according to the layout of surrounding pixels of the center pixel W in the 7×7 pixel region to be processed. Here, filter are shown to be applied to two types of data to be processed, i.e., (a) represents a case wherein there is an R pixel on an oblique line to the upper left or lower right of the center pixel G, and (b) represents a case wherein there is a B pixel on an oblique line to the upper left or lower right of the center pixel G.

The G-position RGB-interpolation parameter calculation unit 712 calculates the values of mW, Wn, mG, mR, and mB, by applying the filters shown in FIG. 24 on the input signals of the 7×7 pixel region with the Gpixel at the center pixel. The pixel values of the input signals of the 7×7 pixel region are multiplied by the filter coefficients at the corresponding pixel positions of each of the filters, the multiplication results are added, and the values of mW, Wn, mG, mR, and mB, are calculated.

We will assume that the ratios of mW, Wn, mG, mR, and mB, calculated by application of the filters, will be maintained within a local region within the image. Following this assumption, the six interpolation parameters of Rd, Gd, Bd, Rl, Gl, and Bl are calculated according to the following expressions.

$$Rd=(mR/mW)Wd$$

$$Rl=(mR/mW)Wn$$

$$Gd=(mG/mW)Wd$$

$$Gl=(mG/mW)Wn$$

$$Bd=(mB/mW)Wd$$

$$Bl=(mB/mW)Wn$$

While an estimation technique has been illustrated as an example wherein the ratio of the W pixel values and G pixel values, R pixel values, or B pixel values, is assumed to be constant, other estimation techniques using the correlation between W pixel values and G pixel values, R pixel values, or B pixel values, may be used.

The weight adding processing unit 715 determines the blend ratio between Rd and Rl, the blend ratio between Gd and Gl, and the blend ratio between Bd and Bl, in accordance with the edge information of the pixel to be converted, and further determines the final R pixel value from the blending processing of Rd and Rl, determines the final G pixel value from the blending processing of Gd and Gl, and determines the final B pixel value from the blending processing of Bd and Bl.

Specifically, blending processing is performed wherein, at the edge portions which are not flat and there is more texture, the ratio of the blurring-corrected RGB signals Rd, Gd, and Bd, is raised, and at flat portions the ratio of the blurring-uncorrected RGB signals Rl, Gl, and Bl is raised, so as to determine final RGB pixel values.

The weight adding processing unit 715 performs weighted mean processing in accordance with the edge information of the pixel to be processed that has been calculated at the edge detecting unit 702, i.e., the flatness (weightFlat), and calculates the pixel values for each of R, G, and B, for the G pixel positions in the RGBW array 181. Specifically, the RGB pixel values are determined by the following expressions.

$$R=(\text{weightFlat})\times(Rd)+(1-\text{weightFlat})\times Rl$$

$$G=(\text{weightFlat})\times(Gd)+(1-\text{weightFlat})\times Gl$$

$$B=(\text{weightFlat})\times(Bd)+(1-\text{weightFlat})\times Bl$$

The R, G, and B, obtained as a result of the calculation of these expressions are determined as the pixel values for RGB at the G pixel position in the RGBW array 181.

Next, The processing of the R-position RGB-interpolation parameter calculation unit 713 will be described with reference to FIG. 25. The R-position RGB-interpolation parameter calculation unit 713 calculates interpolation parameters to be applied to calculation processing of RGB pixel values to be set to the R-pixel positions included in the RGBW array.

The data which is to be processed by the R-position RGB-interpolation parameter calculation unit 713 is that with a R pixel as the center pixel of the 7×7 pixel region, and the parameters of blurring-corrected RGB signals Rd, Gd, and Bd, and blurring-uncorrected RGB signals Rl, Gl, and Bl, are calculated as interpolation parameters for calculating R, G, and B pixel values corresponding to the R-pixel position of the center pixel. The calculation expressions for these interpolation parameters are the same as with the embodiment described earlier.

As described with the earlier embodiment, the interpolation parameters are calculated based on the assumption that the ratios of the W signal which is the primary component of luminance in the RGBW array, as to the G, R, and B signals which are'color components will each be maintained as similar ratios locally. Specifically, as shown in FIG. 25, the calculation expressions of $$Rd=(mR/mW)Wd$$

$$Rl=(mR/mW)Wn$$

$$Gd=(mG/mW)Wd$$

$$Gl=(mG/mW)Wn$$

$$Bd=(mB/mW)Wd$$

$$Bl=(mB/mW)Wn$$

are used to calculate the six interpolation parameters of Rd, Gd, Bd, Rl, Gl, and Bl. While an estimation technique has been illustrated as an example wherein the ratio of the W pixel values and G pixel values, R pixel values, or B pixel values, is assumed to be constant, other estimation techniques using the correlation between W pixel values and G pixel values, R pixel values, or B pixel values, may be used.

Here, mW represents the low-frequency component of the W signals, Wn represents noise-removed W signals, mR represents the low-frequency component of R signals, mG represents the low-frequency component of G signals, and mB represents the low-frequency component of B signals.

FIG. 25 illustrate filters to be applied to calculation of these values, which are an mW-calculation filter 831, a Wn-calculation filter 832, mG-calculation filter 851, mR-calculation filter 852, and mB-calculation filter 853. The gray portions shown in the filters are positions corresponding to W pixels, and the white portions are positions corresponding to RGB pixels. The numbers within the filters are filter coefficients, wherein the portions in the mG calculation filter where filter coefficients are shown are positions corresponding to G pixels, the portions in the mR calculation filter where filter coefficients are shown are positions corresponding to R pixels, and the portions in the mB calculation filter where filter coefficients are shown are positions corresponding to B pixels.

These filters are applied to input signals of a 7×7 pixel region with the R pixel to be processed at the center pixel. Applying these filters calculates the values of mW, Wn, mG, mR, and mB. While the input signals for calculation of these values are preferably W signals regarding which other blurring correction processing has not been performed, blurring-corrected W signals Wd following blurring correction processing, which the blurring correction processing unit 703 has generated, may be used to reduce computation costs. Also, a 3×3 filter is applied for calculation of Wn as shown in the drawings, and an arrangement may be made wherein only the 3×3 pixels centered on the center pixel of the input 7×7 pixel region are subjected to this processing.

The filters shown in FIG. 25 are filters to be applied at the R-position RGB-interpolation parameter calculation unit 713, and are filters to be applied to input signals of the 7×7 pixel region with the R pixel regarding which an RGB pixel value is to be obtained at the center pixel.

The R-position RGB-interpolation parameter calculation unit 713 calculates the values of mW, Wn, mG, mR, and mB, by applying the filters shown in FIG. 25 on the input signals of the 7×7 pixel region with the R pixel at the center pixel. The pixel values of the input signals of the 7×7 pixel region are multiplied by the filter coefficients at the corresponding pixel positions of each of the filters, the multiplication results are added, and the values of mW, Wn, mG, mR, and mB, are calculated.

We will assume that the ratios of mW, Wn, mG, mR, and mB, calculated by application of the filters, will be maintained within a local region within the image. Following this assumption, the six interpolation parameters of Rd, Gd, Bd, Rl, Gl, and Bl are calculated according to the following expressions.

$$Rd=(mR/mW)Wd$$

$$Rl=(mR/mW)Wn$$

$$Gd=(mG/mW)Wd$$

$$Gl=(mG/mW)Wn$$

$$Bd=(mB/mW)Wd$$

$$Bl=(mB/mW)Wn$$

While an estimation technique has been illustrated as an example wherein the ratio of the W pixel values and G pixel values, R pixel values, or B pixel values, is assumed to be constant, other estimation techniques using the correlation between W pixel values and G pixel values, R pixel values, or B pixel values, may be used.

The weight adding processing unit 715 determines the blend ratio between Rd and Rl, the blend ratio between Gd and Gl, and the blend ratio between Bd and Bl, in accordance with the edge information of the pixel to be converted, and further determines the final R pixel value from the blending processing of Rd and Rl, determines the final G pixel value from the blending processing of Gd and Gl, and determines the final B pixel value from the blending processing of Bd and Bl.

Specifically, blending processing is performed wherein, at the edge portions which are not flat and there is more texture, the ratio of the blurring-corrected RGB signals Rd, Gd, and Bd, is raised, and at flat portions the ratio of the blurring-uncorrected RGB signals Rl, Gl, Bl is raised, so as to determine final RGB pixel values.

The weight adding processing unit 715 performs weighted mean processing in accordance with the edge information of the pixel to be processed that has been calculated at the edge detecting unit 702, i.e., the flatness (weightFlat), and calculates the pixel values for each of R, G, and B, for the R pixel positions in the RGBW array 181. Specifically, the RGB pixel values are determined by the following expressions.

$$R=(\text{weightFlat})\times(Rd)+(1-\text{weightFlat})\times Rl$$

$$G=(\text{weightFlat})\times(Gd)+(1-\text{weightFlat})\times Gl$$

$$B=(\text{weightFlat})\times(Bd)+(1-\text{weightFlat})\times Bl$$

The R, G, and B, obtained as a result of the calculation of these expressions are determined as the pixel values for RGB at the R pixel position in the RGBW array 181.

Next, The processing of the B-position RGB-interpolation parameter calculation unit 714 will be described with reference to FIG. 26. The B-position RGB-interpolation parameter calculation unit 714 calculates interpolation parameters to be applied to calculation processing of RGB pixel values to be set to the B-pixel positions included in the RGBW array.

The data which is to be processed by the B-position RGB-interpolation parameter calculation unit 714 is that with a B pixel as the center pixel of the 7×7 pixel region, and the parameters of blurring-corrected RGB signals Rd, Gd, and Bd, and blurring-uncorrected RGB signals Rl, Gl, and Bl, are calculated as interpolation parameters for calculating R, G, and B pixel values corresponding to the B-pixel position of the center pixel. The calculation expressions for these interpolation parameters are the same as with the embodiment described earlier.

As described with the earlier embodiment, the interpolation parameters are calculated based on the assumption that the ratios of the W signal which is the primary component of luminance in the RGBW array, as to the G, R, and B signals which are color components will each be maintained as similar ratios locally. Specifically, as shown in FIG. 26, the calculation expressions of $$Rd=(mR/mW)Wd$$

$$Rl=(mR/mW)Wn$$

$$Gd=(mG/mW)Wd$$

$$Gl=(mG/mW)Wn$$

$$Bd=(mB/mW)Wd$$

$$Bl=(mB/mW)Wn$$

are used to calculate the six interpolation parameters of Rd, Gd, Bd, Rl, Gl, and Bl. While an estimation technique has been illustrated as an example wherein the ratio of the W pixel values and G pixel values, R pixel values, or B pixel values, is assumed to be constant, other estimation techniques using the correlation between W pixel values and G pixel values, R pixel values, or B pixel values, may be used.

Here, mW represents the low-frequency component of the W signals, Wn represents noise-removed W signals, mR represents the low-frequency component of R signals, mG represents the low-frequency component of G signals, and mB represents the low-frequency component of B signals.

Figure 26:
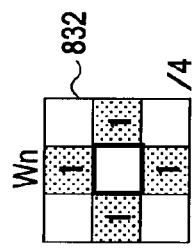
FIG. 26 is a diagram for describing processing of a B-position RGB-interpolation parameter calculating unit shown in FIG. 21.

FIG. 26 illustrate filters to be applied to calculation of these values, which are an mW-calculation filter 831, a Wn-calculation filter 832, mG-calculation filter 861, mR-calculation filter 862, and mB-calculation filter 863. The gray portions shown in the filters are positions corresponding to W pixels, and the white portions are positions corresponding to RGB pixels. The numbers within the filters are filter coefficients, wherein the portions in the mG calculation filter where filter coefficients are shown are positions corresponding to G pixels, the portions in the mR calculation filter where filter coefficients are shown are positions corresponding to R pixels, and the portions in the mB calculation filter where filter coefficients are shown are positions corresponding to B pixels.

These filters are applied to input signals of a 7×7 pixel region with the R pixel to be processed at the center pixel. Applying these filters calculates the values of mW, Wn, mG, mR, and mB. While the input signals for calculation of these values are preferably W signals regarding which other blurring correction processing has not been performed, blurring-corrected W signals Wd following blurring correction processing, which the blurring correction processing unit 703 has generated, may be used to reduce computation costs. Also, a 3×3 filter is applied for calculation of Wn as shown in the drawings, and an arrangement may be made wherein only the 3×3 pixels centered on the center pixel of the input 7×7 pixel region are subjected to this processing.

The filters shown in FIG. 26 are filters to be applied at the B-position RGB-interpolation parameter calculation unit 714, and are filters to be applied to input signals of the 7×7 pixel region with the B pixel regarding which an RGB pixel value is to be obtained at the center pixel.

The B-position RGB-interpolation parameter calculation unit 714 calculates the values of mW, Wn, mG, mR, and mB, by applying the filters shown in FIG. 26 on the input signals of the 7×7 pixel region with the R pixel at the center pixel. The pixel values of the input signals of the 7×7 pixel region are multiplied by the filter coefficients at the corresponding pixel positions of each of the filters, the multiplication results are added, and the values of mW, Wn, mG, mR, and mB, are calculated.

We will assume that the ratios of mW, Wn, mG, mR, and mB, calculated by application of the filters, will be maintained within a local region within the image. Following this assumption, the six interpolation parameters of Rd, Gd, Bd, Rl, Gl, and Bl are calculated according to the following expressions.

$$Rd=(mR/mW)Wd$$

$$Rl=(mR/mW)Wn$$

$$Gd=(mG/mW)Wd$$

$$Gl=(mG/mW)Wn$$

$$Bd=(mB/mW)Wd$$

$$Bl=(mB/mW)Wn$$

While an estimation technique has been illustrated as an example wherein the ratio of the W pixel values and G pixel values, R pixel values, or B pixel values, is assumed to be constant, other estimation techniques using the correlation between W pixel values and G pixel values, R pixel values, or B pixel values, may be used.

The weight adding processing unit 715 determines the blend ratio between Rd and Rl, the blend ratio between Gd and Gl, and the blend ratio between Bd and Bl, in accordance with the edge information of the pixel to be converted, and further determines the final R pixel value from the blending processing of Rd and Rl, determines the final G pixel value from the blending processing of Gd and Gl, and determines the final B pixel value from the blending processing of Bd and Bl.

Specifically, blending processing is performed wherein, at the edge portions which are not flat and there is more texture, the ratio of the blurring-corrected RGB signals Rd, Gd, and Bd, is raised, and at flat portions the ratio of the blurring-uncorrected RGB signals Rl, Gl, and Bl is raised, so as to determine final RGB pixel values.

The weight adding processing unit 715 performs weighted mean processing in accordance with the edge information of the pixel to be processed that has been calculated at the edge detecting unit 702, i.e., the flatness (weightFlat), and calculates the pixel values for each of R, G, and B, for the B pixel positions in the RGBW array 181. Specifically, the RGB pixel values are determined by the following expressions.

$$R=(\text{weightFlat})\times(Rd)+(1-\text{weightFlat})\times Rl$$

$$G=(\text{weightFlat})\times(Gd)+(1-\text{weightFlat})\times Gl$$

$$B=(\text{weightFlat})\times(Bd)+(1-\text{weightFlat})\times Bl$$

The R, G, and B, obtained as a result of the calculation of these expressions are determined as the pixel values for RGB at the B pixel position in the RGBW array 181.

In this way, according to the present embodiment, the color correlation re-mosaic processing unit 710 sets RGB signals corresponding to each RGBW pixel position in the RGBW array. As a result, the first color image 750 shown in FIGS. 20 and 21 can be generated and supplied to the RGB signal processing unit 770. The RGB signal processing unit 770 does not perform demosaic processing but performs other image processing such as white balance adjustment processing, shading processing, RGB color matrix processing, γ correction processing, and so forth, to generate the final color image.

With the processing in the present embodiment, there is a positive correlation in the noise properties in each of the R, G, and B channels, since RGB signals are generated form the same W signals making up the RGBW array. Accordingly, there is the advantage that coloring of noise is suppressed.

Also, with general image signal processing, color matrix computation for improving color reproducibility is performed. For example, RGB signal conversion processing applying the following matrix, and so forth, is performed.

$$\begin{pmatrix} R' \\ G' \\ B' \end{pmatrix} = \begin{pmatrix} 1.58 & -0.57 & -0.01 \\ -0.31 & 1.44 & -0.13 \\ -0.11 & -0.48 & 1.59 \end{pmatrix} \begin{pmatrix} R \\ G \\ B \end{pmatrix}$$

In the event that there is no correlation in noise components among R, G, and B, the noise increases with this processing in both cases of addition and subtraction. On the other hand, in the event that there is positive correlation in the noise in each channel of R, G, and B, the noise component is similarly reduced in the subtraction processing in the color matrix computation, so there is the advantage at deterioration in the SN ratio can be suppressed.

The advantages of the demosaic processing of RGBW array signals which is performed in the present embodiment will be summarized with reference to FIGS. 27A through 27C. FIG. 27A illustrates the effects of noise before color matrix computation, FIG. 27B illustrates an example of a color matrix, and FIG. 27C illustrates the effects of noise on the final pixel values following color matrix computation.

The effects of noise before color matrix computation as shown in FIG. 27A are notated with a W signal making up an RGBW array being configured of a noise component N and W signal with noise removed Wsig, written as $$W=Wsig+N.$$

With the processing in the present embodiment, RGB signals are generated from the same W signals making up the RGBW array. As a result, the properties of the noise in each of the RGB channels are shared, and there is a positive correlation. As shown in FIG. 27A, $$R=(mR/mW)W=(mR/mW)(Wsig+N)$$

$$G=(mG/mW)W=(mG/mW)(Wsig+N)$$

$$B=(mB/mW)W=(mB/mW)(Wsig+N)$$

where it can be seen that there is positive correlation in the noise properties in each channel of R, G, and B, so there is the advantage that coloring of noise components is suppressed.

FIG. 27B illustrates a color matrix to be applied to color matrix computation for improving color reproducibility. FIG. 27C illustrates the computation results with the color matrix. The residual noise in the computation results is $$Rnoise=(N/mW)(1.58\times mR-0.57\times mG-0.01mB)$$

$$Gnoise=(N/mW)(-0.031\times mR+1.44\times mG-0.13mB)$$

$$Bnoise=(N/mW)(-0.11\times mR-0.48\times mG+1.59mB)$$

whereby the noise component is reduced, and consequently, deterioration in SN can be suppressed.

5. Advantages of Processing According to Embodiments

Now, we will summarize the advantages of processing to which embodiments of the present invention have been applied. Such advantages include 1. using an imaging device having white W pixels realizes high sensitivity, which allows reduction in noise;

2. lens aberration which can be realized at low costs allows suppression of false color occurring due to low sampling rates of color components, 3. lens aberration also allows suppression of false color occurring due to imbalance in color correlation, 4. designing an optical lens having signal levels sufficiently capable of correction in a spatial frequency region at the Nyquist frequency or higher, so that sufficient effects can be obtained in the blurring correction processing, allows high resolution properties to be obtained by way of blurring correction signal processing based on the lens data, and 5. generating blurring-corrected W signals Wd by applying blurring correction processing to white W signals which are the primary component of luminance signals, and interpolating the color components by applying the blurring-corrected W signals Wd, allows high resolution properties to be obtained at all channels at low cost.

While embodiments of the present invention have been described with reference to particular embodiments, it will be clear to those skilled in the art that various modifications and substitutions may be made without departing form the essence of the present invention. That is to say, the present invention has been disclosed exemplarily in the form of embodiments, and should not be interpreted restrictively. Any interpretation of the scope of the invention should be made in light of the Claims.

Also, the series of processing described in the Present Specification may be realized by hardware, by software, or by a combination thereof. In the event of executing the processing by software, a program in which the processing sequence is recorded may be installed in memory within a computer built into dedicated hardware, or the program may be installed in a general-purpose computer capable of various types of execution and executed. For example, the program be recorded in a recording medium beforehand. Alternately, the program may be received via a network such as a LAN (Local Area Network) or the Internet, and installed in a recording medium such as a built-in hard disk.

Note that the processing of various types described in the Present Specification are not restricted to execution in the described time-sequence, but rather may be executed in parallel or individually depending on the processing capability of the device executing the processing or appropriateness thereof. Also, the term "system" as used in the Present specification refers to a logical configuration of a collection of multiple devices, and the devices for each configuration do not have to be within the same housing.

The present application contains subject matter related to that disclosed in Japanese Priority Patent Application JP 2009-199399 filed in the Japan Patent Office on Aug. 31, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a blurring correction processing unit configured to
perform blurring correction processing on output signals of an imaging device having an RGBW array which includes RGB pixels and white (W) pixels, and generate blurring-corrected signals corresponding to each pixel;
a data conversion unit configured to convert said RGBW array into an RGB array;
wherein said data conversion unit executes processing of generating blurring-corrected RGB signals (Rd, Gd, Bd) which are blurring-corrected signals corresponding to RGB that have been estimated from blurring-corrected signals generated by said blurring correction processing unit, and
applying said blurring-corrected RGB signals (Rd, Gd, Bd) to determine RGB signals values configuring an RGB array;
an edge detecting unit configured to
analyze the output signals from the imaging device, and generating edge information including edge intensity information corresponding to each pixel;
wherein said data conversion unit is further configured to calculate blurring-uncorrected RGB signals (Rl, Gl, Bl) which are signals to which blurring correction processing is not applied, and
perform determination processing of RGB signals values making up an RGB array or color image by blending processing of said blurring-corrected, RGB signals and said blurring-uncorrected RGB signals;
and wherein determination processing of RGB signal values is performed by executing blending processing in which
at pixel positions where determination is made that edge intensity is great from said edge information, the blend ratio of blurring-corrected RGB signals is increased, and
at pixel positions where determination is made chat edge intensity is small, the blend ratio of blurring-uncorrected RGB signals is increased.

2. An image processing device comprising:
a blurring correction processing unit configured to
perform blurring correction processing on output signals of an imaging device having an RGBW array which includes RGB pixels and white (W) pixels, and generate blurring-corrected signals corresponding to each pixel;
a data conversion unit configured to execute demosaic processing of mosaic signals made up of said RGBW array and generate a color image in which all RGB signal values corresponding to each pixel have been determined; wherein said data conversion unit executes processing of
  generating blurring-corrected RGB signals (Rd, Gd, Bd) which are blurring-corrected signals corresponding to RGB that have been estimated from blurring-corrected signals generated by said blurring correction processing unit, and
  applying said blurring-corrected RGB signals (Rd, Gd, Bd) to generate a color image in which all RGB signal values corresponding to each pixel have been determined;
an edge detecting unit configured to
  analyze the output signals from the imaging device, and generating edge information including edge intensity information corresponding to each pixel;
wherein said data conversion unit is further configured to
  calculate blurting-uncorrected RGB signals (Rl, Gl, Bl) which are signals to which blurring correction processing is not applied, and
  perform determination processing of RGB values making up an RGB array or color image by blending processing of said blurring-corrected RGB signals and said blurring-uncorrected RGB signals;
and wherein determination processing of RGB signal values is performed by executing blending processing in which
  at pixel positions where determination is made that edge intensity is great from said edge information, the blend ratio of blurring-corrected RGB signals is increased, and
  at pixel positions where determination is made that edge intensity is small, the blend ratio of blurring-uncorrected RGB signals is increased.

3. The image processing device according to either of claim 1 or 2, wherein
  said blurring correction processing unit executes blurring correction processing only to W signals included in the outputs signals of said imaging device to generate blurring-corrected W signals (Wd) corresponding to each pixel;
  and said data conversion unit calculates said blurring-calculated RGB signals from said blurring-corrected W signals (Wd), based on an assumption that there is positive correlation between W signals and RGB signals at local regions in the image.

4. The image processing device according to either of claim 1 or 2, wherein said data conversion unit
  applies W signals included in the output signals of said imaging device to generate noise-removed W signals (Wn) corresponding to each pixel;
  and calculates said blurring-uncorrected RGB signals from said noise-removed W signals (Wn).

5. The image processing device according to either of claim 1 or 2, wherein said edge detection unit is of a configuration to
  generate edge information corresponding to each pixel from edge detection processing to which only W signals included in the output signals of said imaging device have been applied, and
  generate edge information including edge intensity and edge direction by calculating signal value gradient of W pixels near a pixel to be processed.

6. The image processing device according to either of claim 1 or 2, wherein
  said edge detection unit is of a configuration to
    generate edge information corresponding to each pixel from edge detection processing to which only W signals included in the output signals of said imaging device have been applied, and
    calculate weight-added values of average of absolute values of gradients of W pixel signals near a pixel to be processed, calculate a flatness (weightFlat) by applying said weight-added values, and output said flatness (weightFlat) to said data conversion unit;
  and wherein said data conversion unit applies said flatness (weightFlat) to determine the blend ratio of said blurring-corrected RGB signals and said blurring-uncorrected RGB signals.

7. The image processing device according to claim 3, said blurring correction processing unit being of a configuration to generate said blurring-corrected W signals (Wd) by convolution computation of a Weiner filter as to W signals included in output signals of said imaging device;
  wherein, for RGB signal positions included in the output signals of said imaging device, reference W pixels are determined in accordance to the edge direction included in edge information generated by said edge detection unit, interpolation W signal values are determined by interpolation processing to which signals values of said reference W pixels have been applied, and blurring-corrected W signals (Wd) are generated by convolution computation of said Weiner filter as to said interpolation W signals.

8. The image processing device according to either of claim 1 or 2, further comprising:
  an optical lens; and
  an imaging device having said RGBW array serving as a light-receiving portion configured to receive incident light through said optical lens.

9. The image processing device according to claim 8, wherein said optical lens has lens aberration configured such that signal components exceeding the Nyquist frequency for each color component in the RGBW array of said imaging device are not generated.

10. An image processing method performing image signal processing with an image processing device, said method comprising the steps of:
  blurring correction processing, with a blurring correction processing unit, of output signals of an imaging device having an RGBW array which includes RGB pixels and white (W) pixels, and generating of blurring-corrected signals (Wd) corresponding to each pixels; and
  converting, with a data conversion unit, of said RGBW array into an RGB array;
  wherein said converting includes processing of
  generating blurring-corrected RGB signals (Rd, Gd, Bd) which are blurring-corrected signals corresponding to RGB that have been estimated from blurring-corrected signals generated in said blurring correction processing, and
  applying said blurring-corrected RGB signals (Rd, Gd, Bd) to determine RGB signals values configuring an RGB array; and
    analyzing, with an edge detecting unit, of output signals from the imaging device; and
    generating of edge information including edge intensity information corresponding to each pixel;
  wherein said converting includes RGB signal value determining further including calculating of blurring-uncorrected RGB signals (Rl, Gl, Bl) which are signals to which blurring correction processing is not applied, and performing determining processing of RGB signals values making up an RGB array or color image by blending processing of said blurring-corrected RGB signals and said blurring-uncorrected RGB signals; and said RGB signal value determining is performed by executing blending processing in which at pixel positions where determination is made that edge intensity is great from said edge information, the blend ratio of blurring-corrected RGB signals is increased, and at pixel positions where determination is made that edge intensity is small, the blend ratio of blurring-uncorrected RGB signals is increased.

11. An image processing method performing image signal processing with an image processing device, said method comprising the steps of:
blurring correction processing, with a blurring correction processing unit, of output signals of an imaging device having an RGBW array which includes RGB pixels and white (W) pixels, and generating of blurring-corrected signals corresponding to each pixels;
converting, with a data conversion unit, of mosaic signals made up of said RGBW array by performing demosaic processing thereof and generating a color image in which all RGB signal values corresponding to each pixel have been determined;
wherein said converting includes processing of
generating blurring-corrected RGB signals (Rd, Gd, Bd) which are blurring-corrected signals corresponding to RGB that have been estimated from blurring-corrected signals generated by said blurring correction processing, and
applying said blurring-corrected RGB signals (Rd, Gd, Bd) to generate a color image in which all RGB signal values corresponding to each pixel have been determined, and
analyzing, with an edge detecting unit, of output signals from the imaging device; and
generating of edge information including edge intensity information corresponding to each pixel;
wherein said converting includes RGB signal value determining further including calculating of blurring-uncorrected RGB signals (Rl, Gl, Bl) which are signals to which blurring correction processing is not applied, and performing determining processing of RGB signals values making up an RGB array or color image by blending processing of said blurring-corrected RGB signals and said blurring-uncorrected RGB signals; and
said RGB signal value determining is performed by executing blending processing in which at pixel positions where determination is made that edge intensity is great from said edge information, the blend ratio of blurring-corrected RGB signals is increased, and at pixel positions where determination is made that edge intensity is small, the blend ratio of blurring-uncorrected RGB signals is increased.

12. A non-transitory computer readable medium storing a program for causing an image processing device to execute image signal processing, said program comprising the steps of:
blurring correction processing, with a blurring correction processing unit, of output signals of an imaging device having an RGBW array which includes RGB pixels and white (W) pixels, and generating of blurring-corrected signals (Wd) corresponding to each pixels;
converting, a data conversion unit, of said RGBW array into an RGB array;
wherein said converting includes processing of
generating blurring-corrected RGB signals (Rd, Gd, Bd) which are blurring-corrected signals corresponding to RGB that have been estimated from blurring-corrected signals generated by said blurring correction processing, and
applying said blurring-corrected RGB signals (Rd, Gd, Bd) to determine RGB signals values configuring an RGB array;
analyzing, with an edge detecting unit, of output signals from the imaging; and
generating of edge information including edge intensity information corresponding to each pixel;
wherein said converting includes RGB signal value determining further including calculating of blurring-uncorrected RGB signals (Rl, Gl, Bl) which are signals to which blurring correction processing is not applied, and performing determining processing of RGB signals values making up an RGB array or color image by blending processing of said blurring-corrected RGB signals and said blurring-uncorrected RGB signals; and
wherein said RGB signal value determining is performed by executing blending processing in which at pixel positions where determination is made that edge intensity is great from said edge information, the blend ratio of blurring-corrected RGB signals is increased, and at pixel positions where determination is made that edge intensity is small, the blend ratio of blurring-uncorrected RGB signals is increased.

13. A non-transitory computer readable medium storing a program for causing an image processing device to execute image signal processing, said program comprising the steps of:
blurring correction processing, with a blurring correction processing unit, of output signals of an imaging device having an RGBW array which includes RGB pixels and white (W) pixels, and generating of blurring-corrected W signals (Wd) corresponding to each pixels;
converting, with a data conversion unit, of mosaic signals made up of said RGBW array by performing demosaic processing thereof, and generating a color image in which all RGB signal values corresponding to each pixel have been determined;
wherein said converting includes processing of
generating blurring-corrected RGB signals (Rd, Gd, Bd) which are blurring-corrected signals corresponding to RGB that have been estimated from blurring-corrected signals generated by said blurring correction processing, and
applying said blurring-corrected RGB signals (Rd, Gd, Bd) to generate a color image in which all RGB signal values corresponding to each pixel have been determined;
analyzing, with an edge detecting unit, of output signals from the imaging device; and
generating of edge information including edge intensity information corresponding to each pixel;
wherein said converting includes RGB signal value determining further including calculating of blurring-uncorrected RGB signals (Rl, Gl, Bl) which are signals to which blurring correction processing is not applied, and performing determining processing of RGB signals values making up an RGB array or color image by blending processing of said blurring-corrected RGB signals and said blurring-uncorrected RGB signals; and
wherein said RGB signal value determining is performed by executing blending processing in which at pixel positions where determination is made that edge intensity is great from said edge information, the blend ratio of blurring-corrected RGB signals is increased, and at pixel positions where determination is made that edge intensity is small, the blend ratio of blurring-uncorrected RGB signals is increased.

* * * * *